United States Patent
Moctezuma Espiricueto et al.

(10) Patent No.: US 12,460,082 B2
(45) Date of Patent: Nov. 4, 2025

(54) COUNTER TAPERED THERMOPLASTIC ELASTOMERS

(71) Applicant: Dynasol Elastómeros, S.A. de C.V., Altamira (MX)

(72) Inventors: Sergio Alberto Moctezuma Espiricueto, Tampico (MX); Mariana Díaz Vejo, Santander (ES); Gabriela Elizabeth Blanco Reyes, Tampico (MX); Gabriel Hernández Zamora, Tampico (MX); Jesús Eduardo Ibarra Rodríguez, Tampico (MX); Jessica Nolasco Santiago, Altamira (MX)

(73) Assignee: Dynasol Elastómeros, S.A. de C.V., Altamira (MX)

( * ) Notice: Subject to any disclaimer, the term of this patent is extended or adjusted under 35 U.S.C. 154(b) by 723 days.

(21) Appl. No.: 17/844,201

(22) Filed: Jun. 20, 2022

(65) Prior Publication Data

US 2022/0411637 A1 Dec. 29, 2022

Related U.S. Application Data

(63) Continuation-in-part of application No. 15/417,193, filed on Jan. 26, 2017, now Pat. No. 11,370,873.

(51) Int. Cl.
  C08L 95/00 (2006.01)
  C08F 297/04 (2006.01)
  C09J 153/02 (2006.01)

(52) U.S. Cl.
  CPC ......... *C08L 95/005* (2013.01); *C08L 2201/52* (2013.01); *C08L 2207/04* (2013.01); *C08L 2555/84* (2013.01)

(58) Field of Classification Search
  CPC ........ C08L 95/00; C08F 297/04; C09J 153/02
  USPC .......................................................... 524/71
  See application file for complete search history.

(56) References Cited

U.S. PATENT DOCUMENTS

| | | | |
|---|---|---|---|
| 3,265,765 A | 8/1966 | Holden et al. | |
| 4,086,298 A | 4/1978 | Fahrbach et al. | |
| 4,152,370 A | 5/1979 | Moczygemba | |
| 4,208,356 A | 6/1980 | Fukawa et al. | |
| 4,248,984 A | 2/1981 | Bi et al. | |
| 4,402,844 A | 9/1983 | Trepka | |
| 4,939,207 A | 7/1990 | Fasulo et al. | |
| 5,100,938 A * | 3/1992 | Vitkuske | C08L 95/005 524/68 |
| 5,234,999 A | 8/1993 | Tung et al. | |
| 5,250,618 A | 10/1993 | Fasulo et al. | |
| 5,399,628 A | 3/1995 | Moczygemba et al. | |
| 5,545,690 A | 8/1996 | Trepka et al. | |
| 5,605,946 A | 2/1997 | Planche | |
| 5,614,579 A | 3/1997 | Roggeman et al. | |
| 5,798,401 A | 8/1998 | Korenstra et al. | |
| 5,910,546 A | 6/1999 | Trepka et al. | |
| 6,221,968 B1 | 4/2001 | Atwood et al. | |
| 6,265,485 B1 | 7/2001 | Trepka et al. | |
| 6,759,454 B2 | 7/2004 | Stephens et al. | |
| 7,138,456 B2 | 11/2006 | Bening et al. | |
| 7,169,848 B2 | 1/2007 | Bening et al. | |
| 7,244,785 B2 | 7/2007 | Bening et al. | |
| 7,728,074 B2 | 6/2010 | Kluttz et al. | |
| 7,772,322 B2 | 8/2010 | Kosaka et al. | |
| 8,222,346 B2 | 7/2012 | Cao et al. | |
| 8,357,735 B2 | 1/2013 | Scholten et al. | |
| 8,569,422 B2 | 10/2013 | Shan et al. | |
| 8,883,927 B2 | 11/2014 | Garcia et al. | |
| 8,981,008 B2 | 3/2015 | Moctezuma et al. | |
| 9,115,296 B2 | 8/2015 | Kluttz et al. | |
| 2003/0176574 A1 | 9/2003 | St. Clair et al. | |
| 2003/0176582 A1 | 9/2003 | Bening et al. | |
| 2007/0225427 A1 | 9/2007 | Wright et al. | |

FOREIGN PATENT DOCUMENTS

EP 2848650 A1 3/2015

* cited by examiner

*Primary Examiner* — Deve V Hall
(74) *Attorney, Agent, or Firm* — Stephen S. Hodgson

(57) ABSTRACT

A counter tapered diblock copolymer composition comprises a monovinyl aromatic monomer A polymerized with a conjugated diene monomer B to form the structure A-[A/B], where the [A/B] block is a copolymer of the A and B monomers that is counter tapered, which means the ratio of B to A is lower proximal to the A block relative to the ratio of B to A distal to the A block. The [A/B] block preferably has a vinyl content that is higher proximal to the A block relative to the vinyl content distal to the A block. The diblock copolymer is preferably partially coupled or formed with a multifunctional initiator to provide a mixture of the diblock copolymer composition and a linear (A-[A/B])-X-([B/A]-A) structure and/or a coupled radial and/or multiarm structure (A-[A/B])n-X, where X is the residue of a coupling agent or an initiator. Asphalt and adhesive compositions are made with the diblock copolymer composition and with the mixture.

77 Claims, 7 Drawing Sheets

COUNTER TAPERED THERMOPLASTIC ELASTOMERS

CROSS-REFERENCE TO RELATED APPLICATION

This is a continuation-in-part of U.S. patent application Ser. No. 15/417,193 filed on Jan. 26, 2017, which issued as U.S. Pat. No. 11,370,873, and which claims priority to U.S. Provisional Patent Application Ser. No. 62/286,974 filed on Jan. 26, 2016, each of which is incorporated by reference.

BACKGROUND OF INVENTION

1. Field of the Invention

The invention relates to counter tapered thermoplastic elastomers, reinforced materials containing the polymers, and articles made from the reinforced materials.

2. Description of the Related Art

Anionic polymerization is a well-known technique for manufacturing elastomers. Commercial polymers commonly made through the anionic polymerization process include elastomers such as polybutadiene, polyisoprene and styrene-diene rubbers, and thermoplastic elastomers such as block copolymers of styrene, butadiene and/or isoprene with varying sizes and numbers of blocks.

Among the polymers prepared by anionic polymerization, commercially available styrene-diene rubbers such as tapered diblock copolymers of conjugated diene and monovinyl aromatic monomers have been of long-lasting commercial importance due to its processability performance in many applications and its unique properties. Special processing characteristics such as high extrudability and excellent flow combined with mechanical properties such as high hardness, low shrinkage and high abrasion resistance, have been a desirable polymer properties balance for many high-productivity applications. Also, commercially available thermoplastic elastomers such as triblock copolymers of styrene, butadiene and/or isoprene with varying macro- and microstructure (SBn, SBS, SIS, SIBS, etc.) have been widely used due to its reinforcement performance in many applications and its thermoplastic behavior.

The polymers prepared by anionic polymerization may be useful in their own right as elastomers for tires and other industries, adhesives, sealants and coatings. In addition, polymers prepared by anionic polymerization may be used to modify the characteristics of various materials such as asphalt, plastics and rubbers. For example, the polymers prepared by anionic polymerization may be used as compatibilizers and reinforcing agents in asphalt. However, many styrene/butadiene-based polymers prepared by anionic polymerization are insufficiently compatible and have met with limited success in the reinforcement of asphalt for paving and roofing applications. Although styrene/butadiene-based polymers, both linear and non-linear, are widely used in reinforcing asphalt, problems related to the dispersibility of the polymers prepared by anionic polymerization in the asphalt formulations and to the morphology stability of the resulting polymer modified asphalt blends ultimately have a negative effect on the storage and long-term performance of the modified asphalt such as performance grade PG for road paving, and high and low temperature properties for roofing applications. Similar problems have arisen where anionically polymerized polymers are used in the pressure and non-pressure sensitive hot melt and solvent based adhesives for tapes and labels, contact and sprayable applications.

The polymers prepared by anionic polymerization may be modified in order to improve their characteristics for their intended applications. Many modification routes have been developed over the years. The most common modifications routes include: molecular weight; molecular weight distribution; monomer composition; diene microstructure; monomer sequence length distribution; stereochemistry; monomer addition order and sequencing; chain coupling through reactions of multifunctional species with living anions to synthesize polymers with linear, radial, comb, arm-like, branched or hyper-branched structures; and combinations of the above modifications. More sophisticated modifications routes include: introducing chemical functionalities through end-capping reactions or functional initiators; polymerization with multifunctional initiators to directly synthesize polymers with linear, radial, comb, arm-like, branched or hyper-branched structures; hydrogenation of residual double bonds; and combinations of the above modifications.

However, it is still highly desirable to combine the unique processing properties of tapered diblock copolymers with the thermoplastic behavior of triblock copolymers in such a way as to improve on the balance between processability and reinforcement performance in many applications. It is desirable to further develop elastomer compositions and find a route by anionic polymerization to prepare those compositions in order to combine the best properties of the above commercially available polymers, which has typically been a compromise among polymer characteristics. Thus, it would be desirable to develop a method for preparing polymers by anionic polymerization to produce elastomer compositions that are more processable, dispersible and compatible with a wide variety of materials and other substrates, including asphalt, adhesive and sealant ingredients, and suitable to meet the reinforcement requirements for a broad range of applications such as road paving, roofing, shingles, waterproofing membranes, adhesive tapes and labels, contact and sprayable adhesives, and sealants.

It has now surprisingly been found a novel counter tapered thermoplastic elastomer composition that achieves a better balance between processability and reinforcement performance for various asphalt, adhesive and sealant applications. The novel counter tapered thermoplastic elastomer compositions provide the above mentioned applications with easy processing advantages such as short dispersion time, higher compatibility, low mixing temperature, low viscosity, excellent storage stability, and better reinforcement advantages such as high elastic response, wide range of performance grade, high adherence, higher filler loading capacity, excellent cohesive strength and shear resistance, and better compromise between high and low temperature properties.

SUMMARY OF THE INVENTION

The present invention provides counter tapered thermoplastic elastomer compositions, methods for producing the polymers, polymer blends and mixtures containing the polymers, asphalt and adhesive compositions containing the polymers, reinforced materials containing the polymers and articles made from the reinforced materials.

The present invention provides a counter tapered diblock copolymer composition, which comprises units of at least one monovinyl aromatic monomer A polymerized with units of at least one conjugated diene monomer B to form the structure A-[A/B], wherein the A block comprises a homopolymer of the monovinyl aromatic monomer units, wherein the [A/B] block is a copolymer of the monovinyl aromatic monomer units and the conjugated diene monomer units, wherein the [A/B] block is counter tapered such that the ratio of B to A is lower proximal to the A block relative to the ratio of B to A distal to the A block. The counter tapered diblock A-[A/B] copolymer is preferably further defined as having a vinyl content of at least 15 weight percent based on the amount of conjugated diene units in the diblock copolymer. The [A/B] block is preferably further defined by the vinyl content being higher proximal to the A block relative to the vinyl content distal to the A block.

The present invention also provides a counter tapered thermoplastic elastomer (CTTE) composition that comprises units of at least one monovinyl aromatic monomer A and units of at least one conjugated diene monomer B and has a linear structure (A-[A/B])-X-([B/A]-A) and/or a coupled radial and/or multiarm structure (A-[A/B]) n-X, wherein X is the residue of a coupling agent, wherein n is an integer from 2 to about 30, where the CTTE composition has outer blocks and/or end blocks A that are a polymer of the monovinyl aromatic monomer units A, where the CTTE composition has a midblock that is a copolymer of the monovinyl aromatic monomer units A and the conjugated diene monomer units B, where the midblock has a center region between terminal regions, and where the B/A ratio is higher and the vinyl content is preferably lower in the center region than in the terminal regions.

One embodiment of the present invention is a mixture of the counter tapered diblock copolymer composition and the CTTE composition described immediately above. The mixture can be achieved by partially coupling the counter tapered diblock copolymer composition or by choosing an appropriate initiator. Using the initiator route, the present invention provides a counter tapered thermoplastic elastomer (CTTE) composition that comprises units of at least one monovinyl aromatic monomer A and units of at least one conjugated diene monomer B, which has a structure X-([A/B]-A) and/or a linear structure (A-[B/A])-X-([A/B]-A) and/or a coupled radial and/or multiarm structure X-([A/B]-A) n, where X is the residue of a monofunctional and/or a multifunctional initiator, wherein n is an integer from 1 to about 30, where the CTTE composition has outer blocks and/or end blocks A that are a polymer of the monovinyl aromatic monomer units A, where the CTTE composition has a midblock that is a copolymer of the monovinyl aromatic monomer units A and the conjugated diene monomer units B, where the midblock has a center region between terminal regions, and where the B/A ratio is lower and the vinyl content is higher in the center region than in the terminal regions.

Using the coupling route, the present invention provides a counter tapered thermoplastic elastomer (CTTE) composition that comprises a counter tapered diblock A-[A/B] copolymer comprising at least one monovinyl aromatic monomer A and at least one conjugated diene monomer B, where the [A/B] block is counter tapered such that the ratio of B to A is lower proximal to the A block relative to the ratio of B to A distal to the A block, and where the counter tapered diblock A-[A/B] copolymer preferably has a vinyl content of at least 15 weight percent based on the amount of conjugated diene units in the diblock copolymer and a block copolymer made by partially coupling the counter tapered diblock A-[A/B] copolymer with a coupling agent, where the block copolymer has a linear structure (A-[A/B])-X-([B/A]-A) and/or a coupled radial and/or multiarm structure (A-[A/B]) n-X, where X is the residue of the coupling agent, where n is an integer from 2 to about 30, where the CTTE composition has outer blocks and/or end blocks A that are a polymer of the monovinyl aromatic monomer units A, where the CTTE composition has a midblock that is a copolymer of the monovinyl aromatic monomer units A and the conjugated diene monomer units B, where the midblock has a center region between terminal regions, and where the B/A ratio is higher and the vinyl content is lower in the center region than in the terminal regions.

In another embodiment, the invention provides counter tapered thermoplastic elastomer compositions made of conjugated diene monomers (B) and monovinyl aromatic monomers (A). The counter tapered thermoplastic elastomer compositions are characterized in having: (a) a counter tapered diblock A-[A/B] copolymer; (b) a block copolymer selected from the group consisting of linear triblock copolymers, multiarm coupled block copolymers, and mixtures thereof; and (c) wherein the ratio of (a) to (b) in the counter tapered thermoplastic elastomer composition is from about 1:5 to about 5:1. The counter tapered thermoplastic elastomer composition achieves a better balance between processability and reinforcement performance for various asphalt, adhesive and sealant applications. The novel counter tapered thermoplastic elastomer compositions provide the above mentioned applications with easy processing advantages such as short dispersion time, higher compatibility, low mixing temperature, low viscosity, excellent storage stability, and better reinforcement advantages such as high elastic response, wide range of performance grade, high adherence, higher filler loading capacity, excellent cohesive strength and shear resistance, and better compromise between high and low temperature properties. These processability and reinforcement advantages make the counter tapered thermoplastic elastomer compositions suitable to meet the requirements for a broad range of applications such as road paving, roofing, shingles, waterproofing membranes, coatings, adhesive tapes and labels, contact and sprayable adhesives and sealants.

Counter tapered thermoplastic elastomer compositions according to the present invention preferably comprise:
(a) a counter tapered diblock A-[A/B] copolymer comprising at least one conjugated diene monomer and at least one monovinyl aromatic monomer, where the diblock copolymer preferably has: a peak molecular weight from 20,000 to 250,000; a monovinyl aromatic homopolymer block A with a peak molecular weight of preferably at least 5,000; and a counter tapered copolymer block [A/B] with a vinyl content of preferably at least 15 weight percent based on the amount of conjugated diene units in the diblock copolymer; and
(b) a block copolymer comprising at least one conjugated diene monomer and at least one monovinyl aromatic monomer, where the block copolymer preferably has at least two homopolymer blocks of monovinyl aromatic monomer and at least one copolymer block of monovinyl aromatic monomer and conjugated diene monomer, where the block copolymer is selected from the group consisting of linear triblock copolymers having a peak molecular weight that is preferably at least about 1.5 times the peak molecular weight of the counter tapered diblock copolymer described in (a), multiarm coupled block copolymers having a peak molecular weight that is at least about 2.5 times the peak molecular weight of the counter tapered diblock copolymer described in (a), and mixtures thereof, where each block copolymer has monovinyl aromatic homopolymer blocks A with a peak molecular weight of preferably at least 5,000 and counter tapered copolymer blocks [A/B] with a vinyl content of preferably at least 15 weight percent based on the amount of conjugated diene units in the block copolymer; and preferably (c) where the ratio of (a) to (b) in the counter tapered thermoplastic elastomer composition is from about 1:5 to about 5:1.

Counter tapered thermoplastic elastomer compositions according to the present invention that have both the counter tapered diblock A-[A/B] copolymer and the block copolymer formed by partial coupling or by a multifunctional initiator preferably have:

(a) a weight average molecular weight that is from about 30,000 to about 500,000 g/mol;
(b) a total amount of monovinyl aromatic monomer in the counter tapered thermoplastic elastomer composition of from about 10 percent weight to about 55 percent weight; and
(c) a total vinyl configuration content that is from about 15 percent weight to about 90 percent weight based on the total amount of conjugated diene in the counter tapered thermoplastic elastomer composition.

An additional embodiment of the present invention is a process for making a counter tapered thermoplastic elastomer composition that comprises: adding a solvent, a polar modifier or combination of polar modifiers, and monovinyl aromatic monomer to a reactor to form an initial reaction mixture, where the amount of the polar modifier in the initial reaction mixture is less than 10 wt %; adding an organolithium initiator compound to the reactor and anionically polymerizing the monomer to form the monovinyl aromatic homopolymer block A with a peak molecular weight of preferably at least 5,000; adding additional monovinyl aromatic monomer and simultaneously beginning the dosification to the reactor of conjugated diene monomer at a predetermined dose rate for a predetermined time, where the conjugated diene monomer is preferably added at a lower rate than the monovinyl aromatic monomer, and copolymerizing to form the counter tapered copolymer block [A/B] with a vinyl content of preferably at least 15 weight percent based on the amount of conjugated diene units in the diblock copolymer, thereby obtaining the counter tapered diblock A-[A/B] copolymer with a peak molecular weight from preferably 20,000 to 250,000; and adding a coupling agent or combination of coupling agents to partially couple the counter tapered diblock A-[A/B] copolymer to form the block copolymer that is either a linear triblock copolymer, a multiarm coupled block copolymer, or mixtures thereof; where the solvent, the polar modifier, the conjugated diene monomer and the monovinyl aromatic monomers comprise a total reaction mixture, where the amount of the polar modifier is less than 5 wt % of the total reaction mixture, where the peak molecular weight of the linear triblock copolymer is preferably at least about 1.5 times the peak molecular weight of the counter tapered diblock A-[A/B] copolymer, where the peak molecular weight of the multiarm coupled block copolymer is preferably at least about 2.5 times the peak molecular weight of the counter tapered diblock A-[A/B] copolymer, and where the ratio of the counter tapered diblock A-[A/B] copolymer to the block copolymer is preferably from about 1:5 to about 5:1 in the counter tapered thermoplastic elastomer composition.

The invention provides compositions and articles made from the counter tapered thermoplastic elastomer compositions, reinforced materials made from a mixture of a counter tapered thermoplastic elastomer composition with a material to be reinforced and articles made from the reinforced materials. The invention provides novel counter tapered thermoplastic elastomer composition and their blends with other block copolymers with enhanced adhesion to specific substrates and articles made from the adhesion-enhanced materials. The counter tapered thermoplastic elastomer compositions of the present invention achieve a better balance between processability and reinforcement performance for various asphalt, adhesive and sealant applications. The counter tapered thermoplastic elastomer compositions provide the these applications with easy processing advantages such as short dispersion time, higher compatibility, lower mixing temperature, lower viscosity, excellent storage stability, and better reinforcement advantages such as higher elastic response, a wide range of performance grade, higher adherence, higher filler loading capacity, excellent cohesive strength and shear resistance, and a better compromise between high and low temperature properties. These processability and reinforcement advantages make the novel counter tapered thermoplastic elastomer compositions suitable to meet the requirements for a broad range of applications such as road paving, roofing, shingles, waterproofing membranes, adhesive tapes and labels, contact and sprayable adhesives, and sealants.

One embodiment of the present invention is an asphalt and/or bituminous composition that comprises an asphalt and/or a bitumen and a first counter tapered thermoplastic elastomer (first CTTE) composition, where the asphalt and/or bituminous composition includes from 0.5 to 25 percent weight of the first CTTE composition, and where the first CTTE composition comprises units of at least one monovinyl aromatic monomer A polymerized with units of at least one conjugated diene monomer B to form a counter tapered diblock A-[A/B] copolymer, wherein the A block comprises a polymer of the monovinyl aromatic monomer units, where the [A/B] block is a copolymer of the monovinyl aromatic monomer units and the conjugated diene monomer units, and where the [A/B] block is counter tapered such that the ratio of B to A is lower proximal to the A block relative to the ratio of B to A distal to the A block. The total amount of units of the conjugated diene monomer B is preferably more than 55 wt % of the first CTTE composition, and the vinyl content is preferably higher proximal to the A block relative to the vinyl content distal to the A block in the counter tapered diblock A-[A/B] copolymer. The [A/B] block of the first CTTE composition preferably comprises from 2 to 40 wt % of the monovinyl aromatic monomer A and preferably from 60 to 98 wt % of the conjugated diene monomer B.

The asphalt and/or bituminous composition preferably further comprises a second counter tapered thermoplastic elastomer (second CTTE) composition. The second CTTE composition comprises units of at least one monovinyl aromatic monomer A and units of at least one conjugated diene monomer B and has a linear structure (A-[A/B])-X-([B/A]-A) and/or a coupled radial and/or multiarm structure (A-[A/B]) n-X, where X is the residue of either a coupling agent or a multifunctional initiator, wherein n is an integer from 2 to 30, where the second CTTE composition has outer blocks and/or end blocks A that are a polymer of the monovinyl aromatic monomer units A, where the second CTTE composition has a midblock that is a copolymer of the monovinyl aromatic monomer units A and the conjugated diene monomer units B, where the midblock has a center region between terminal regions, and where the B/A ratio is higher in the center region than in the terminal regions.

A further embodiment of the present invention is an asphalt and/or bituminous composition that comprises an asphalt and/or a bitumen and the second CTTE composition, where the asphalt and/or bituminous composition includes from 0.5 to 25 percent weight of the second CTTE composition with essentially none or very little of the first CTTE composition, which can be accomplished by complete or nearly complete coupling of the first CTTE composition.

Another embodiment of the present invention is an adhesive composition that comprises the first CTTE composition and a tackifying resin, preferably further including at least one additive selected from the group consisting of: plasticizers, solvent, coupling agents, crosslinking agents, photoinitiators and antioxidants. The adhesive composition preferably further comprises the second CTTE composition. An alternative embodiment of the present invention is an adhesive composition that comprises the second CTTE composition and a tackifying resin, preferably further including at least one additive selected from the group consisting of: plasticizers, solvent, coupling agents, crosslinking agents, photoinitiators and antioxidants and, where the adhesive composition includes from 0.5 to 50 percent weight of the second CTTE composition with essentially none or very little of the first CTTE composition, which can be accomplished by complete or nearly complete coupling of the first CTTE composition.

DETAILED DESCRIPTION OF THE PREFERRED EMBODIMENTS

Figure 1:
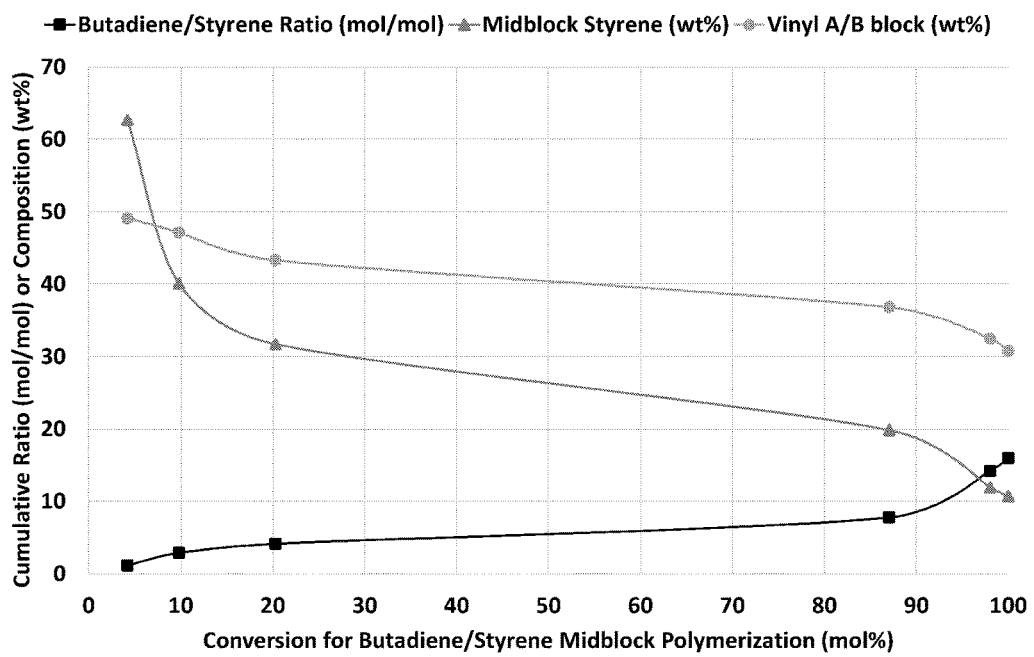
FIG. 1 depicts the Monomer Distribution in [A/B] Midblock of (A-[A/B]) n Counter Tapered Thermoplastic Elastomer CTTE 14.

The present invention provides counter tapered thermoplastic elastomer compositions, methods for producing the polymers, polymer blends and mixtures containing the polymers, reinforced materials containing the polymers and articles made from the reinforced materials.

One aspect of the invention provides novel counter tapered thermoplastic elastomer compositions made of conjugated diene monomers (B) and monovinyl aromatic monomers (A). The novel counter tapered thermoplastic elastomer compositions are characterized in having: (a) a counter tapered diblock A-[A/B] copolymer; (b) a block copolymer selected from the group consisting of linear triblock copolymers, multiarm coupled block copolymers, and mixtures thereof; and (c) wherein the ratio of (a) to (b) in the counter tapered thermoplastic elastomer composition is from about 1:5 to about 5:1. The novel counter tapered thermoplastic elastomer composition achieves a better balance between processability and reinforcement performance for various asphalt, adhesive and sealant applications. The novel counter tapered thermoplastic elastomer compositions provide the above mentioned applications with easy processing advantages such as short dispersion time, low mixing temperature, low viscosity, excellent storage stability, and better reinforcement advantages such as high elastic response, wide range of performance grade, high adherence, higher filler loading capacity, and better compromise between high and low temperature properties. These processability and reinforcement advantages make the novel counter tapered thermoplastic elastomer compositions suitable to meet the requirements for a broad range of applications such as road paving, roofing, shingles, waterproofing membranes, adhesive tapes and labels, contact and sprayable adhesives, and sealants.

The novel counter tapered thermoplastic elastomer compositions according to the present invention comprising:
  (a) a counter tapered diblock A-[A/B] copolymer comprising at least one conjugated diene monomer and at least one monovinyl aromatic monomer, said diblock copolymer being further characterized in having: a peak molecular weight from 20,000 to 250,000; a monovinyl aromatic homopolymer block A with a peak molecular weight of at least 5,000; and a counter tapered copolymer block [A/B] with a vinyl content of at least 15 weight percent based on the amount of conjugated diene units in the diblock copolymer; and
  (b) a block copolymer comprising at least one conjugated diene monomer and at least one monovinyl aromatic monomer, said block copolymer being further characterized in having: at least two homopolymer blocks of monovinyl aromatic monomer and at least one copolymer block of monovinyl aromatic monomer and conjugated diene monomer; wherein the block copolymer is selected from the group consisting of linear triblock copolymers having a peak molecular weight that is at least about 1.5 times the peak molecular weight of the counter tapered diblock copolymer described in (a), multiarm coupled block copolymers having a peak molecular weight that is at least about 2.5 times the peak molecular weight of the counter tapered diblock copolymer described in (a), and mixtures thereof; wherein each block copolymer has monovinyl aromatic homopolymer blocks A with a peak molecular weight of at least 5,000, and counter tapered copolymer blocks [A/B] with a vinyl content of at least 15 weight percent based on the amount of conjugated diene units in the block copolymer; and (c) wherein the ratio of (a) to (b) in the counter tapered thermoplastic elastomer composition is from about 1:5 to about 5:1.

The novel counter tapered thermoplastic elastomer compositions according to the present invention are characterized by:

(a) the weight average molecular weight of the counter tapered thermoplastic elastomer composition is from about 30,000 to about 500,000 g/mol;

(b) the total amount of monovinyl aromatic monomer in the counter tapered thermoplastic elastomer composition is from about 10 percent weight to about 55 percent weight; and (c) the total vinyl configuration content is from about 15 percent weight to about 90 percent weight based on the total amount of conjugated diene in the counter tapered thermoplastic elastomer composition.

Polymers prepared by anionic polymerization include thermoplastic, elastomeric, and thermoplastic-elastomeric polymers. The polymers may be homopolymers or copolymers, including tapered, random and block copolymers. Among the block copolymers prepared by anionic polymerization, tapered diblock copolymers of conjugated diene and monovinyl aromatic monomers have been of long-lasting commercial importance due to its performance in many applications and its unique properties. Special processing characteristics such as high extrudability and excellent flow combined with mechanical properties such as high hardness, low shrinkage and high abrasion resistance, have been a desirable polymer properties balance for many high-productivity applications. Also, commercially available thermoplastic elastomers such as triblock copolymers of styrene, butadiene and/or isoprene with varying macro- and microstructure (SBn, SBS, SIS, SIBS, etc.) have been widely used due to its reinforcement performance in many applications and its thermoplastic behavior. However, it is still highly desirable to combine the unique processing properties of tapered diblock copolymers with the thermoplastic behavior of triblock copolymers in such a way as to improve on the balance between processability and reinforcement performance in many applications.

Alkyllithium-initiated copolymerization of conjugated diene and monovinyl aromatic monomers in hydrocarbon solvents, in the absence of polar additives, yields an interesting type of structure with compositional heterogeneity along the copolymer chain, which is commonly known as tapered, gradual or gradient diblock copolymer structure. Relatively large differences between monomer reactivity ratios (i.e., $r1>10$ and $r2<0.1$) are observed despite the similar stabilities of the carbanionic chain ends corresponding to the conjugated diene (1) and monovinyl aromatic (2) monomers. Contrary to the observed faster homopolymerization of monovinyl aromatic monomers relative to conjugated diene monomers, in the initial stage of copolymerization the less reactive conjugated diene monomer is preferentially incorporated into the copolymer chain until it is nearly exhausted, forming a diene-rich, tapered block B with gradual change in composition, and then in the final stage most of the monovinyl aromatic monomer forms a terminal polystyrene block A.

B-(B/A)-A

Furthermore, during copolymerization in hydrocarbon solvents and in the absence of polar additives, a distinct intermediate stage occurs that forms a small, sharp and steep interphase -(B/A)- with sudden change in composition, which acts as a transition within the copolymer chain between two large A and B blocks. Lower melt viscosities of tapered diblock copolymers relative to pure diblock copolymers, with the same composition and molecular weight, are ascribed to the presence of this small interphase, which weakens the intrachain and interchain repulsion and enhances mixing between dissimilar adjacent blocks. Since alkyllithium-initiated copolymerization of conjugated diene and monovinyl aromatic monomers under the above conditions behaves statistically with a tendency toward random placement of the monomeric units (i.e., $r1r2\sim0.5$) mainly due to the large difference in monomer reactivity ratios, both the block B and the interphase -(B/A)- have a compositional drift along the copolymer chain that is directly dependent on the instantaneous relative monomer concentration. Therefore, the initial relatively small concentration of monovinyl aromatic monomer is incorporated into the diene-rich, tapered block B almost randomly and predominantly as isolated aromatic units. On the contrary, the intermediate relatively large concentration of monovinyl aromatic monomer is incorporated into the small, sharp and steep interphase-(B/A)-statistically and predominantly as long aromatic sequences that should rapidly become aromatic-rich segments with residual isolated diene units.

Copolymerization of conjugated diene and monovinyl aromatic monomers with alkyllithium in the absence of polar additives typically results in tapered diblock copolymers with low vinyl configuration content (1,2-diene microstructure). Polar additives simultaneously act as randomizing agents and microstructure modifiers during the copolymerization of conjugated diene and monovinyl aromatic monomers with alkyllithium initiators. The relatively large differences between monomer reactivity ratios decrease with increasing polar additive concentration, which gradually changes the copolymerization behavior from statistical to random, and transform the monomer sequence length distribution from tapered diblock to random diblock and then to a completely random copolymer structure. This randomization effect is typically accompanied by a corresponding modification effect that increases the vinyl configuration content. Although both effects are directly dependent on polar additive concentration, and moreover the modification effect is counterly dependent on polymerization temperature, the extent and specific behavior of each effect is particularly dependent on polar additive type and specific properties. It is possible to combine polar additives to overcome some handicaps and obtain synergistic or desired differentiated effects on monomer sequence length distribution and/or 1,2-diene microstructure.

By controlling the monomer addition order, polymerization sequence, feed rate, and feed composition; the polar additives combination, type, concentration, addition order and feed rate; the polymerization temperature behavior and conditions; and the relative block sizes and molecular weights, the design of the novel counter tapered thermoplastic elastomer compositions can be tailored to include the characteristics and features according to the present invention, i.e., (a) a counter tapered diblock A-[A/B] copolymer; (b) a block copolymer selected from the group consisting of linear triblock copolymers, multiarm coupled block copolymers, and mixtures thereof; and (c) wherein the ratio of (a) to (b) in the counter tapered thermoplastic elastomer composition is from about 1:5 to about 5:1. These design characteristics are suitable qualities to achieve the desired application overall performance in blends with a wide variety of materials and other substrates, including asphalt, adhesive and sealant ingredients, rubber and plastic. The desired application overall performance is a balance between maximized processing properties such as low melt viscosity, high dispersibility, high compatibility, high miscibility and/or high adhesion, and good elastomeric and thermoplastic properties. Particular applications for which the novel counter tapered thermoplastic elastomer compositions of the present invention are well suited include asphalt reinforcers, modifiers and morphology stabilizers. Other suitable applications include use as compatibilizers, viscosity modifiers, flow modifiers, process aids, rheology control agents, and impact modifiers for plastics and plastics blends and alloys, and composites. The novel counter tapered thermoplastic elastomer compositions may also be designed with tailored characteristics to provide highly processible adhesives with optimal adhesion to polar substrates, useful in typical adhesive and sealant applications. The novel counter tapered thermoplastic elastomer composition achieves a better balance between processability and reinforcement performance for various asphalt, adhesive and sealant applications. The novel counter tapered thermoplastic elastomer compositions provide the above mentioned applications with easy processing advantages such as short dispersion time, low mixing temperature, low viscosity, excellent storage stability, and better reinforcement advantages such as high elastic response, wide range of performance grade, high adherence, higher filler loading capacity, and better compromise between high and low temperature properties. These processability and reinforcement advantages make the novel counter tapered thermoplastic elastomer compositions suitable to meet the requirements for a broad range of applications such as road paving, roofing, shingles, waterproofing membranes, adhesive tapes and labels, contact and sprayable adhesives, and sealants.

Another aspect of the present invention provides a process for making a counter tapered thermoplastic elastomer composition comprising: reacting at least one conjugated diene monomer and at least one monovinyl aromatic monomer under anionic polymerization conditions in the presence of a suitable polar modifier or combination of polar modifiers; and forming the composition of the present invention comprising:

(a) a counter tapered diblock A-[A/B] copolymer comprising at least one conjugated diene monomer and at least one monovinyl aromatic monomer, said diblock copolymer being further characterized in having: a peak molecular weight from 20,000 to 250,000; a monovinyl aromatic homopolymer block A with a peak molecular weight of at least 5,000; and a counter tapered copolymer block [A/B] with a vinyl content of at least 15 weight percent based on the amount of conjugated diene units in the diblock copolymer; and (b) a block copolymer comprising at least one conjugated diene monomer and at least one monovinyl aromatic monomer, said block copolymer being further characterized in having: at least two homopolymer blocks of monovinyl aromatic monomer and at least one copolymer block of monovinyl aromatic monomer and conjugated diene monomer; wherein the block copolymer is selected from the group consisting of linear triblock copolymers having a peak molecular weight that is at least about 1.5 times the peak molecular weight of the counter tapered diblock copolymer described in (a), multiarm coupled block copolymers having a peak molecular weight that is at least about 2.5 times the peak molecular weight of the counter tapered diblock copolymer described in (a), and mixtures thereof; wherein each block copolymer has monovinyl aromatic homopolymer blocks A with a peak molecular weight of at least 5,000, and counter tapered copolymer blocks [A/B] with a vinyl content of at least 15 weight percent based on the amount of conjugated diene units in the block copolymer; and (c) wherein the ratio of (a) to (b) in the counter tapered thermoplastic elastomer composition is from about 1:5 to about 5:1.

An additional embodiment of the present invention is a process for making a counter tapered thermoplastic elastomer composition comprising: adding a solvent, a polar modifier or combination of polar modifiers, and monovinyl aromatic monomer to a reactor to form an initial reaction mixture, wherein the amount of the polar modifier in the initial reaction mixture is less than 10 wt %; adding an organolithium initiator compound to the reactor and anionically polymerizing the monomer to form the monovinyl aromatic homopolymer block A with a peak molecular weight of at least 5,000; adding additional monovinyl aromatic monomer and simultaneously begin the dosification to the reactor of conjugated diene monomer at a predetermined dose rate for a predetermined time, and copolymerizing to form the counter tapered copolymer block [A/B] with a vinyl content of at least 15 weight percent based on the amount of conjugated diene units in the diblock copolymer, and obtain the counter tapered diblock A-[A/B] copolymer with a peak molecular weight from 20,000 to 250,000; and adding a coupling agent or combination of coupling agents to partially couple the counter tapered diblock A-[A/B] copolymer to form the block copolymer that is either a linear triblock copolymer, a multiarm coupled block copolymer, or mixtures thereof; wherein the solvent, the polar modifier, the conjugated diene monomer and the monovinyl aromatic monomers comprise a total reaction mixture, wherein the amount of the polar modifier is less than 5 wt % of the total reaction mixture, wherein the peak molecular weight of the linear triblock copolymer is at least about 1.5 times the peak molecular weight of the counter tapered diblock A-[A/B] copolymer, wherein the peak molecular weight of the multiarm coupled block copolymer is at least about 2.5 times the peak molecular weight of the counter tapered diblock A-[A/B] copolymer, and wherein the ratio of the counter tapered diblock A-[A/B] copolymer to the block copolymer is from about 1:5 to about 5:1 in the counter tapered thermoplastic elastomer composition.

The present invention also provides a method for preparing the novel counter tapered thermoplastic elastomer compositions, which includes the step of reacting at least one conjugated diene monomer (B) and at least one monovinyl aromatic monomer (A) under anionic polymerization conditions in the presence of a suitable polar additive or combination of polar additives, in such a way as to form the counter tapered diblock copolymer A-[A/B] and then adding a suitable coupling agent to form a block copolymer with thermoplastic behavior, and finally obtain the counter tapered thermoplastic elastomer composition. Therefore, in a preferred embodiment of the present invention, the counter tapered diblock A-[A/B] copolymer is sequentially polymerized to independently manipulate the size, composition and microstructure of the desired counter tapered copolymer block [A/B], including the control of its monovinyl aromatic monomer sequence length and conjugated diene monomer vinyl distribution (1,2-diene microstructure). The sequential polymerization also makes possible to tailor the relative size of the monovinyl aromatic homopolymer block A and the relative order of the blocks in the copolymer, thus, the monovinyl aromatic homopolymer block A is first polymerized to be adjacent to the counter tapered copolymer block [A/B] in order to form the desired counter tapered diblock A-[A/B] copolymer.

The monovinyl aromatic monomer sequence length and conjugated diene monomer vinyl distribution of the counter tapered copolymer block [A/B] may be manipulated by controlling the temperature profile of polymerization. This polymerization step is allowed to proceed in either isothermal mode for a pre-established residence time or quasi-adiabatic mode up to a peak temperature. The isothermal mode may be used to manipulate a vinyl distribution that is uniform along the copolymer chain and to achieve a vinyl content that is maximized with respect to the added amount of polar additive and the temperature set for the polymerization mixture, and consequently, the monovinyl aromatic monomer sequence length depends only on the instantaneous relative monomer concentration. The quasi-adiabatic mode may be used to manipulate a vinyl distribution gradient along the copolymer chain, and therefore, the monovinyl aromatic monomer sequence length depends not only on the instantaneous relative monomer concentration but also on the actual temperature profile. The vinyl distribution gradient not only depends on the controlled temperature profile but also on the initial and final temperature of the polymerization mixture. The counter tapered copolymer block [A/B] is manipulated to tailor a desired tapered composition and a controlled vinyl distribution that contributes to maximize processing characteristics by increasing flow and reducing melt viscosity, and to optimize compatibility with materials, ingredients and/or substrates used in the desired applications.

In another embodiment of the present invention, the counter tapered copolymer block [A/B] is a statistically distributed copolymer block of at least one conjugated diene monomer (B) and at least one monovinyl aromatic monomer (A), where statistically distributed means the sequential distribution of the monomeric units obeys known statistical laws. The counter tapered copolymer block [A/B] has a microstructure with gradual change in composition, which mainly depends on the amount of the suitable polar additive added to the polymerization mixture and the temperature profile. Alternatively or concomitantly, the counter tapered copolymer block [A/B] may be prepared by adding the conjugated diene monomer at a controlled feed rate to the polymerization mixture while the monovinyl aromatic monomer is being polymerized. The dosification to the reactor of conjugated diene monomer at a predetermined dose rate for a predetermined time is performed in such a way as to control the instantaneous relative monomer concentration. This polymerization step is allowed to proceed in either isothermal mode for a pre-established residence time or quasi-adiabatic mode up to a peak temperature. The counter tapered copolymer block [A/B] is enlarged with respect to the small interphase-(B/A)-typical of copolymerization in the absence of polar additives. The enlarged counter tapered copolymer block [A/B] is manipulated to tailor its relative size with respect to the adjacent monovinyl aromatic homopolymer block A to contribute in minimizing repulsion, maximizing the compatibility, promoting interfacial mixing, and improve toughness and fracture strength. An optimum counter tapered copolymer block [A/B] is one that incorporated into the counter tapered thermoplastic elastomer compositions provides the best balance between processability and reinforcement performance for each application. People skilled in the art understand the differences in characteristics, properties and applicability of these different counter tapered thermoplastic elastomer compositions.

In an additional embodiment of the present invention, each A block is a monovinyl aromatic homopolymer block of at least one monovinyl aromatic monomer. Each A block is manipulated to tailor its relative size with respect to the counter tapered copolymer block [A/B] to contribute in achieving the desired application performance.

The novel counter tapered thermoplastic elastomer compositions for use in the present invention typically have a weight average molecular weight from about 30,000 to about 500,000 g/mol. This range includes monovinyl aromatic homopolymer blocks A having preferably a peak molecular weight of at least about 8,000 g/mol, counter tapered diblock A-[A/B] copolymers having preferably a peak molecular weight from about 20,000 to 250,000 g/mol and multiarm coupled block copolymers having preferably a peak molecular weight from about 40,000 to 750,000 g/mol. Throughout this disclosure, the molecular weights cited are measured using gel permeation chromatography under ASTM D 3536 with linear polystyrene standards. The composition of vinyl aromatic monomer in the counter tapered thermoplastic elastomer compositions preferably ranges from about 10 to about 85 percent weight, more preferably from about 10 to about 70 percent weight, and even more preferably from about 10 to 55 percent weight. The vinyl configuration content of the novel counter tapered thermoplastic elastomer compositions, based on the total amount of conjugated diene monomer in the counter tapered copolymer block [A/B], may range preferably from about 15 to about 90 percent weight, more preferably from about 15 to about 85 percent weight, and even more preferably from about 15 to 80 percent weight. The invention is not limited to counter tapered thermoplastic elastomer compositions falling within the preferred molecular weight, composition and vinyl configuration ranges.

Examples of counter tapered thermoplastic elastomer compositions that may be made from anionically polymerizable monomers include, but are not limited to, elastomers and thermoplastic elastomers made from block copolymers or terpolymers of styrene(S), butadiene (B), and/or isoprene (I) of varying sizes and number of blocks. Examples of such elastomers and thermoplastic elastomers include: S-[B/S] m, S-[B/S] m-S, S-[B/S] m-X-[S/B] m-S, S-[I/S] m, S-[I/S] m-S, S-[I/S] m-X-[S/I] m-S, S-[B/I/S] m, S-[B/I/S] m-S, S-[B/I/S] m-X-[S/I/B] m-S, (S-[B/S] m) n-X, (S-[I/S] m) n-X, (S-[B/I/S] m) n-X, (wherein m is an integer; and wherein X is the residue of either a coupling agent or a multifunctional initiator and n is an integer from 2 to about 30), which may be used alone or in blends to obtain the counter tapered thermoplastic elastomer compositions as well as their hydrogenated, selectively hydrogenated, and partially hydrogenated counterparts.

The novel counter tapered thermoplastic elastomer compositions may be polymer blends obtained in situ by partial coupling and/or by partial initiation, with a coupling agent and/or a multifunctional initiator, or polymer blends of multiarm, branched or radial polymers obtained by total coupling and/or total initiation, and diblock copolymers prepared separately. The counter tapered thermoplastic elastomer compositions may be blends prepared in situ by adding a suitable amount of a coupling agent at the end of polymerization of the counter tapered diblock A-[A/B] copolymers of the present invention and form the desired (A-[A/B]) n-X linear triblock and/or multiarm coupled block copolymers. The partial coupling is achieved by controlling the stoichiometric ratio of coupling agent to living polymer. The counter tapered thermoplastic elastomer compositions may also be blends prepared in situ by using a suitable multifunctional initiator combined with the typical monofunctional initiator, such as an alkyllithium, to initiate the polymerization of the counter tapered diblock [A/B]-A copolymers of the present invention and form the desired X-([A/B]-A) n linear triblock and/or multiarm coupled block copolymers. The partial initiation is achieved by controlling the stoichiometric ratio of multifunctional initiator to monofunctional initiator. The novel counter tapered thermoplastic elastomer compositions for use in the present invention may have from 2 to 30 anionically polymerized polymers chains (arms) per initiator or coupling agent molecule. These branched and radial, linear triblock and multiarm coupled block copolymers may have a peak molecular weight from about 40,000 to about 750,000 g/mol. This includes counter tapered thermoplastic elastomer compositions having preferably a weight average molecular weight from about 30,000 to 500,000 g/mol. In some embodiments of the novel counter tapered thermoplastic elastomer compositions, the composition of vinyl aromatic monomer preferably ranges from about 10 to about 85 percent weight, more preferably from about 10 to about 70 percent weight, and even more preferably from about 10 to 55 percent weight. The vinyl configuration content of the novel counter tapered thermoplastic elastomer compositions, based on the total amount of conjugated diene monomer in the counter tapered copolymer block [A/B], may range preferably from about 15 to about 90 percent weight, more preferably from about 15 to about 85 percent weight, and even more preferably from about 15 to 80 percent weight. The invention is not limited to counter tapered thermoplastic elastomer compositions falling within the preferred molecular weight, composition and vinyl configuration ranges.

The anionically polymerized polymers can be made by any suitable method known in the art, such as those described in U.S. Pat. Nos. 3,281,383, and 3,753,936, which are incorporated herein in their entirety by reference. In these methods the anionically polymerized polymers are made by contacting anionically polymerizable monomers with an organolithium compound as an initiator. The preferred class of these compounds can be represented by the formula RLi wherein R is a hydrocarbon radical selected from the group consisting of aliphatic, cycloaliphatic, and aromatic radicals containing from 1 to 20 carbon atoms, although higher molecular weight initiators can be used. Many anionic polymerization initiators are well known and commercially available. Monofunctional organolithium compounds, such as butyllithium, are examples of commonly used initiators. Specific examples of these initiators include methyllithium, ethyllithium, tert-butyllithium, sec-butyllithium, n-butyllithium, n-decyllithium, isopropyllithium, eicosyllithium, cycloalkyllithium compounds, such as cyclohexyllithium, and aryllithium compounds, such as phenyllithium, naphthllithium, p-toluyllithium, 1,1-diphenylhexyllithium, and the like. Monofunctional organolithium compounds substituted with protected polar functional groups may also be used as initiators for anionic polymerization.

The amount of initiator varies depending upon the desired molecular weight of the anionically polymerized polymer. Number average molecular weights between about 20,000 and 350,000 can be obtained by adding about 0.28 to 5.0 millimoles of the RLi initiator per mole of monomers corrected by the factor 100/(MW of monomer).

Multifunctional organolithium initiators may also be used as initiators to prepare branched and radial, linear triblock or multiarm block copolymers with a desired functionality range of 2 to about 30 anionically polymerized polymers chains (arms) per initiator molecule. Multifunctional organolithium initiators are readily prepared by direct addition reaction of a stoichiometric amount of a monofunctional organolithium compound to a polyvinyl compound such as 1,3-diisopropenyl benzene, 1,3,5-triisopropenyl benzene, 1,3-bis(1-phenylethenyl)benzene, 1,3,5-tris(1-phenylethenyl)benzene, 1,3-divinylbenzene, 1,3,5-trivinylbenzene, and the like. Oligomeric polyvinyl compounds may be used to prepare multifunctional organolithium initiators with high functionality. Monofunctional organolithium compounds, such as butyllithium, are examples of commonly used initiators for the above addition reaction. Specific examples of these commonly used initiators include tert-butyllithium, sec-butyllithium, and n-butyllithium. Monofunctional organolithium compounds substituted with protected polar functional groups may also be used to prepare multifunctional organolithium initiators. Multifunctional organolithium compounds may be combined among them and/or with monofunctional organolithium compounds to partially initiate anionic polymerization with the multifunctional organolithium compound. The partial initiation is achieved by controlling the stoichiometric ratio of multifunctional initiator to monofunctional initiator.

Anionic polymerization is typically carried out in inert hydrocarbon solvents at relatively low temperatures under vacuum or an inert atmosphere with highly purified reagents in order to prevent the premature termination of the polymerization reaction. The anionic polymerization reactions may take place in a variety of organic solvents. Examples of suitable solvents include, but are not limited to, pentane, hexane, heptane, octane, cyclopentane, cyclohexane, cycloheptane, benzene, naphthalene, toluene, xylene, methyl ether, methyl ethyl ether, diethyl ether, tetrahydrofuran, acetone, methyl ethyl ketone, and mixtures thereof. Cyclohexane in particular, is well suited for use as the solvent in anionic polymerizations.

The anionic polymerization is normally carried out at temperatures in the range from −100° C. to 150° C., preferably between −75° C. and 75° C. Normally 50 to 90% by weight of a reaction solvent is used to control the viscosity inside the reaction zone, preferably 70 to 85%. Typical residence times for anionic polymerization vary depending on the reaction temperature and initiator level between 0.1 and 5 hours, preferable from 0.2 to 2 hours.

Polar additives that are known in the art and may be used to prepare the counter tapered thermoplastic elastomer compositions of the present invention are Lewis bases such as ethers and tertiary amines, and Group Ia alkali metal alkoxides and combinations thereof. Specific examples of these suitable ether polar additives include monofunctional, multifunctional and oligomeric alkyl and cyclic ethers such as dimethyl ether, diethyl ether, ethyl methyl ether, ethyl propyl ether, di-n-propyl ether, tetramethylene oxide (tetrahydrofuran), 1,2-dimethoxyethane, bis-tetrahydrofuran, ditetrahydrofurylpropane (DTHFP), combinations thereof and the like. Specific examples of these suitable tertiary amine polar additives include monofunctional, multifunctional and oligomeric alkyl and cyclic tertiary amines such as dimethylethyl amine, trimethyl amine, triethyl amine, N, N,N', N'-tetramethyl ethylene diamine (TMEDA), N, N,N', N', N"-pentamethyl diethyl triamine, combinations thereof, and the like. Specific examples of these suitable Group Ia alkali metal alkoxides (lithium, sodium, potassium, rubidium and cesium salts) include monofunctional, multifunctional and oligomeric alkyl and cyclic metal alkoxides such as sodium tert-butoxide, sodium tert-amylate, sodium mentholate, potassium tert-butoxide, potassium tert-amylate, potassium mentholate, combinations thereof, and the like.

The amount of the suitable polar additive is in the range of 0.0005 to 50 weight percentage of the total reaction mixture and is preferably in the range of 0.0005 to 10.0 weight percentage of the total reaction mixture. A more preferred range is about 0.0005 to about 5.0 wt % of total reaction mixture. Most preferred Lewis bases are TMEDA, THF and DTHFP. A more preferred combination is one that combines two Lewis bases (i.e. one ether and one tertiary amine). A preferred combination is one that combines two alkali metal alkoxides (e.g., lithium and sodium, lithium and potassium). Preferred concentrations of polar additive or combination of polar additives depend on the type of polar additive or additives, and the desired monomer sequence length distribution, microstructure and properties of the counter tapered copolymer block [A/B]. The desired properties will, in turn, depend on the intended application of the counter tapered thermoplastic elastomer compositions.

Suitable conjugated dienes for use in building the counter tapered thermoplastic elastomer compositions of the present invention include, but are not limited to, 1,3 butadiene, isoprene, 1,3-pentadiene, methylpentadiene, phenylbutadiene, 2,3-dimethyl-1,3-butadiene, 2,4-hexadiene, 1,3-hexadiene, 1,3-cyclohexadiene, 3,4-dimethyl-1,3-hexadiene, 1,3-octadiene, 4,5-diethyl-1,3-octadiene and combinations thereof.

Preferred conjugated dienes for use in building the counter tapered thermoplastic elastomer compositions of the present invention include, but are not limited to, 1,3 butadiene, isoprene or 2-methyl-1,3-butadiene, 2-ethyl-1,3-butadiene, piperylene or 1,3-pentadiene, methylpentadiene, phenylbutadiene, 2,3-dimethyl-1,3-butadiene, 2,4-hexadiene, 1,3-hexadiene, 1,3-cyclohexadiene, 3,4-dimethyl-1,3-hexadiene, 1,3-octadiene, 4,5-diethyl-1,3-octadiene, B-myrcene or 7-Methyl-3-methylene-1,6-octadiene, β-farnesene or 7,11-Dimethyl-3-methylene-1,6,10-dodecatriene, isomeric mixtures and combinations thereof. These preferred conjugated diene monomers for the counter tapered thermoplastic elastomer compositions of the present invention also include and are not limited to bio-source and/or bio-based conjugated diene monomers, substituted conjugated diene monomers with at least one substituent to modify compatibity and/or reactivity selected from C1-C18 vinyl, alkyl or alkoxy, cycloalkyl and/or aromatic groups, protected functionalized conjugated diene monomers, isomeric mixtures and combinations thereof. The most preferred substituted conjugated diene monomers with at least one substituent to modify compatibity and/or reactivity with C1-C18 vinyl groups are those wherein the substituent has at least one terminal and/or non-terminal vinyl group that increases vinyl configuration units without making the substituent prone to side reactions during polymerization.

Suitable monovinyl aromatic monomers for use in building the novel counter tapered thermoplastic elastomer compositions of the present invention include, but are not limited to, styrene and styrene derivatives such as 3-methylstyrene, α-methyl styrene, p-methyl styrene, α,4-dimethylstyrene, t-butyl styrene, o-chlorostyrene, 2-butenyl naphthalene, 4-t-butoxystyrene, 3-isopropenyl biphenyl, 4-vinylpyridine, 2-vinylpyridine and isopropenyl naphthalene, 4-n-propylstyrene, and combinations thereof.

Preferred vinyl aromatic monomers for use in building the novel counter tapered thermoplastic elastomer compositions of the present invention include, but are not limited to, styrene and styrene derivatives such as 3-methylstyrene, p-methyl styrene or 4-methyl styrene, vinyl toluene, α-methyl styrene or alpha-methyl styrene, α,4-dimethylstyrene, t-butyl styrene, o-chlorostyrene, 2-butenyl naphthalene, 4-t-butoxystyrene, 3-isopropenyl biphenyl, 4-vinylpyridine, 2-vinylpyridine and isopropenyl naphthalene, 4-n-propylstyrene, isomeric mixtures and combinations thereof. These preferred vinyl aromatic monomers for the counter tapered thermoplastic elastomer compositions of the present invention also include and are not limited to bio-source and/or bio-based unsubstituted and substituted vinyl aromatic monomers, protected functionalized unsubstituted and substituted vinyl aromatic monomers including but not limited to hydrosilylated monomers and hydrosilane functional monomers, isomeric mixtures and combinations thereof. Among the substituted vinyl aromatic monomers with at least one substituent selected from C1-C18 vinyl, alkyl or alkoxy, cycloalkyl and/or aromatic groups are various compounds that include but are not limited to: vinyl-substituted styrenes, alkyl-substituted styrenes, alkoxy-substituted styrenes, vinyl napthalene, alkyl-substituted vinyl napthalenes, 1,1-diphenyl ethylene, 1,4-diisopropenyl benzene, 1,4-bis(1-phenylethenyl)benzene, isomeric mixtures and combinations thereof. The most preferred substituted vinyl aromatic monomers with at least one substituent to modify compatibility and/or reactivity with C1-C18 vinyl groups are those wherein the substituent has at least one terminal and/or non-terminal vinyl group that increases vinyl configuration units without making the substituent prone to side reactions during polymerization.

In some embodiments of the methods provided here, the novel counter tapered thermoplastic elastomer compositions undergo total or partial coupling to prepare branched and radial, linear triblock or multiarm block copolymers. Partial coupling means that a portion of the total living anionically polymerized polymer chain-ends undergo coupling with coupling agents. The coupling agents desirably couple between 2 and 30 anionically polymerized polymer chains (arms), although coupling agents capable of coupling a greater number of chains may also be employed. Suitable coupling agents for use in the total or partial coupling step include, but are not limited to, tin halides, silicon halides, functionalized tin compounds, functionalized silicon compounds such as a silane compound and functionalized oligomeric compounds such as the ones listed in U.S. Pat. No. 7,517,934. The entire disclosure of U.S. Pat. No. 7,517,934 is incorporated herein by reference. Silicon tetrachloride, methyltrichlorosilane, dimethyldichlorosilane and tin tetrachloride are specific examples of suitable coupling agents, with silicon tetrachloride and dimethyldichlorosilane being particularly well-suited for this application. The partial coupling is achieved by controlling the stoichiometric ratio of coupling agent to living polymer. The partial coupling may provide a polymer blend with desired properties.

Preferred coupling agents for use in the total or partial coupling step include, but are not limited to, tin halides, silicon halides, tin alkoxides, silicon alkoxides, alkyl-substituted tin and silicon trihalides, alkyl-substituted tin and silicon dihalides, hexahalodisilanes, hexahalo disiloxanes, functionalized tin compounds, functionalized silicon compounds, alkoxy-silane compounds, alkoxy-substituted silicon and tin halides, alkoxy-alkyl-silanes, epoxysilane compounds, amino and/or amine silane compounds, isocyanato silane compounds, methacrylate silane compounds; acrylate silane compounds; sulfur silane compounds, fluoro silane compounds, fluoroalkyl silane compounds, sulfanylsilane compounds, mercaptosilane compounds, sulfide silane compounds, sulfide tin compounds, and functionalized oligomeric compounds such as the ones listed in U.S. Pat. Nos. 3,281,383, 7,517,934 and 8,883,927, multifunctional compounds, mixtures or combinations of the aforementioned compounds. The entire disclosures of U.S. Pat. Nos. 3,281,383, 7,517,934 and 8,883,927 are incorporated herein by reference. Other suitable coupling agents include siloxanes, multifunctional epoxies, esters such as methyl benzoate compounds, epoxidized oils, and polyalkenyl compounds. Polyalkenyl coupling agents as disclosed in, for example, U.S. Pat. Nos. 3,985,830; 4,391,949; and 4,444,953; and Canadian Pat. No. 716,645. Suitable polyalkenyl coupling agents include divinylbenzene, and preferably m-divinylbenzene. Functionalized silicon and tin compounds may be used to attach specific functionalities into the polymer chains of the novel modified diene copolymers including but not limited to chloro-propyl-trialkoxysilanes, trialkyltinchloride and trialkoxytinchloride such as chloro-propyl-triethoxysilane, chloro-propyl-trimethoxy-silane, trimethyltinchloride, trimethoxytinchloride, triethyltinchloride, triethoxytinchloride, trioctyltinchloride, trioctyloxytinchloride, and the like. The coupling agent, combination of coupling agents or mixture of coupling agents may be sequentially, partially, intermittently or continuously added during the polymerization to achieve polydispersity, functionality, asymmetry, and the like. A preferred combination is one that combines two silicon coupling agents such as silicon halide and silicon alkoxide. A more preferred combination is one that combines a silicon compound and a tin compound such as silicon halide and a tin alkoxide. A most preferred combination is one that combines a silicon compound and a functionalized oligomeric compound. The most preferred combination is one that combines a silicon compound, a tin compound and a functionalized oligomeric compound.

In an additional embodiment, the novel counter tapered thermoplastic elastomer compositions undergo total or partial linking to join polymer chains and prepare linear, branched or radial, multiarm or grafted in structure copolymers that retain the living character and are capable of polymerizing remaining or new monomer to prepare miktoarm, hybrid and/or assymetric novel counter tapered thermoplastic elastomer compositions, which include at least one polymer chain (intramolecular) with at least one different characteristic such as composition, microstructure, size, vinyl configuration, and the like. Partial linking means that a portion of the total living anionically polymerized polymer chain-ends undergo linking with linking agents. The linking agents desirably join between 2 and 30 anionically polymerized polymer chains (number of arms), although linking agents capable of linking a greater number of chains may also be employed. Suitable linking agents for use in the total or partial linking step include, but are not limited to, polyvinyl compounds such as 1,3-diisopropenyl benzene, 1,4-diisopropenyl benzene, 1,3,5-triisopropenyl benzene, 1,3-bis(1-phenylethenyl)benzene, 1,4-bis(1-phenylethenyl) benzene, 1,3,5-tris(1-phenylethenyl)benzene, 1,3-divinyl-benzene, 1,4-divinylbenzene, 1,3,5-trivinylbenzene, also substituted polyvinyl compounds with at least one substituent such as alkyl, alkoxy, cycloalkyl, and cycloalkoxy, and the like. Oligomeric polyvinyl compounds may be used as linking agents with high functionality.

Organometallic compounds of different metals from Groups 11a, IIb and IIIa, including magnesium, zinc and aluminum, may be used as polymerization rate modifiers when mixed with alkyllithium initiators. Specific examples of suitable polymerization rate modifiers are dibutyl magnesium, diethyl zinc, triethyl aluminium and combinations thereof. The polymerization rate modifiers may be used to control the temperature profile of polymerization. The polymerization rate modifiers contribute to control a polymerization step in either isothermal mode for a pre-established residence time or quasi-adiabatic mode up to a peak temperature.

In some embodiments of the methods provided here, the novel counter tapered thermoplastic elastomer compositions are polymerized in batch, programmed-batch and/or semi-batch processes. As one of skill in the art would recognize, the described synthesis of the counter tapered thermoplastic elastomer compositions can occur in a reaction setting comprising a process operated at temperatures, solvent ratios and stream flow rates necessary to reach the described residence time and stoichiometry conditions.

Applications

Other aspects of the invention provide compositions and articles made from the novel counter tapered thermoplastic elastomer composition, reinforced materials made from a mixture of the novel counter tapered thermoplastic elastomer composition with a material to be reinforced and articles made from the reinforced materials. Other aspects of the invention provide novel counter tapered thermoplastic elastomer composition, and their blends with other block copolymers, with enhanced adhesion to specific substrates and articles made from the adhesion enhanced materials. The novel counter tapered thermoplastic elastomer composition achieves a better balance between processability and reinforcement performance for various asphalt, adhesive and sealant applications. The novel counter tapered thermoplastic elastomer compositions provide the above mentioned applications with easy processing advantages such as short dispersion time, low mixing temperature, low viscosity, excellent storage stability, and better reinforcement advantages such as high elastic response, wide range of performance grade, high adherence, higher filler loading capacity, and better compromise between high and low temperature properties. These processability and reinforcement advantages make the novel counter tapered thermoplastic elastomer compositions suitable to meet the requirements for a broad range of applications such as road paving, roofing, shingles, waterproofing membranes, adhesive tapes and labels, contact and sprayable adhesives, and sealants.

Among the desired commercial applications, some of the novel counter tapered thermoplastic elastomer compositions provided herein are well suited for use as adhesives and sealants, including pressure sensitive adhesives, non-pressure sensitive adhesives, hot melt adhesives, hot melt and solvent-based mastics and sealants. The counter tapered thermoplastic elastomer compositions may also be designed for use as compatibilizing or reinforcing agents in asphalt and in polymer blends. Asphalts which may benefit from the compatibilizing or reinforcing agents provided herein include those commonly used for road paving, roofing and sealant applications. Paving applications include reinforcement of asphalt cements/binders used for making asphalt concrete for road construction, as well as modification of materials for road rehabilitation, repair and maintenance, including chip sealing, resealing, resurface and recycling. Roofing applications include reinforcement of roof shingles, as well as modification of materials for roof waterproofing, repair and maintenance. Certain types of counter tapered thermoplastic elastomer compositions may also be used as reinforcing agents, viscosity modifiers, flow modifiers, processing aids and impact modifiers in rubbers and plastics. Non-polar plastics are types of plastic that may benefit from the counter tapered thermoplastic elastomer compositions. Non-polar plastics include, but are not limited to polyolefins, polystyrene and copolymers thereof.

As one of skill in the art would recognize, the optimal characteristics and properties of the counter tapered thermoplastic elastomer compositions will depend on the intended application. Several exemplary applications for the counter tapered thermoplastic elastomer compositions are provided below. These applications are provided only for illustrative purposes and are not intended to limit the scope of the invention.

Asphalt Reinforcement:

Asphalt modification with high molecular weight elastomers is typically used to prepare modified asphalt binders with improved performance over unmodified asphalt binders. Performance properties of asphaltic products that are improved with the addition of polymers are: a) flexibility at low temperatures; b) resistance to flow and deformation at high temperatures; c) temperature susceptibility; d) tensile strength; e) stiffness modulus at high temperatures; f) asphalt-aggregate adhesion; g) resistance to surface abrasion. Asphaltic products that benefit from modification with polymers are pavement binders, seal coats, highway joint sealants, waterproofing membranes, coatings, pipeline mastics, pipeline wrapping tapes, and others.

Since high molecular weight polymers have the tendency to be immiscible with asphalt, asphalt modification with elastomers based on monovinyl aromatic and conjugated diene monomers is complicated by limited phase stability, which results in asphalt-polymer separation that negatively affects the performance properties of the asphaltic products. Phase stability has been typically improved by either cross-linking the asphalt-polymer blend or by increasing the compatibility of the polymer with asphalt. High molecular weight polymers also adversely affect the processing characteristics of the modified asphalt binders by significantly increasing the melt viscosity of the asphalt-polymer blends. Modification of polymer composition and/or structure in prior art has been used to improve processing characteristics and reduce the cost of asphalt-polymer blends, but often performance properties are unfavorably modified.

The inventors have discovered that the addition of the counter tapered thermoplastic elastomer compositions provided herein into asphalt maximizes the processing characteristics, without diminishing the performance properties of the modified asphalt, when compared to modified asphalt formulated with prior art copolymers. The counter tapered thermoplastic elastomer compositions of the present invention provide the asphalt blends with lower melt viscosity and high flow; increased dispersibility and compatibility; higher blend stability; and good elastomeric and thermoplastic properties. It has also been discovered that the counter tapered thermoplastic elastomer compositions of the present invention can be used as compatibilizing or reinforcing agents. Asphalts which may benefit from the compatibilizing or reinforcing agents provided herein include those commonly used for road paving, roofing and sealant applications. Paving applications include reinforcement of asphalt cements/binders used for making asphalt concrete for road construction, as well as modification of materials for road rehabilitation, repair and maintenance, including chip sealing, resealing, resurface and recycling. Roofing applications include reinforcement of roof shingles, as well as modification of materials for roof waterproofing, repair and maintenance.

The inventors have also discovered that emulsions of asphalt previously modified with the counter tapered thermoplastic elastomer compositions of the present invention improve asphalt adherence to aggregate particles when used for road rehabilitation, repair and maintenance. It has also been discovered that the compatibilizing or reinforcing agents provided herein can be encapsulated and blended with commercially available block copolymers to improve phase stability and processing characteristics of the modified asphalt blend.

In countries such as the United States, modified asphalts are evaluated according to the standards of the American Association of State Highway and Transportation Officials (AASHTO), which rates asphalts according to performance grade (PG). The standards of the American Society for Testing and Materials (ASTM) are also used for asphalt evaluation. Among the properties evaluated in modified asphalts are the following:

a) Ring and ball softening point (RBSP), which may be measured in accordance with ASTM D 36, which indicates the temperature at which asphalt softens and becomes unsuitable for the subject application. The softening point or temperature is taken using a Ring and Ball apparatus, also known as R&B apparatus.

b) Penetration at 25° C., which is a parameter related to the rigidity of the modified asphalt. Penetration may be measured in accordance with ASTM D5 as the distance a weighted needle or cone will sink into the asphalt during a set period of time.

c) Brookfield Viscosity, which is a property relating to the stable stationary flow of asphalt. Brookfield Viscosity may be measured in accordance with ASTM D4402.

d) Resilience is a property that measures the elasticity of an asphalt material. Resilience may be measured in accordance with ASTM D 113.

e) Rutting factor: $G^*/\sin \theta$ at various temperatures (wherein $G^*$ is the complex modulus and $\delta$ is the phase angle) is useful for determining the performance of modified asphalt at high temperatures. This factor indicates how resistant a pavement is to the permanent deformation that can occur over time with repeated loads at high temperature, or when the pavement is subjected to a load much greater than the maximum allowed in the original design. Therefore, higher Rutting factor values at high temperatures indicate that the asphalt can withstand greater deformation than materials that have lower Rutting factors at the same test temperature. The Rutting factor may be measured in accordance with AASHTO TP5.

f) Upper temperature limit. By determining the Rutting factor, it is possible to determine the upper temperature limit in accordance with AASHTO standards. The upper temperature limit relates to the maximum temperature at which the asphalt may retain adequate rigidity to resist rutting.

g) Lower temperature limit. By determining the Rutting factor, it is possible to determine the lower temperature limit in accordance with AASHTO standards. The lower temperature limit relates to the minimum temperature at which the asphalt may retain adequate flexibility to resist thermal cracking.

h) Phase segregation is a critical factor in the modification of asphalt with elastomers, due to the aforementioned problems. The phase separation index is measured as the percent difference between the TRBSP measured at the top and bottom surfaces of a cylindrical probe, made in the interior of a sealed tube containing the formulated asphalt and aged at 163° C. for 48 hours in a vertical position without agitation, and frozen at 30° C. The percentage difference in TRBSP provides a measure of the compatibility between the asphalt-rich phase and the polymer-rich phase in an asphalt/polymer blend.

Two specific applications for which the reinforced asphalts may be used are road paving applications and roofing/waterproof coating applications. In some instances when the reinforced asphalt is used in a road paving application, 0.5 to 8 parts of the counter tapered thermoplastic elastomer compositions of the present invention, preferably 2 to 5 parts, may be mixed with 99.5 to 92 parts, preferably 98 to 95 parts, of an asphalt to improve the performance characteristics thereof. In some instances when the reinforced asphalt is used in a roofing or waterproof coating application, 3 to 25 parts of the counter tapered thermoplastic elastomer compositions of the present invention, preferably 6 to 16 parts, may be mixed with 97 to 75 parts, preferably 94 to 84 parts, of an asphalt to improve the performance characteristics thereof. Suitable asphalts for use with the counter tapered thermoplastic elastomer compositions of the present invention include, but are not limited to, PG 64-22 asphalt or other asphalt widely used in road paving and roofing applications such as native rock asphalts, lake asphalts, petroleum asphalts, air-blown asphalts, cracked asphalts, and residual asphalts.

In certain embodiments of the invention, the much lower viscosity of the asphalt formulations prepared with the counter tapered thermoplastic elastomer compositions provided herein, besides contributing to improve the dispersion into the asphalt, also facilitates the processing, handling and application of the modified asphalt blends by improving pumping capacity and/or decreasing the energy required to apply it. This also means an important cost reduction and a more environmentally-friendly process. The high softening point temperature of the asphalt modified with the counter tapered thermoplastic elastomer compositions of the present invention should provide a much better resistance to flow and deformation at high temperatures. Surprisingly, the asphalt modified with the counter tapered thermoplastic elastomer compositions of the present invention and formulated with low polymer content, provide similar performance properties (TRBSP) and lower viscosity than the asphalt modified with prior art commercially available polymers. This also means an important cost reduction and an energy-saving process.

In another embodiment of the invention, an asphalt and/or bituminous composition formulated with a fully-coupled counter tapered thermoplastic elastomer composition having a linear structure (A-[A/B])-X-([B/A]-A) and/or a coupled radial and/or multiarm structure (A-[A/B]) n-X, may provide improved performance properties such as high softening point temperature (TRBSP), which means a much better resistance to flow and deformation at high temperatures. The asphalt and/or bituminous composition modified with the fully-coupled counter tapered thermoplastic elastomer composition of the present invention can be formulated with low polymer content and may provide similar performance properties (i.e., TRBSP) and lower viscosity than the asphalt and/or bituminous composition modified with prior art commercially available polymers. This may also mean an important cost reduction and an energy-saving process.

In certain embodiments of the invention, the counter tapered thermoplastic elastomer compositions provided herein may confer asphalt compositions with one or more of the following properties: a) maximum application temperature of about 50 to 100° C., measured as the temperature at which the Rutting Factor or Dynamic Shear Stiffness (G*/sin 0) takes a value of 1.0 KPa (measured as per AASHTO TP5); b) TRBSP (measured as per ASTM D36) of about 40 to 110° C.; c) asphalt penetration at 25° C. (as per ASTM D5) of about 30 to 75 dmm for road paving applications or about 50 to 100 for roofing and waterproof coating applications; and d) dynamic viscosity at 135° C. of about 500 to 3000 cP and desirably 1000 to 2000 cP for road paving applications or at 190° C. of about 1000 to 6000 cP and desirably 1500 to 4000 cP (as per ASTM D4402) for roofing and waterproof coating applications.

Adhesives, Sealants and Coatings:

High molecular weight elastomers are typically formulated in blends useful as adhesives, sealants and coatings to provide cohesive strength and adequate balance for each application between adhesive and cohesive properties. Elastomers based on monovinyl aromatic and conjugated diene monomers are extensively used as pressure-sensitive adhesives, spray and contact adhesives, panel and construction mastics, sealants and coatings. Isoprene-containing elastomers are preferred for hot melt pressure sensitive adhesives because they can be readily tackified at low cost. Butadiene-containing elastomers are generally preferred for construction or laminating adhesives because they can provide stiffness and cohesive strength. Hydrogenated versions of these elastomers are preferred for sealants because of their higher weather resistance. Performance properties that are required for successful formulation of adhesives, sealants and coatings products with elastomers are the following: a) tackifying resin compatibility with elastomer; b) continuous elastomer phase morphology for cohesive strength and shear resistance; c) soft and low modulus elastomer for tack development and energy dissipation; d) suitable tackifying resin that raises the glass transition temperature (Tg) of rubbery phase of the elastomer for increasing dissipation of strain energy.

High molecular weight polymers of the prior art adversely affect the processing characteristics of the adhesives, sealants and coatings formulations by significantly increasing the melt and solution viscosity of these blends. Modification of polymer composition and/or structure in prior art has been used to improve processing characteristics and to reduce the cost of formulations for adhesives, sealants and coatings applications, but often performance properties are unfavorably modified. Among the desired commercial applications, some of the novel counter tapered thermoplastic elastomer compositions provided herein are well suited for use as adhesives, sealants and coatings, including pressure sensitive adhesives, non-pressure sensitive adhesives, hot melt adhesives, hot melt and solvent-based mastics, sealants and coatings. The development of low melt viscosity and low solution viscosity is particularly important for pressure-sensitive adhesives, hot melt adhesives and solvent-based adhesives. The inventors have discovered that the addition of the novel counter tapered thermoplastic elastomer compositions provide outstanding processing characteristics to formulations without significantly affecting the desired performance properties of adhesives, sealants and coatings products. Remarkably, hot melt pressure sensitive adhesives prepared with these novel counter tapered thermoplastic elastomers show higher compatibility with various resins and excellent cohesive strength and extremely high shear resistance. It has also been discovered that the compatibilizing or reinforcing agents provided herein can be encapsulated and blended with commercially available block copolymers to improve phase stability and processing characteristics of the adhesive blends.

In some such applications, about 10 to 40, desirably 15 to 30, and more desirably 18 to 25, parts by weight of the novel counter tapered thermoplastic elastomer compositions, or its mixtures with commercially available block copolymers, are mixed with other conventional adhesive formulation components/additives, such as tackifying resins; plasticizers; coupling agents; crosslinking agents; photoinitiators; fillers; processing aids; stabilizers and antioxidants to confer such compositions with improved properties compared to adhesives formulated with prior art elastomers as suitable controls. Examples of suitable tackifiers include resins with high and low softening points which are compatible with the polymer. These include hydrogenated resins, rosin esters, polyterpene resins, terpene phenol resins, indene-coumarone resins and aliphatic hydrocarbon resins. In some illustrative embodiments, the amount of tackifying resins in the composition ranges from about 40 to 65% by weight. Plasticizers, generally known as extending oils, include mineral oils, paraffinic oils, and naphthenic oils. In some illustrative embodiments, the amount of plasticizer in the composition ranges from about 15 to 35% by weight. The antioxidants may be used to inhibit the thermal and UV oxidation processes, and are typically added to the adhesive composition in amounts of about 0.05 to 3% by weight. Examples of antioxidants include phenol compounds, phosphites, amines, and thio compounds. Some examples of commercially available adhesive components/additives are listed in Table A below.

In another embodiment of the invention, an adhesive composition formulated with a fully-coupled counter tapered thermoplastic elastomer composition having a linear structure (A-[A/B])-X-([B/A]-A) and/or a coupled radial and/or multiarm structure (A-[A/B]) n-X, may provide improved performance properties such as high softening point temperature (TRBSP) and high shear adhesive failure temperature (SAFT), which means high heat resistance and a much better resistance to flow and deformation at high temperatures. The adhesive composition with the fully-coupled counter tapered thermoplastic elastomer composition of the present invention can be formulated with lower polymer content, and may provide similar performance properties (i.e., TRBSP) and lower viscosity than the adhesive composition formulated with prior art commercially available polymers. This may also mean an important cost reduction and an energy-saving process.

TABLE A

Commercially Available Adhesive Components/Additives

RESINS

| Rosin esters: | Styrenated Terpenes: | Polyterpene resins: | Terpene phenolics: |
| --- | --- | --- | --- |
| Sylvalite RE115 | Sylvares ZT105LT | Sylvares TR7115 | Sylvares TP115 |
| Sylvalite RE85L | Sylvares ZT115LT | | |
| Foral 85 | | | |
| Foral 105 | | | |
| Pentalyn H | | | |
| Permalyn 3100 | | | |

| Aliphatic Hydrocarbon resins: | Hydrogenated Hydrocarbon Resins: |
| --- | --- |
| Piccotac 1100 | Eastotac H100 |
| Piccotac 115 | Eastotac H130 |
| Wingtack 95 | |

PLASTICIZERS

| Naphthenic | Parafinic |
| --- | --- |
| Shellflex 371 | Shellflex 210 |
| Shellflex 3271 | Shellflex 270 |
| RPO-104C | Shellflex 330 |
| | Primol 352 |
| | RPO-138 |
| | P.OIL 50 |

ANTIOXIDANTS

| Phenolic | Phosphite | Thio | Blends |
| --- | --- | --- | --- |
| Irganox 1010 | Alkanox TNPP | Lowinox DSTDP | Ultranox 877A |
| Irganox 1076 | Alkanox 240 | | |
| Irganox 565 | Ultranox 626 | | |
| Irganox 1520 | Weston 618F | | |
| Irganox 1098 | | | |
| Anox 20 | | | |
| Ultranox 276 | | | |

The Sylvalite, Sylvares and Wingtack products in Table A are available from Arizona Chemical. The Foral, Pentalyn, Permalyn, Piccotac and Eastotac products are available from Eastman/Hercules. The Shellflex products are available from Shell. Primol 352 is available from Esso or Exxon-Mobil. The RPO and P.Oil products are available from IPISA or Ingenieria y Procesos Industriales, S.A. The Irganox products are available from Ciba Specialty Chemicals, Inc. The Anox, Alkanox and Lowinox products are available from Great Lakes Chemical Corporation. The Ultranox and Weston products are available from GE Specialty Chemicals.

The novel counter tapered thermoplastic elastomer compositions provide adhesive, sealant, and coating applications with reactive sites susceptible to modification and cross-linkable moieties that allow photo-, thermal- and chemical-cured crosslinking. The reactive sites may directly perform crosslinking of the novel counter tapered thermoplastic elastomer compositions and/or may be amenable to further functionalization that facilitates crosslinking under more suitable mild conditions during the application. The novel reactive adhesive, sealant, and coating compositions comprising the counter tapered thermoplastic elastomer compositions of the present invention can be made and cured by any suitable method known in the art, such as those described in U.S. Pat. Nos. 8,703,860; 7,799,884; 7,432,037; 6,926,959, 5,804,663, and 4,306,049; and E.U. U.S. Pat. No. 97,307, which are incorporated herein in their entirety by reference. Reinforced materials containing either the counter tapered thermoplastic elastomer compositions or the polymer blends and mixtures containing the counter tapered thermoplastic elastomers achieve a tailored compatibility and reactivity, and an improved balance between processability and reinforcement performance for various applications such as adhesives, sealants, and coatings. The novel counter tapered thermoplastic elastomer compositions and their polymer blends and mixtures with other suitable polymers are useful for pressure and non-pressure sensitive, hot melt and solvent based formulations for taping, labeling, packaging, construction and positioning adhesive end-use applications, including solvent-based mastics and sealants. The novel counter tapered thermoplastic elastomer compositions are useful for low viscosity and reactive hot-melt adhesive compositions, particularly for sprayable and contact adhesives with high heat resistance, low energy processibility, and low emission of volatile organic compounds (VOCs) relative to solvent-based formulations. More specifically, the novel counter tapered thermoplastic elastomer compositions provide the adhesives, sealants, and coatings applications with: tailored compatibility with formulation ingredients, reactive sites susceptible to modification, and cross-linkable moieties that allow photo-, thermal- and chemical-cured crosslinking; easy processing advantages such as low mixing temperature and low application temperature; and good reinforcement advantages such as high heat resistance, high cohesive strength and shear resistance, high tack and peel resistance.

The novel adhesive compositions comprising counter tapered thermoplastic elastomers of the present invention may be radiation curable, which are amenable to a variety of end-uses including but not limited to pressure sensitive adhesives for high performance tapes and labels such as freezer-grade tapes and labels and automotive adhesives; and adhesive applications to wet surface such as medical applications. The novel adhesive composition of the present invention may further comprise at least one second polymer in combination with the counter tapered thermoplastic elastomer composition. Examples of useful commercially available second block copolymers include but are not limited to Solprene®, Calprene® and Calprene® H block copolymers, Kraton® D and G series block copolymers, Europrene® Sol T block copolymers, Vector® block copolymers, as well as others. The novel counter tapered thermoplastic elastomer compositions and the second block copolymer may have increased vinyl configuration units in at least one conjugated diene homopolymer or copolymer block or segment to be even more radiation sensitive and curable to further contribute to adhesive properties such as high heat resistance and high shear resistance. Preferred second block copolymers for the novel adhesive compositions comprising counter tapered thermoplastic elastomers of the present invention comprise at least one styrene-isoprene-styrene (SIS) block copolymer having a styrene content of less than about 25 wt % to improve tack while maintaining high heat resistance such as high shear adhesive failure temperature (SAFT) and/or high Ring and Ball softening point temperature (TRBSP).

The novel adhesive, sealant and coating compositions comprising counter tapered thermoplastic elastomers of the present invention that may be radiation curable can be formulated with suitable photoinitiators to generate cross-linking and/or polymerization initiating radicals when the photoinitiator is irradiated with a source of light. The suitable photoinitiators include but are not limited to photoinitiators classified into photo-cleavage photoinitiators and H-abstraction photoinitiators according with the pathways by which the effective initiating radicals are generated. Hydrogen-donor sources for H-abstraction photoinitiators include amines, thiols, unsaturated rubbers such as polybutadiene or polyisoprene, and alcohols. In radiation-curable compositions, crosslinking occurs by exposure to ultraviolet radiation and/or ionizing radiation created by the emission of electrons or highly accelerated nuclear particles such as neutrons, alpha-particles, and the like. The light absorbing chromophores used in the photoinitiator system are chosen to match as closely as possible the emission bands of the light source. The chromophores present in the photoinitiators renders them sensitive to ultraviolet and/or visible irradiation and thus capable of initiating and/or participating in crosslinking upon exposure to such a source of light. Suitable photoinitiators containing chromophores compounds that undergo H-abstraction photochemistry include but are not limited to benzophenone and related aromatic ketones such as xanthone, thioxanthone, 4,4'-bis(N,N'-dimethylamino)benzophenone, benzil, quinones, quinoline, anthroquinone, fluorene, acetophenone, xanthone, phenanthrene and fluorenone. Suitable photoinitiators may typically be used in amounts of from about 0.05 wt % to about 10 wt % of the formulated composition, preferably in amounts ranging from about 0.2 wt % to about 3 wt %, more preferably from about 0.5 wt % to about 1.5 wt %. The specific amount of the suitable photoinitiator useful in the formulation is dependent on the polymeric composition, as well as the source of radiation, the amount of radiation received, the production line speed, and the thickness of the adhesive, sealant or coating composition on the substrate.

In additional embodiments, the adhesive, sealant or coating composition compositions of the present invention may be crosslinked by ultraviolet (UV) or electron beam (EB) radiation in air or nitrogen atmospheres by exposing to ultraviolet radiation having a wavelength within the range of 180 to 400 nm, preferably 200 to 390 nm, for a time sufficient to accomplish the desired amount of crosslinking. It is important to match the UV light emission wavelength to the adsorption wavelength of the photoinitiator. The exposure time is dependent upon the nature and intensity of the radiation, the specific ultraviolet photoinitiator and amount used, the polymer system, the thickness of the film, environmental factors, and the distance between the radiation source and the adhesive film. Irradiation may be carried out at any temperature, and most suitably is carried out at room temperature. For UV curing compositions, one or more photoactive initiators and/or photoactive coupling agents may be added to the adhesive, sealant or coating compositions of the present invention. To cure the adhesive, sealant or coating composition of the present invention, a source of actinic radiation of sufficient energy may be used to generate free radicals when incident upon the specific photoinitiator selected for use in the composition. The preferred wavelength ranges for the photoinitiators is 400 to 250 nm. Suitable photocure processes are disclosed in U.S. Pat. Nos. 4,181,752 and 4,329,384, which are incorporated herein by reference. Alpha-cleavage type photoinitiators are known in the art. Commercial examples include but are not limited to Irgacure 184 and Darocur 1173. Preferred radical type photoinitiators include but are not limited to acylphosphine oxides, bisacrylphosphine oxides, combinations and mixtures thereof. Useful commercially available examples include but are not limited to Irgacure® 819, Irgacure® 1800, and Irgacure® 1850; and Lucirin TPO. For electron-beam (EB) radiation curing, photoactive coupling agents may not be needed to crosslink the adhesive, sealant or coating compositions comprising the counter tapered thermoplastic elastomer of the present invention. The compositions of the invention may also be cured by means of electron-beam (EB) radiation without using photoinitiators. The dosage needed to crosslink the compositions may vary depending on the specific composition but generally ranges from about 1 to about 20 Mrads, preferably from about 2 to about 10 Mrads. Suitable processes for electron-beam (EB) curing can be found in U.S. Pat. No. 4,533,566, which is incorporated herein by reference. The radiant energy density and thus, the line speed for sufficient curing is dependent on the composition and more importantly the thickness of the adhesive film being cured.

The radiation curable hot melt adhesive, sealant and coating compositions of the present invention comprising a novel counter tapered thermoplastic elastomer composition and/or a second block copolymer with increased vinyl configuration units in at least one conjugated diene homopolymer or copolymer block or segment to be even more radiation sensitive and curable to further contribute to reinforcement performance properties such as high heat resistance and high shear resistance, further comprising at least one of the conventional ingredients in a typical formulation such as tackifying resin, extender oil and/or plasticizer, petroleum derived waxes, antioxidant, photosensitizer (in case of UV irradiation curing), and optionally a resin which is compatible with the vinyl aromatic block or segment, may be cured by exposure to high energy ionizing radiation such as electron beam radiation or by UV radiation. The crosslinking reaction is conveniently effected at room temperature, but it can be conducted at depressed or elevated temperatures, under an inert atmosphere to prevent interference in the block copolymer crosslinking at an exposed surface, or by irradiation through the release paper or the substrate to protect the exposed surface. The exposure to UV irradiation may be performed by any known method. A suitable method is exposing a sample either in a layer obtained from a hot melt or in a layer obtained by solvent coating to UV irradiation by passing said sample at a certain speed underneath the UV source. Preferred uses of the present formulation are in the preparation of pressure-sensitive adhesive tapes and in the manufacture of labels. The backing sheets may be a plastic film, paper, or any other suitable materials and the tape may include various other layers or coatings, such as primers, release coatings, and the like, which are used in the manufacture of pressure-sensitive adhesive tapes.

In another aspect of the invention, the novel counter tapered thermoplastic elastomer compositions may be useful for radiation cured hot melt pressure sensitive adhesive, radiation cured sealant and radiation cured coating compositions, and to articles of manufacture comprising the cured adhesive, sealant and/or coating compositions. Suitable photoinitiators may be used to prepare pressure sensitive hot melt adhesives, sealant and coating compositions that include but are not limited to decorative and abrasion resistant coatings, lacquers, fiber reinforced composites, microelectronic encapsulations, die-attach, fiber optic coatings, molding compounds, UV-set structural resins and the like. Suitable base resins for use in formulating the adhesives, sealants and coating compositions of the present invention are well known to those skilled in the art. The adhesives, sealants and coating compositions of the present invention may be formulated with liquid or solid olefinically unsaturated systems, such as acrylates, methacrylates, maleimides, styrenics, maleate esters, fumarate esters, unsaturated polyester resins, alkyl resins, polyisoprene, polybutadiene and thiol-ene compositions.

Other aspects of the invention provide reinforced materials compositions comprising the novel hot melt adhesive, sealant or coating compositions containing the counter tapered thermoplastic elastomers of the present invention, and articles made from the reinforced materials compositions. In one embodiment, the article comprises the novel hot melt adhesive, sealant or coating composition and a substrate. In another embodiment, the substrate comprises a plastic film, an elastomeric fiber, a nonwoven material, a packaging material, or a construction material such as: shoe sole material, furniture material and bookbinding material. Articles of the invention include but are not limited to disposable nonwoven such as femine pads and disposable elastic articles such as diapers, and pressure sensitive adhesive articles such as repositionable/removable tapes and labels, low/freezing temperature tapes and labels, and automotive protector films. In another embodiment, the novel hot melt adhesives of the invention are also useful as construction adhesives, e.g., for the manufacture of disposable goods, are particularly well suited for use in elastic attachment applications, and may advantageously be used in pressure sensitive end-use applications such as label and tape applications, particularly at low/freezing temperature. The novel hot melt adhesives of the invention are thus particularly useful in making elastic nonwovens and in the fabrication of baby diapers, training pants, adult incontinence briefs or undergarments, and the like. Nonwovens are used commercially for disposable articles such as diapers, adult incontinent products and sanitary napkins.

The invention will be further described by reference to the following examples which are presented for the purpose of illustration only and are not intended to limit the scope of the invention.

EXAMPLES

Example 1

Preparation of Counter Tapered Thermoplastic Elastomers (CTTE)

In Example 1, several novel counter tapered thermoplastic elastomers (CTTE 1-19) were prepared according to the process claimed in the present invention. Polymers CTTE 1-14 and 17 were (A-[A/B]) n-X block copolymers wherein the A-[A/B] diblock prior to coupling consisted of a monovinyl aromatic homopolymer block A block that was a polystyrene block (PS) and a counter tapered copolymer block [A/B] that was a styrene/butadiene copolymer block, which after coupling formed a [A/B]-X-[B/A] midblock having terminal regions that are rich in styrene units and a center region that is rich in butadiene units. CTTE 15, 16, 18, and 19 were polymers with only a counter tapered copolymer block [A/B] of styrene/butadiene prepared for illustrative purposes of the monomer distribution of the midblock copolymer chain prior to coupling.

The novel counter tapered thermoplastic elastomer (CTTE) compositions were characterized by GPC, 1H NMR and DSC methodologies to determine: molecular weight averages and molecular weight distribution characteristics such as peak molecular weight (Mp) for linear diblocks and coupled modes, weight average molecular weight (Mw) and Diblock to Coupled Ratios; microstructural characteristics such as Total Styrene, Block Styrene, and Vinyl A/B block contents; and glass transition temperatures (Tg) for A/B counter tapered copolymer block. In addition, calculations of the Midblock Styrene and Midblock Blockiness were performed following the method used to characterize the polymer mid or "B" block as Calc. Mid PSC and Calc. Mid Blocky in US 2003/0176582 A1 patent application publication on Sep. 18, 2003 by KRATON Polymers U.S. LLC and Bening et al. Tables 1-2 enlist the analytical characterization results and Table 3 the polymerization conditions for CTTE 1-19. The following describes the general procedure used to prepare these novel counter tapered thermoplastic elastomers (CTTE) and to control the monomer distribution in the anionic copolymerization of 1,3-butadiene (B) and styrene (S) in the presence of ditetrahydrofurylpropane (DTHFP) as a suitable polar modifier and randomizing agent for the styrene/butadiene [S/B] counter tapered copolymer block. The abbreviations used in Table 3 below for the polymerization conditions are defined as follows: CHx=cyclohexane; STY=styrene; and BD=1,3-butadiene. For the novel counter tapered thermoplastic elastomers CTTE 1-14 and 17, silicon tetrachloride (SiCl4) was used as a coupling agent.

The novel counter tapered thermoplastic elastomer (CTTE 1-19) compositions of the present invention were prepared in a 5.3 Liter reactor system operated under inert nitrogen atmosphere in batch and/or semi-batch mode according to the teachings of this invention. Immediately before addition to the reactor system, solvent and monomers were thoroughly purified to decrease their moisture content to a maximum of 5 ppm by flowing through a set of columns packed with alumina and molecular sieves. For the first polymerization step, an appropriate amount of purified solvent (CHx) was charged into the reactor and heated to the initial reaction temperature (Ti) from about 60 to about 65° C. Once Ti was reached, a suitable polar modifier (randomizing agent) such as ditetrahydrofurylpropane (DTHFP) was added into the reactor followed by a first addition of monovinyl aromatic monomer (1st STY) of from about 0 to about 17.5 wt % of total monomer mixture. For CTTE 15, 16, 18 and 19, there was no first addition of styrene monomer in order to prepare isolated styrene/butadiene counter tapered copolymer blocks to analyze directly the Midblock Styrene, the Midblock Blockiness and the monomer distribution along the copolymer chain of the [A/B] counter tapered copolymer block by 1H NMR without the calculations needed to eliminate the interference of the monovinyl aromatic homopolymer block A (PS block) in CTTE 1-14 and 17, which was enabled by taking aliquots throughout the copolymerization and then performing NMR characterization. This reaction mixture was allowed to stabilize at Ti, and then n-butyllithium or another suitable initiator was added in a suitable solvent solution directly into the reactor mixture containing at least the amount of polar modifier necessary to efficiently initiate the anionic polymerization of the living polystyrene blocks. The amount of initiator was stoichiometrically calculated as described in the literature to form individual blocks with the desired molecular weight and to compensate for residual impurities. This first polymerization step was then allowed to proceed adiabatically up to complete conversion to form the monovinyl aromatic homopolymer block A with peak molecular weight Mp about a target value of about 10,000.

For the second polymerization step, the addition of both monomers was simultaneously initiated, a second monovinyl aromatic monomer (2nd STY) addition of about 7.5 to about 9.1 wt % of total monomer mixture was rapidly charged into the reactor at a specified dose rate during a predetermined dosification time of about 1 min, and a conjugated diene monomer (BD) addition of about 75.0 to about 90.9 wt % of total monomer mixture was slowly charged into the reactor at a specified dose rate for a predetermined dosification time of from about 4 min to about 11 min. These monomer additions were carried out in a programmed batch and/or semi-batch mode, and the amount of polar modifier (randomizing agent) was adjusted from about 0.002 to about 0.013 wt % of total reaction mixture, in order to promote the formation of a statistically distributed tapered S/B copolymer block with gradual change in composition and vinyl microstructure (1,2-addition) along the copolymer chain. This second polymerization step was then allowed to proceed adiabatically up to complete conversion and the final peak temperature (Tp) was allowed to increase to from about 100 to about 105° C., thereby forming the counter tapered copolymer [A/B] block and thus obtaining the living counter tapered A-[A/B] diblock copolymer with peak molecular weight Mp about a target value of from about 104,000 to about 122,000.

Finally, a suitable coupling agent such as silicon tetrachloride (SiCl4) in a sufficient amount of from about 0.003 to about 0.008 of total reaction mixture was added to the reactor to partially couple the living counter tapered A-[A/B] diblock copolymer to obtain the desired ratios of uncoupled linear diblock A-[A/B] to coupled radial (A-[A/B]) n-X counter tapered thermoplastic elastomer compositions of the present invention, wherein X is the residual moiety (Si) from the coupling reaction process. The remaining living polymer chains were terminated by adding a 10 mol % excess over the stoichiometric amount of a suitable alcohol to the final reaction mixture.

Tables 1 and 2 list the analytical characterization results for the novel counter tapered thermoplastic elastomer compositions CTTE 1-19. All the average molecular weights (Mp and Mw) are given in units of 1000 (k) and calculated relative to polystyrene standards by GPC. The peak average molecular weights Mp for the monovinyl aromatic homopolymer block A or polystyrene block of CTTE 1-14 and 17 are from about 9.5 to about 11 kg/mol. The peak average molecular weights Mp for the A-[A/B] diblock copolymer or S-[S/B] styrene-butadiene diblock copolymer of CTTE 1-14 and 17 are from about 104 to about 122 kg/mol. The peak average molecular weights Mp for the [A/B] counter tapered copolymer or [S/B] styrene-butadiene copolymer of CTTE 15, 16, 18 and 19 are from about 94 to about 108 kg/mol. The ratios of Mp of coupled radial (A-[A/B]) n-X to Mp of uncoupled linear diblock A-[A/B] of CTTE 1-14 and 17 are from about 3.3 to about 3.5. The weight average molecular weights Mw of CTTE 1-14 and 17 are from about 178 to about 267 kg/mol. The ratios of uncoupled linear diblock A-[A/B] to coupled radial (A-[A/B]) n-X of CTTE 1-14 and 17 are from about 0.6 to about 2.8, which is the coupling efficiency as determined from GPC area. The vinyl [A/B] block contents of CTTE 1-19 are from about 13.7 to about 33.0 wt % based on total butadiene units. The glass transition temperatures of the [A/B] counter tapered copolymer block of the CTTE 6, 9, and 14-19 are from about-82.0 to about −71.9° C. The contents determined by NMR of CTTE 1-14 and 17 for: total styrene based on total copolymer are from about 23.2 to about 25.4 wt %; block styrene based on total styrene units are from about 68.8 to about 83.6 wt %; midblock styrene based on midblock copolymer are from about 7.9 to about 10.7 wt %, and midblock blockiness based on midblock styrene units are from about 12.1 to about 55.1 wt %.

FIGS. 1, 2, 3 and 4 depict the monomer distribution in [A/B] midblock segment prior to coupling of inventive counter tapered block copolymers CTTE 14, 16, 17 and 19, which was enabled by taking aliquots throughout the copolymerization and then performing NMR characterization. For CTTE 16 and 19, there was no first addition of styrene monomer in order to isolate the styrene/butadiene counter tapered copolymer block and analyze directly the monomer distribution along the copolymer chain in the [A/B] midblock segment by 1H NMR without the calculations needed to substract the monovinyl aromatic homopolymer block A (PS block) in CTTE 14 and 17. The calculations of the monomer distribution in CTTE 14 and 17 were performed following the method used to characterize the polymer mid or "B" block in US 2003/0176582 A1 patent application publication on Sep. 18, 2003 by KRATON Polymers U.S. LLC and Bening et al.

Figure 2:
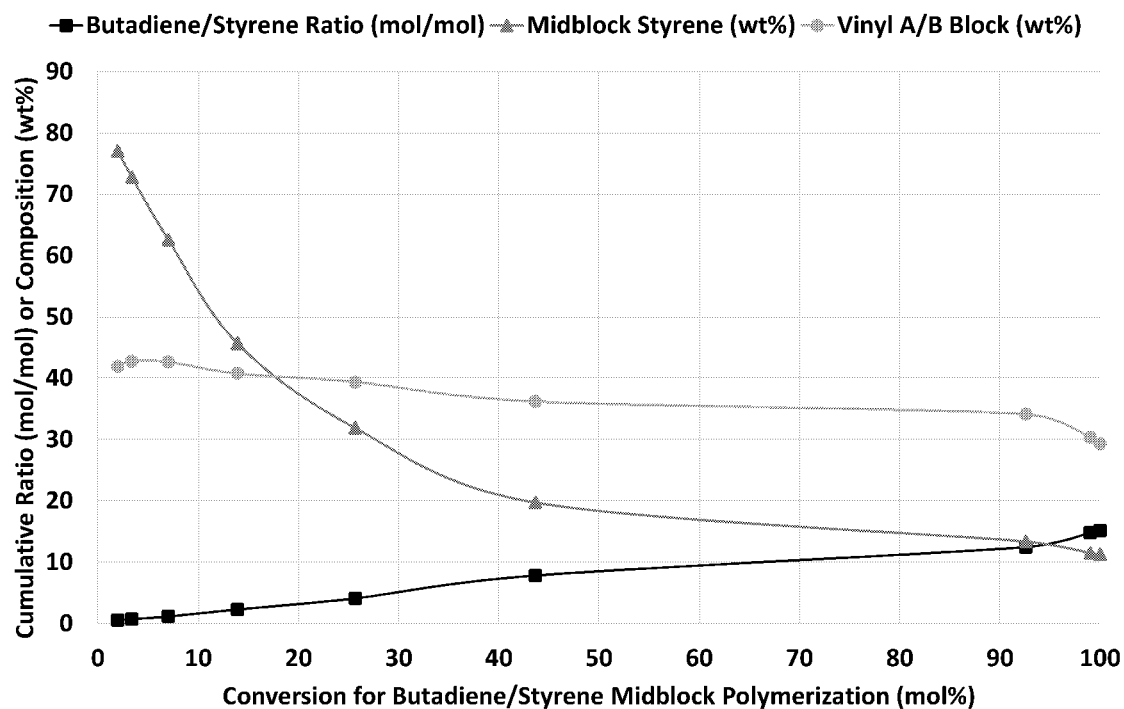
FIG. 2 depicts the Monomer Distribution in [A/B] Midblock of Counter Tapered Thermoplastic Elastomer CTTE 16.
Figure 3:
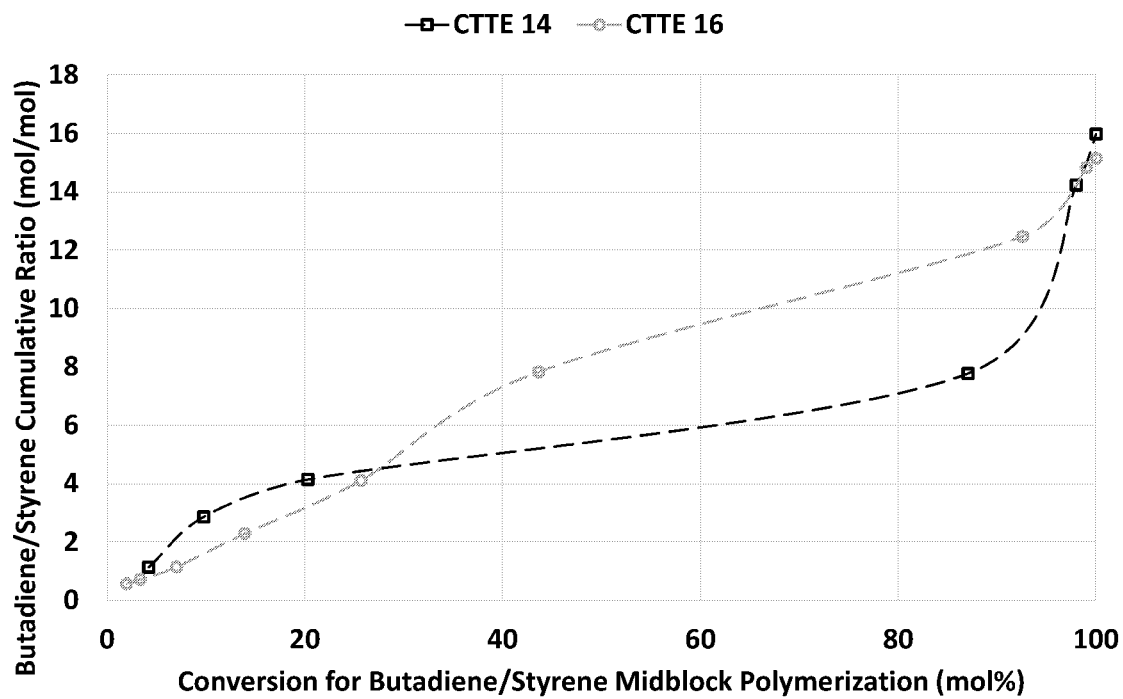
FIG. 3 depicts the Monomer Distribution in [A/B] Midblock of Inventive Counter Tapered Thermoplastic Elastomers CTTE 14 vs. CTTE 16.
Figure 4:
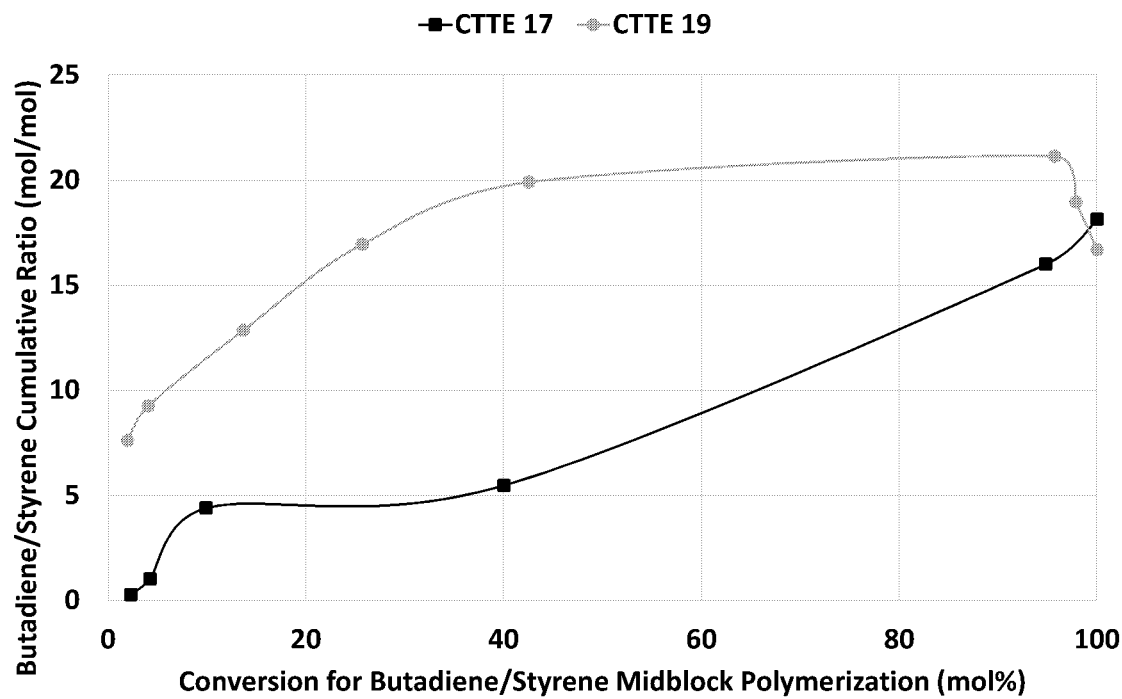
FIG. 4 depicts the Monomer Distribution in [A/B] Midblock of Inventive Counter Tapered Thermoplastic Elastomers CTTE 17 vs. CTTE 19.

FIGS. 1 and 2 clearly show that the cumulative composition of incorporated styrene monomer in the [A/B] midblock segment of the CTTE 14 and 16 decreases gradually with increasing conversion of the butadiene/styrene midblock polymerization. After coupling, this [A/B] midblock segment forms a complete [A/B]-X-[B/A] midblock, which has terminal regions that are rich in styrene monomer units (low butadiene/styrene cumulative ratio) and a center region that is rich in butadiene monomer units (high butadiene/styrene cumulative ratio), which occurs exactly the opposite way in the controlled distribution compositions of the prior art. This is a surprising and unexpected result given the facts that both a relatively small amount of styrene monomer is present during the midblock segment copolymerization (about 10 wt % of monomer mixture) and a sufficient amount of polar modifier (randomizing agent) for preparing a mid vinyl styrene/butadiene copolymer (about 30 wt % vinyl) was used for these copolymerizations. In addition, the counter tapered A-[A/B]-X-[B/A]-A thermoplastic elastomer compositions of the present invention have a unique combination of high styrene (low butadiene/styrene ratio) and high vinyl at the terminal regions of the complete [A/B]-X-[B/A] styrene/butadiene midblock close to the interfaces with the monovinyl aromatic homopolymer blocks A or polystyrene blocks. It is significant to note that even though the terminal regions of the styrene/butadiene midblock are richer in styrene (low butadiene/styrene cumulative ratio), a low level of midblock blockiness can be attained. Also, it is shown that styrene incorporation into the counter tapered [A/B] midblock segment depends not only on the amounts of styrene monomer and randomizing agent, but also on the temperature profile of the copolymerization and the monomer dosification times. FIGS. 2 and 3 show a more gradual decrease of the styrene incorporation into the copolymer chain of the [A/B] midblock segment of CTTE 16 as a response to the longer dosification time for butadiene monomer. FIG. 4 shows a more dramatic change in styrene incorporation of [A/B] midblock segment between CTTE 17 and 19, in response to a change in butadiene monomer dosification time, when the amount of polar modifier (randomizing agent) is relatively smaller (lower vinyl).

TABLE 1

Counter Tapered Thermoplastic Elastomers Composition

| Polymer Name | Mp A block (kg/mol) | Mp A-A/B diblock (kg/mol) | Mp coupled/ Mp A-A/B diblock | Mw CTTE (kg/mol) | Ratio A-A/B diblock to coupled | Vinyl A/B block (wt %) | Tg (° C.) |
|---|---|---|---|---|---|---|---|
| CTTE 1 | 10.1 | 111 | 3.50 | 189 | 2.5 | 13.7 | |
| CTTE 2 | 10.4 | 112 | 3.49 | 179 | 2.8 | 18.7 | |
| CTTE 3 | 10.0 | 106 | 3.48 | 178 | 2.3 | 27.0 | |
| CTTE 4 | 10.3 | 109 | 3.49 | 185 | 2.3 | 27.6 | |
| CTTE 5 | 10.0 | 113 | 3.48 | 192 | 2.3 | 29.5 | |
| CTTE 6 | 10.7 | 114 | 3.48 | 189 | 2.4 | 29.6 | −71.9 |
| CTTE 7 | 11.0 | 122 | 3.45 | 202 | 2.7 | 33.0 | |
| CTTE 8 | 10.2 | 106 | 3.45 | 219 | 1.2 | 18.1 | |
| CTTE 9 | 9.5 | 108 | 3.39 | 252 | 0.8 | 19.7 | −78.0 |
| CTTE 10 | 10.3 | 104 | 3.40 | 234 | 1.0 | 19.8 | |
| CTTE 11 | 10.4 | 111 | 3.34 | 267 | 0.6 | 20.3 | |
| CTTE 12 | 10.3 | 104 | 3.36 | 243 | 0.8 | 20.7 | |
| CTTE 13 | 10.5 | 105 | 3.43 | 224 | 1.1 | 29.0 | |
| CTTE 14 | 10.5 | 110 | 3.47 | 194 | 2.1 | 30.8 | −71.9 |
| CTTE 15 | | 95 | | 95 | | 30.6 | −72.6 |
| CTTE 16 | | 99 | | 103 | | 29.3 | −72.9 |
| CTTE 17 | 10.9 | 107 | 3.31 | 262 | 1.7 | 18.9 | −82.0 |
| CTTE 18 | | 108 | | 108 | | 22.1 | −77.6 |
| CTTE 19 | | 94 | | 97 | | 17.6 | −80.8 |

[a] Molecular Weight averages relative to PS standards, Coupling Efficiency ratios based on % cumulative GPC areas;
[b] RMN ¹H 300 MHz, Vinyl in wt % based on total butadiene units;
[c] Glass Transition Temperature (inflexion point) by DSC @ 10° C./min.

TABLE 2

Counter Tapered Thermoplastic Elastomers NMR Results

| Polymer Name | Total Styrene (wt %) | Block Styrene (wt %) | Midblock Styrene (wt %) | Midblock Blockiness (wt %) |
|---|---|---|---|---|
| CTTE 1 | 24.6 | 83.6 | 10.6 | 55.1 |
| CTTE 2 | 23.8 | 81.6 | 9.3 | 44.0 |
| CTTE 3 | 23.5 | 77.0 | 8.5 | 24.5 |
| CTTE 4 | 23.4 | 77.8 | 8.4 | 26.0 |
| CTTE 5 | 23.2 | 76.8 | 9.3 | 31.9 |
| CTTE 6 | 23.6 | 76.6 | 8.9 | 25.9 |
| CTTE 7 | 23.3 | 76.0 | 9.1 | 27.1 |
| CTTE 8 | 24.4 | 77.5 | 9.4 | 30.0 |
| CTTE 9 | 24.3 | 80.2 | 10.7 | 47.3 |
| CTTE 10 | 24.3 | 82.1 | 8.8 | 40.5 |
| CTTE 11 | 23.6 | 80.9 | 8.8 | 39.1 |
| CTTE 12 | 23.9 | 81.1 | 8.2 | 33.7 |
| CTTE 13 | 23.9 | 76.5 | 7.9 | 14.7 |
| CTTE 14 | 25.3 | 68.8 | 10.8 | 12.1 |
| CTTE 15 | 7.8 | 12.5 | 7.8 | 12.5 |
| CTTE 16 | 11.3 | 17.5 | 11.3 | 17.5 |
| CTTE 17 | 25.4 | 76.8 | 9.6 | 25.6 |
| CTTE 18 | 9.9 | 18.1 | 9.9 | 18.1 |
| CTTE 19 | 10.3 | 20.8 | 10.3 | 20.8 |

[a] RMN $^1$H 300 MHz, Total Styrene in wt % based on total copolymer;
[b] RMN $^1$H 300 MHz, Block Styrene in wt % based on total styrene units;
[c] Calculated Midblock Styrene in wt % based on midblock copolymer;
[d] Calculated Midblock Blockiness in wt % based on midblock styrene units.

TABLE 3

Counter Tapered Thermoplastic Elastomers Process

| | CTTE 1 | CTTE 6 | CTTE 9 | CTTE 13 | CTTE 14 | CTTE 15 | CTTE 16 | CTTE 17 | CTTE 18 | CTTE 19 |
|---|---|---|---|---|---|---|---|---|---|---|
| CHx (wt %)[a] | 86.1 | 86.1 | 86.1 | 86.1 | 86.1 | 88.2 | 88.2 | 86.1 | 88.2 | 88.2 |
| Randomizing agent (wt %)[a] | 0.0022 | 0.0115 | 0.0043 | 0.0116 | 0.0120 | 0.0123 | 0.0123 | 0.0043 | 0.0044 | 0.0044 |
| 1st STY (wt %)[b] | 17.5 | 17.5 | 17.5 | 17.6 | 17.5 | 0.0 | 0.0 | 17.5 | 0.0 | 0.0 |
| Initial Temperature Ti (° C.) | 61 | 61 | 60 | 60 | 60.21 | 66 | 66 | 60.7 | 65 | 65.6 |
| BD (wt %)[b] | 75.0 | 75.0 | 75.0 | 74.9 | 75.0 | 90.9 | 90.9 | 75.0 | 90.9 | 90.9 |
| BD dose rate (g/min) | 55 | 60 | 51 | 67 | 47 | 47 | 27 | 55 | 55 | 30 |
| BD dosification time (min) | 5.5 | 5.0 | 5.9 | 4.5 | 6.45 | 6.45 | 11 | 5.43 | 5.43 | 10 |
| 2nd STY (wt %)[b] | 7.5 | 7.5 | 7.5 | 7.5 | 7.5 | 9.1 | 9.1 | 7.5 | 9.1 | 9.1 |
| 2nd STY dose rate (g/min) | 30 | 30 | 30 | 30 | 30 | 30 | 30 | 30 | 30 | 30 |
| STY dosification time (min) | 1 | 1 | 1 | 1 | 1 | 1 | 1 | 1 | 1 | 1 |
| Final Peak Temperature Tp (° C.) | 103 | 105 | 104 | 105 | 104.23 | 103.9 | 105.53 | 102.98 | 104.34 | 105.1 |
| Coupling agent (wt %)[a] | 0.0033 | 0.0033 | 0.0078 | 0.0056 | 0.0035 | 0.0000 | 0.0000 | 0.0078 | 0.0000 | 0.0000 |

[a] wt % of Total Reaction Mixture
[b] wt % of Total Monomer Mixture

One embodiment of the invention is a process for making a counter tapered thermoplastic elastomer composition comprising: adding a solvent, a polar modifier or combination of polar modifiers, and monovinyl aromatic monomer to a reactor to form an initial reaction mixture, wherein the amount of the polar modifier in the initial reaction mixture is less than 10 wt %; adding an organolithium initiator compound to the reactor and anionically polymerizing the monomer to form the monovinyl aromatic homopolymer block A with a peak molecular weight of at least 5,000; adding additional monovinyl aromatic monomer and simultaneously begin the dosification to the reactor of conjugated diene monomer at a predetermined dose rate for a predetermined time, and copolymerizing to form the counter tapered copolymer block A/B with a vinyl content of at least 15 weight percent based on the amount of conjugated diene units in the diblock copolymer, and obtain the counter tapered diblock A-A/B copolymer with a peak molecular weight from 20,000 to 250,000; and adding a coupling agent or combination of coupling agents to partially couple the counter tapered diblock A-A/B copolymer to form the block copolymer that is either a linear triblock copolymer, a multiarm coupled block copolymer, or mixtures thereof; wherein the solvent, the polar modifier, the conjugated diene monomer and the monovinyl aromatic monomers comprise a total reaction mixture, wherein the amount of the polar modifier is less than 5 wt % of the total reaction mixture, wherein the peak molecular weight of the linear triblock copolymer is at least about 1.5 times the peak molecular weight of the counter tapered diblock A-A/B copolymer, wherein the peak molecular weight of the multiarm coupled block copolymer is at least about 2.5 times the peak molecular weight of the counter tapered diblock A-A/B copolymer, and wherein the ratio of the counter tapered diblock A-A/B copolymer to the block copolymer is from about 1:5 to about 5:1 in the counter tapered thermoplastic elastomer composition.

One embodiment of the invention based on Example 1 and Table 3 is a process for making counter tapered thermoplastic elastomers in either batch or semi-batch mode, which comprises:

preferably and optionally purifying solvent and monomers to decrease their moisture content to a maximum of 50 ppm, preferably less than 25 ppm and more preferably less than 5 ppm;

loading the solvent into a reactor and heating the solvent to an initial reaction temperature (Ti), which is between 5° and 75° C., possibly between 55 and 70° C., preferably between 55 and 70° C. and more preferably between 6° and 66° C., which is more than 75 wt % of a total reaction mixture, preferably 80 to 90 wt %, more preferably 84 to 90 wt % and most preferably 86 to 89 wt % with values of 86 and 88 wt % being typical, where the solvent is preferably cyclohexane;

preferably adding a suitable polar modifier into the reactor, which is preferably ditetrahydrofurylpropane (DTHFP) or tetrahydrofuran (THF) and more preferably DTHFP;

adding a monovinyl aromatic monomer to the reactor, which is preferably styrene, which is typically 15 to 20 wt %, preferably 16 to 19 wt % and more preferably 17 to 18 wt % of a total monomer mixture with 17.5 wt % being most preferred;

preferably and optionally allowing the solvent, polar modifier and monovinyl aromatic monomer to stabilize at the temperature Ti plus or minus 10° C., preferably plus or minus 5° C. and more preferably plus or minus 2° C. with stabilization at Ti being most preferred;

adding a lithium-based initiator in a suitable solvent solution into the reactor mixture, preferably n-butyllithium, preferably where the amount of initiator is stoichiometrically calculated to form individual blocks and to compensate for impurities;

allowing reaction to preferably and optionally proceed to complete conversion, preferably to at least 90% conversion, more preferably to 95% conversion or more, to form a monovinyl aromatic homopolymer block A, optionally with a peak molecular weight Mp of 5 to 15 kg/mol, preferably with a peak molecular weight of 8 to 12 kg/mol and more preferably with a peak molecular weight of 10 to 11 kg/mol;

preferably adding a second addition of a monovinyl aromatic monomer into the reactor, preferably styrene, typically 5 to 15 wt %, preferably 6 to 12 wt %, more preferably 7 to 9.5 wt % and most preferably at 7.5 to 9.1 wt % of the total monomer mixture with 7.5 wt % of the total monomer mixture being a preferred value, generally within a period of 5 min and preferably in less than 2 min;

dosing a conjugated diene monomer B into the reactor, preferably without an initial addition of a conjugated diene monomer and preferably without a wait time after an initial addition of a conjugated diene, where the total amount of the conjugated diene monomer dosed is more than 55 wt % of the total monomer mixture, typically between 60 and 90 wt %, generally between 65 and 85 wt %, preferably between 70 and 80 wt % with a preferred amount being 75 wt % of the total monomer mixture, where the conjugated diene monomer is dosed at a dose rate of 20 to 75 g/min, often at a dose rate of 30 to 70 g/min, generally at a dose rate of 45 to 68 g/min, usually at a dose rate of 47 to 67 g/min, preferably at a dose rate of 54 to 67 g/min, where the time in which the conjugated diene monomer is dosed is less than 90, 80, 70, 60, 50, 40, 30, 20 or 15 min and is generally less 13 min and is preferably dosed within a time period of 4 to 12 min, more preferably within 5 to 11 min, preferably where the conjugated diene is butadiene or isoprene and more preferably is 1,3-butadiene;

allowing reaction to proceed to at least 80% conversion, generally to over 90% conversion, preferably to at least 98% conversion, more preferably to at least 99% conversion and most preferably to complete conversion, preferably to a final peak temperature Tp of over 100° C., more preferably to 103 to 106° C. or 103 to 105° C., thereby forming a counter tapered copolymer block A/B and obtaining a living counter tapered diblock A-A/B copolymer, preferably in a single reactor and preferably without a need to use 2 reactors, generally where the peak molecular weight of the counter tapered diblock A-A/B copolymer is between 70 and 140 kg/mol, preferably where the peak molecular weight of the counter tapered diblock A-A/B copolymer is between 80 and 130 kg/mol and more preferably where the peak molecular weight of the counter tapered diblock A-A/B copolymer is between 90 and 125 kg/mol with a range of 100 to 115 kg/mol being most typical.

An optional, but preferable, next step, which is preferably carried out in the same reactor without a transfer to a second reactor, comprises:

adding a suitable coupling agent or combination of coupling agents, preferably silicon tetrachloride, to the reactor to partially couple the living counter tapered diblock A-A/B copolymer to form counter tapered thermoplastic elastomers, where the amount of the coupling agent is 0.0020 to 0.0100 wt %, generally 0.0025 to 0.0085 wt % and preferably 0.0030 to 0.0080 wt % of the total reaction mixture, generally where the ratio of uncoupled linear diblock A-[A/B] to coupled radial (A-[A/B]) n-X counter tapered thermoplastic elastomer is between 0.2 and 5.0, preferably where the ratio is between 0.3 and 4.0 and more preferably where the ratio is 0.5 to 3.0 or 0.4 to 3.0, generally where the weight average molecular weight Mw of the counter tapered thermoplastic elastomers is between 80 and 300 kg/mol, generally between 85 and 275 kg/mol, preferably between 90 and 270 kg/mol and more preferably between 95 and 267 kg/mol.

generally where the A/B-X-B/A midblock formed after coupling has a center region with a cumulative ratio of butadiene units to styrene units, where the cumulative B/S ratio is at least 3, preferably at least 5 and more preferably at least 10.

With reference to Table 2 and further to the embodiments described above, the coupled CTTE 1-14 has a total monovinyl aromatic monomer, preferably styrene, content of 15 to 35 wt %, generally 20 to 30 wt %, preferably 22 to 28 wt % and more preferably 23 to 26 wt %, with the remainder being conjugated diene monomer, preferably butadiene, content. Generally, coupled CTTE comprises 20 to 30 wt % monovinyl aromatic monomer units and 70 to 80 wt % conjugated diene monomer units, preferably 22 to 28 wt % monovinyl aromatic monomer units and 72 to 78 wt % conjugated diene monomer units, and more preferably 23 to 26 wt % monovinyl aromatic monomer units and 74 to 77 wt % conjugated diene monomer units. Further to the embodiment above, a linear diblock A-[A/B] is formed, which is living at the terminal B portion, and the coupling agent binds to the living terminal B portion and couples at least two of the linear diblock A-[A/B] units together to form (A-[A/B])-X-([B/A]-A) and/or the coupled radial (A-[A/B]) n-X counter tapered thermoplastic elastomer. After coupling, the CTTE has a central block that comprises units of both monovinyl aromatic monomer, preferably styrene, and conjugated diene monomer, preferably butadiene and a block on each end that is a homopolymer of the monovinyl aromatic monomer, preferably polystyrene. The midblock is the [A/B]-X-[B/A] portion, which may be a combination of linear and radial units depending on whether two or more [A/B] units bind to the coupling agent. This midblock portion in Table 2 is 2 to 20 wt % monovinyl aromatic monomer, preferably styrene, and 80 to 98 wt % conjugated diene monomer, preferably butadiene, generally is 5 to 15 wt % monovinyl aromatic monomer, preferably styrene, and 85 to 95 wt % conjugated diene monomer, preferably butadiene, and preferably 6 to 12 wt % monovinyl aromatic monomer, preferably styrene, and 88 to 94 wt % conjugated diene monomer, preferably butadiene, with 7 to 11 wt % monovinyl aromatic monomer, preferably styrene, and 89 to 93 wt % conjugated diene monomer, preferably butadiene, being most preferred. The midblock blockiness in Table 2 for CTTE 1-14 ranges from 10 to 60 wt %, generally 10 to 56 wt %, and preferably 10 to 45 wt %.

Further to the embodiment above and with reference to FIGS. 1-4 and Table 2, the coupled CTTE 1-14 and 17, a linear diblock A-[A/B] is formed, which is living at the terminal B portion, and the coupling agent binds to the living terminal B portion and couples at least two of the linear diblock A-[A/B] units together to form (A-[A/B])-X-([B/A]-A) and/or the coupled radial (A-[A/B]) n-X counter tapered thermoplastic elastomer. After coupling, the CTTE has a central block that comprises units of both monovinyl aromatic monomer, preferably styrene, and conjugated diene monomer, preferably butadiene and a block on each end that is a homopolymer of the monovinyl aromatic monomer, preferably polystyrene. The midblock is the [A/B]-X-[B/A] portion, which may be a combination of linear and radial units depending on whether two or more [A/B] units bind to the coupling agent. FIGS. 1-4 illustrated the monomer distribution along the copolymer chain of the midblock [A/B]-X-[B/A] portion prior to coupling of CTTE 14, 16, 17 and 19, which show that the midblock have terminal regions that are rich in styrene monomer units (low butadiene/styrene cumulative ratio) and a center region that is rich in butadiene monomer units (high butadiene/styrene cumulative ratio). CTTE 14 has a butadiene/styrene B/S cumulative ratio of about 16.0 mol/mol for a midblock styrene of about 10.7 wt %; CTTE 16 has a butadiene/styrene B/S cumulative ratio of about 15.1 mol/mol for a midblock styrene of about 11.3 wt %; CTTE 17 has a butadiene/styrene B/S cumulative ratio of about 18.1 mol/mol for a midblock styrene of about 9.6 wt %; and CTTE 14 has a butadiene/styrene B/S cumulative ratio of about 16.7 mol/mol for a midblock styrene of about 10.3 wt %. The CTTE butadiene/styrene B/S cumulative ratio of the midblock portion in Table 2 is 5 to 30 mol/mol, generally is 8 to 25 mol/mol, and preferably 10 to 23 mol/mol, with 12 to 21 mol/mol, being most preferred. Generally where the A/B-X-B/A midblock formed after coupling has a center region with a cumulative ratio of butadiene units to styrene units, where the cumulative B/S ratio is at least 3, preferably at least 5 and more preferably at least 10.

EMBODIMENTS OF THE INVENTION

1. A process for making a counter tapered thermoplastic elastomer composition comprising:
    loading a solvent into a reactor and heating the solvent to an initial reaction temperature (Ti), which is preferably between 5° and 75° C., wherein the amount of solvent is preferably more than 75 wt % of a total reaction mixture, wherein the solvent is preferably cyclohexane;
    adding a polar modifier into the reactor, which is preferably ditetrahydrofurylpropane (DTHFP) or tetrahydrofuran (THF);
    adding first amount of a monovinyl aromatic monomer to the reactor, which is preferably styrene, wherein the first amount of monovinyl aromatic monomer is preferably between 15 and 20 wt % of a total monomer mixture;
    adding a lithium-based initiator into the reactor mixture;
    allowing a reaction to proceed and thereby forming a monovinyl aromatic homopolymer block A, wherein the peak molecular weight Mp of block A is preferably between 5 to 15 kg/mol;
    adding a second amount of the or a monovinyl aromatic monomer into the reactor, wherein the second amount of monovinyl aromatic monomer is preferably between 2 and 15 wt % of the total monomer mixture, wherein the second amount is preferably added within a period of 5 min and more preferably in less than 2 min;
    dosing a conjugated diene monomer B into the reactor, preferably without an initial addition of a conjugated diene monomer and preferably without a wait time after an initial addition of a conjugated diene, wherein the total amount of the conjugated diene monomer dosed is preferably more than 55 wt % of the total monomer mixture and more preferably between 55 and 90 wt %, wherein the conjugated diene monomer is preferably dosed at a dose rate of 20 to 75 g/min, and wherein the time in which the conjugated diene monomer is dosed is preferably less than 55 min and more preferably in less than 25 min;
    allowing a reaction to proceed to at least 75% conversion, preferably to a final peak temperature Tp of over 80° C., thereby forming a counter tapered copolymer block A/B and obtaining a living counter tapered diblock A-A/B copolymer, preferably in a single reactor and preferably without a need to use 2 reactors, wherein the peak molecular weight of the counter tapered diblock A-A/B copolymer is preferably between 50 and 200 kg/mol.

2. The process for making a counter tapered thermoplastic elastomer composition of embodiment 1, further comprising:
    adding a coupling agent, which may be a single coupling agent, a combination of coupling agents, an acrylic oligomer or a combination of these, to the reactor to couple, preferably partially, the living counter tapered diblock A-A/B copolymer to form counter tapered thermoplastic elastomers, preferably carried out in the same reactor, preferably without a transfer to a second reactor, wherein the amount of the coupling agent is preferably 0.0005 to 0.0500 wt % of the total reaction mixture,
    wherein the ratio of uncoupled linear diblock A-[A/B] to coupled radial (A-[A/B]) n-X counter tapered thermoplastic elastomer is preferably between 0.1 and 10.0,
    wherein the weight average molecular weight Mw of the counter tapered thermoplastic elastomers is preferably between 30 and 1,000 kg/mol, and
    wherein the A/B-X-B/A midblock formed after coupling preferably has a center region with a cumulative ratio of butadiene units to styrene units, wherein the cumulative B/S ratio is generally at least 1, usually at least 2.5 preferably at least 5 and more preferably at least 10.

3. The process for making a counter tapered thermoplastic elastomer composition of embodiment 1 or 2, wherein the total monovinyl aromatic monomer content of the final product is preferably between 10 to 48 wt %.

4. The process for making a counter tapered thermoplastic elastomer composition of embodiment 1, 2 or 3, with respect to a coupled CTTE, wherein the total monovinyl aromatic monomer content of the coupled CTTE is preferably between 10 to 40 wt %, and wherein the coupled CTTE preferably comprises between 60 to 90 wt % conjugated diene monomer units.

5. The process for making a counter tapered thermoplastic elastomer composition of any one of embodiments 1-4, with respect to the coupled CTTE, wherein a midblock portion of the CTTE is preferably between 2 to 20 wt % monovinyl aromatic monomer and preferably 80 to 98 wt % conjugated diene monomer, and wherein a midblock blockiness preferably ranges from 5 to 75 wt %.

Example 2

Applications in Polymer Modified Asphalt (PMA) for Road Paving

The low Mw counter tapered thermoplastic elastomers (CTTE 1-7) in Tables 1 and 2, prepared as described in Example 1, were used as asphalt modifiers or asphalt reinforcing agents in polymer modified asphalt (PMA) for road paving formulations. To this end, PG 64-22 neat asphalt (provided by PEMEX) was formulated by a hot mix and high shear rate process. For this process, a trigonal high shear mill was employed. First, neat asphalt was heated without agitation to 120° C. to soften the asphalt under a nitrogen atmosphere. During this stage very slow agitation was employed to prevent asphalt overheating and oxidation. Once the asphalt was soft, heating continued to 190° C.+/−5° C. and the mixer agitation was increased to 2500 RPM. As 190° C. was reached, the counter tapered thermoplastic elastomer (CTTE) composition was gradually added to the asphalt at a rate of about 10 g/min. The agitation was maintained for 120-180 minutes for the effective and total dispersion of the CTTE as reinforcing agent. To ensure that the same level of dispersion was achieved in all formulations, the CTTE dispersion in asphalt was monitored through fluorescence microscopy using a Zeiss microscope Axiotecy 20X model.

The CTTE polymer modified asphalt (PMA) mixtures thus obtained were characterized by Ring and Ball Softening Point Temperature (TRBSP) according to ASTM D36. Penetration was measured according to ASTM D5 at 25° C., 10 seconds and 100 grams using a Koheler Penetrometer model K95500. Maximum application temperature ("Max use T") was measured as the temperature at which the Rutting Factor or Dynamic Shear Stiffness (G*/sin 0) takes the value of 1.0 kPa, where G* is the complex modulus and sin δ is the phase angle according to AASHTO TP5 by using a Paar Physica rheometer model MCR-300-SP, and AASHTO SUPERPAVE performance grade PG was determined. Dynamic viscosity at 135° C. was measured according to ASTM D4402 by using a Brookfield viscometer model RDVS-II+. Elastic recovery at 25° C. in torsion mode was measured according to AASHTO-TF31R. Elastic recovery at 25° C. and Ductility at 4° C. were measured by using a Ductilometer.

CTTE polymer modified asphalt (CTTE 1-7 PMA) results are given in Table 2a below and show the enhanced performance of the novel counter tapered thermoplastic elastomer compositions as asphalt modifiers for road paving at 2.2 wt % of CTTE polymer content based on total PMA mixture.

improving pumping capacity and/or decreasing the energy required to apply it. This also means an important cost reduction and a more environmentally-friendly process.

Example 3

Applications in Polymer Modified Asphalt Emulsions (PME) for Road Paving

The low Mw counter tapered thermoplastic elastomers (CTTE 3-6) in Tables 1 and 2, prepared as described in Example 1, were used as asphalt modifiers or asphalt reinforcing agents in polymer modified emulsions (PME) for road paving formulations. First, a PMA mixture for each CTTE composition was prepared as described in Example 2. Next, the aqueous emulsifier solution was prepared by first heating demineralized water to 45° C., then approximately 0.5 wt % of a polyamine type emulsifying agent (Redicote E4819, commercially available from Akzo Nobel) was added to the warm water while stirring gently, and followed by the addition of approximately 0.4 wt % of a concentrated mineral acid (HCl, 37%). The aqueous solution was stirred until complete emulsifier dissolution and the acidity was in the pH range of 2.0+0.1, which was ready for emulsification of the PMA mixture. Finally, the emulsification process was carried out atmospherically by using an IKA colloid mill. The PMA mixture at 150° C. and the aqueous emulsifier solution at 40° C. (65:35 wt: wt) were both pumped to the colloid mill operated at 90° C. to form the polymer modified asphalt emulsion (PME). Then, the freshly prepared PME was placed in an oven at 80° C. for 16 h. After cooling to ambient temperature, the PME was passed through a 20-mesh copper sieve and the amount of sieve residue was tested. The polymer modified asphalt emulsion (PME) thus obtained was then treated to separate water and recover the residual PMA mixture.

The CTTE polymer modified asphalt emulsions (PME) thus prepared were tested for 20-mesh Sieve Residue, Saybolt Furol Viscosity at 50° C., and Storage Stability at 5 days. Once the water was separated from the PME, the residual PMA mixture was characterized by Ring and Ball Softening Point Temperature (TRBSP) according to ASTM D36, Penetration was measured according to ASTM D5 at TABLE 2a Performance of Low Mw CTTE in Asphalt Reinforcement for Road Paving

| CTTE Polymer Modified Asphalt @ 2.2 wt % | CTTE 1 PMA | CTTE 2 PMA | CTTE 3 PMA | CTTE 4 PMA | CTTE 5 PMA | CTTE 6 PMA | CTTE 7 PMA |
|---|---|---|---|---|---|---|---|
| Brookfield Viscosity @ 135° C. (cP) | 1669 | 1479 | 1388 | 1431 | 1437 | 1436 | 1559 |
| Penetration @ 25° C. (dmm) | 42 | 44 | 50 | 45 | 46 | 45 | 41 |
| R&B Softening Point (° C.) | 64 | 63 | 60 | 63 | 62 | 62 | 68 |
| Ductility @ 4° C. (cm) | 8 | 8 | 10 | 9 | 9 | 9 | 6 |
| Elastic Recovery @ 25° C. by Torsion (%) | 30 | 30 | 28 | 32 | 32 | 31 | 35 |
| Elastic Recovery @ 25° C. by Ductilometer (%) | 59 | 50 | 58 | 65 | 64 | 63 | 67 |
| AASHTO SUPERPAVE Performance Grade PG | 82-10 | 82-10 | 82-16 | 82-16 | 82-16 | 82-16 | 82-16 |

Reviewing Table 2a, the results show a noticeably low viscosity, high elastic response, wide range of PG polymer modified asphalts, and good balance between high and low temperature properties. The much lower viscosity of the asphalt formulations besides contributing to facilitate the dispersion of the polymer into the asphalt and improve the time required for mixing, also facilitates the processing, handling and application of the modified asphalt mixtures by 25° C., 10 seconds and 100 grams using a Koheler Penetrometer model K95500. Elastic recovery at 25° C. and Ductility at 4° C. were measured by using a Ductilometer.

CTTE polymer modified asphalt emulsions (CTTE 3-6 PME) results are given in Table 3a below and show the enhanced performance of the novel counter tapered thermoplastic elastomer compositions as asphalt modifiers in emulsions for road paving.

TABLE 3a

Performance of Low Mw CTTE in Asphalt Reinforcement for Road Paving

| CTTE Polymer Modified Asphalt (Emulsion & Residual) | CTTE 3 PME | CTTE 4 PME | CTTE 5 PME | CTTE 6 PME |
|---|---|---|---|---|
| Saybolt Furol Viscosity @ 50° C. (SSF) | 56 | 64 | 63 | 62 |
| Storage Stability @ 5 days (%) | 1.7 | 2.0 | 1.9 | 2.0 |
| Sieve Test @ Mesh 20 (%) | 0.050 | 0.060 | 0.055 | 0.060 |
| Penetration @ 25° C. (dmm) | 85 | 75 | 74 | 73 |
| R&B Softening Point (° C.) | 50 | 53 | 53 | 52 |
| Ductility @ 4° C. (cm) | 12 | 11 | 10 | 11 |
| Elastic Recovery @ 25° C. by Ductilometer (%) | 41 | 50 | 51 | 49 |
| Elastic Recovery @ 25° C. by Ductilometer Original (%) | 48 | 54 | 55 | 53 |

Reviewing Table 3a, the results for the PME show low viscosity, good storage stability, and acceptable sieve residue. Also, the results for the PMA show similar high elastic response before (original) and after the emulsification process (residual), and excellent balance between high and low temperature properties.

Example 4

Preparation of Counter Tapered Thermoplastic Elastomers (CTTE)

In Example 4, several novel counter tapered thermoplastic elastomers (CTTE 20-38) were prepared according to the process claimed in the present invention. Polymers CTTE 20-38 were (A-[A/B]) n-X block copolymers wherein the A-[A/B] diblock prior to coupling consisted of a monovinyl aromatic homopolymer block A block that was a polystyrene block (PS) and a counter tapered copolymer block [A/B] that was a styrene/butadiene copolymer block, which after coupling formed a [A/B]-X-[B/A] midblock having terminal regions that are rich in styrene units and a center region that is rich in butadiene units. CD1 and CD2 were comparative examples of controlled distribution block copolymers of the prior art prepared by following a procedure similar to the one described in US 2003/0176582 A1 patent application publication on Sep. 18, 2003 by KRATON Polymers U.S. LLC and Bening et al. CD2 was a polymer prepared with only a controlled distribution copolymer block [B/A] of styrene/butadiene for illustrative purposes of the monomer distribution of the midblock copolymer chain prior to coupling.

These novel counter tapered thermoplastic elastomer (CTTE 20-38) compositions were characterized by GPC, 1H NMR and DSC methodologies to determine: molecular weight averages and molecular weight distribution characteristics such as peak molecular weight (Mp) for linear diblocks and coupled modes, weight average molecular weight (Mw) and Diblock to Coupled Ratios; microstructural characteristics such as Total Styrene, Block Styrene, and Vinyl A/B block contents; glass transition temperatures (Tg) for A/B counter tapered copolymer block; and melt flow rates (MFI) of the CTTE counter tapered thermoplastic compositions. In addition, calculations of the Midblock Styrene and Midblock Blockiness were also performed following the method used to characterize the polymer mid or "B" block as Calc. Mid PSC and Calc. Mid Blocky in US 2003/0176582 A1 patent application publication on Sep. 18, 2003 by KRATON Polymers U.S. LLC and Bening et al. Tables 4-5 enlist the analytical characterization results and Table 6 the polymerization conditions for CTTE 20-38 and CD 1-2. The following describes a general procedure, similar to the one described in example 1, used to prepare these novel counter tapered thermoplastic elastomers (CTTE 20-38) and to control the monomer distribution in the anionic copolymerization of 1,3-butadiene (B) and styrene (S) in the presence of ditetrahydrofurylpropane (DTHFP) or tetrahydrofuran (THF) as a suitable polar modifier and randomizing agent for the styrene/butadiene [S/B] counter tapered copolymer block. The abbreviations used in Table 6 below for the polymerization conditions are defined as follows: CHx=cyclohexane; STY=styrene; and BD=1,3-butadiene. For the novel counter tapered thermoplastic elastomers CTTE 20-32 and 37-38 and also for CD 1 comparative example, silicon tetrachloride (SiCl4) was used as a coupling agent. For CTTE 33-36, an acrylic oligomer similar to the one described in U.S. Pat. No. 8,981,008 was used as a coupling agent.

The novel counter tapered thermoplastic elastomer (CTTE 20-38) compositions of the present invention and controlled distribution comparative examples CD 1-2 were prepared in a 7.57 Liter reactor system operated under inert nitrogen atmosphere in batch and/or semi-batch mode according to the teachings of this invention. Immediately before addition to the reactor system, solvent and monomers were thoroughly purified to decrease their moisture content to a maximum of 5 ppm by flowing through a set of columns packed with alumina and molecular sieves. For the first polymerization step, an appropriate amount of purified solvent (CHx) was charged into the reactor and heated to the initial reaction temperature (Ti) of about 50° C. Ti was set to a lower temperature of about 30° C. for CD 1 polymer. Once Ti was reached, a suitable polar modifier (randomizing agent) such as ditetrahydrofurylpropane (DTHFP) or tetrahydrofuran (THF) was added into the reactor followed by a first addition of monovinyl aromatic monomer (1st STY) of from about 17.5 to about 30.0 wt % of total monomer mixture. For CD1, the first addition of monovinyl aromatic monomer (1st STY) of about 27 wt % of total monomer mixture was similar to CTTE 37-38 in order to directly compare and differentiate our composition/process to prior art. For CD 2, there was no first addition of styrene monomer in order to prepare isolated styrene/butadiene counter tapered copolymer blocks to analyze directly the Midblock Styrene, the Midblock Blockiness and the monomer distribution along the copolymer chain of the [A/B] counter tapered copolymer block by 1H NMR without the calculations needed to eliminate the interference of the monovinyl aromatic homopolymer block A (PS block) in CTTE 20-38 and CD 1, which was enabled by taking aliquots throughout the copolymerization and then performing NMR characterization. This reaction mixture was allowed to stabilize at Ti, and then n-butyllithium or another suitable initiator was added in a suitable solvent solution directly into the reactor mixture containing at least the amount of polar modifier necessary to efficiently initiate the anionic polymerization of the living polystyrene blocks. The amount of initiator was stoichiometrically calculated as described in the literature to form individual blocks with the desired molecular weight and to compensate for residual impurities. This first polymerization step was then allowed to proceed adiabatically up to complete conversion to form the monovinyl aromatic homopolymer block A with peak molecular weight Mp about a target value of from about 10,000 to about 20,000.

For the second polymerization step, the addition of both monomers was simultaneously initiated for CTTE 20-38, a second monovinyl aromatic monomer (2nd STY) addition of about 6.3 to about 22 wt % of total monomer mixture was rapidly charged into the reactor at a specified dose rate of from about 41 to 146 g/min during a predetermined dosification time of about 1 min, and a conjugated diene monomer (BD) addition of about 50 to about 70 wt % of total monomer mixture was slowly charged into the reactor at a specified dose rate of from about 48 to about 70 g/min for a predetermined dosification time of from about 6.5 min to about 7 min. These monomer additions were carried out in a programmed batch and/or semi-batch mode, and the amount of polar modifier (randomizing agent) was adjusted from about 0.01 to about 0.20 wt % of total reaction mixture, in order to promote the formation of a statistically distributed tapered S/B copolymer block with gradual change in composition and vinyl microstructure (1,2-addition) along the copolymer chain. This second polymerization step was then allowed to proceed adiabatically up to complete conversion and the final peak temperature (Tp) was allowed to increase to from about 96 to about 107° C., thereby forming the counter tapered copolymer [A/B] block and thus obtaining the living counter tapered A-[A/B] diblock copolymer with peak molecular weight Mp about a target value of from about 70,000 to about 213,000. For the second polymerization step of the controlled distribution comparative examples CD 1-2, the addition of styrene monomer was initiated 1 min after the addition of butadiene monomer started, thus a second monovinyl aromatic monomer (2nd STY) addition of about 22 to about 30 wt % of total monomer mixture was slowly charged into the reactor at a specified dose rate of from about 9 to 10 g/min during a predetermined dosification time of from about 15 to about 16 min, and a conjugated diene monomer (BD) addition of about 50 to about 70 wt % of total monomer mixture was very slowly charged into the reactor at a specified dose rate of from about 10 to about 11 g/min for a predetermined dosification time of from about 31 min to about 33 min. These monomer additions were carried out in a programmed batch and/or semi-batch mode, and the amount of polar modifier (randomizing agent) was adjusted from about 0.047 to about 0.048 wt % of total reaction mixture, in order to promote the formation of a statistically distributed tapered S/B copolymer block with gradual change in composition and low vinyl microstructure (1,2-addition) along the copolymer chain. This second polymerization step was then allowed to proceed adiabatically up to complete conversion and the final peak temperature (Tp) was allowed to increase to from about 80 to about 82° C., thereby forming the controlled distribution [B/A] block and thus obtaining the living controlled distribution A-[B/A] diblock copolymer with peak molecular weight Mp about a target value of from about 95,000 to about 124,000.

Finally, a suitable coupling agent such as silicon tetrachloride (SiCl4) or an acrylic oligomer in a sufficient amount of from about 0.0027 to about 0.032 of total reaction mixture was added to the reactor to partially couple the living counter tapered A-[A/B] diblock copolymer to obtain the desired ratios of uncoupled linear diblock A-[A/B] to coupled radial (A-[A/B]) n-X counter tapered thermoplastic elastomer compositions of the present invention, wherein X is the residual moiety from the coupling reaction process. The remaining living polymer chains were terminated by adding a 10 mol % excess over the stoichiometric amount of a suitable alcohol to the final reaction mixture. A similar procedure was followed for coupling the controlled distribution styrene/butadiene copolymer diblock of CD 1 comparative example.

Tables 4 and 5 list the analytical characterization results for the novel counter tapered thermoplastic elastomer compositions CTTE 20-38. All the average molecular weights (Mp and Mw) are given in units of 1000 (k) and calculated relative to polystyrene standards by GPC. The peak average molecular weights Mp for the monovinyl aromatic homopolymer block A or polystyrene block of CTTE 20-38 are from about 10.2 to about 19.8 kg/mol. The peak average molecular weights Mp for the A-[A/B] diblock copolymer or S-[S/B] styrene-butadiene diblock copolymer of CTTE 20-38 are from about 70 to about 213 kg/mol. The peak average molecular weights Mp for the [B/A] controlled distribution copolymer or [B/S] styrene-butadiene copolymer of CD 1-2 are from about 95 to about 124 kg/mol. The ratios of Mp of coupled radial (A-[A/B]) n-X to Mp of uncoupled linear diblock A-[A/B] of CTTE 20-38 are from about 3.1 to about 11.9. The weight average molecular weights Mw of CTTE 20-38 are from about 179 to about 521 kg/mol. The ratios of uncoupled linear diblock A-[A/B] to coupled radial (A-[A/B]) n-X of CTTE 20-38 are from about 0.2 to about 3.2, which is the coupling efficiency as determined from GPC area. The vinyl [A/B] block contents of CTTE 20-38 are from about 18.5 to about 54.0 wt % based on total butadiene units. The glass transition temperatures of the [A/B] counter tapered copolymer block of CTTE 20-38 are from about −81.9 to about −47.8° C. The melt flow rates (MFI) of the CTTE 20-38 compositions are from about 0 (NF) to about 94.9 g/10 min. The contents determined by NMR of CTTE 20-38 for: total styrene based on total copolymer are from about 14.1 to about 49.5 wt %; block styrene based on total styrene units are from about 53.2 to about 91.0 wt %; midblock styrene based on midblock copolymer are from about 5.2 to about 34.4 wt %, and midblock blockiness based on midblock styrene units are from about 6.6 to about 73.8 wt %.

Figure 5:
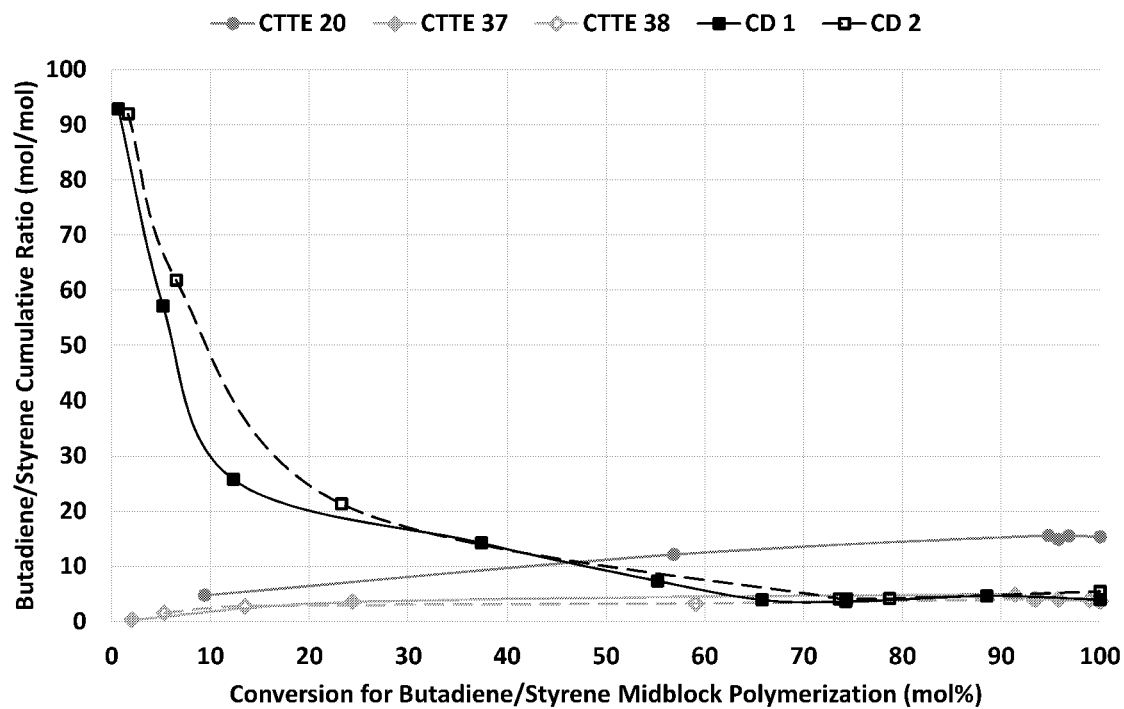
FIG. 5 depicts the Monomer Distribution in Inventive [A/B] Midblock of CTTE 20, 37 and 38 vs. Comparative [B/A] Controlled Distribution Midblock Examples of CD 1 and CD 2.

FIG. 5 depict the monomer distribution in [A/B] midblock segment prior to coupling of inventive counter tapered block copolymers CTTE 20, 37 and 38, and the monomer distribution in [B/A] midblock segment prior to coupling of comparative controlled distribution examples CD 1 and 2, which were enabled by taking aliquots throughout the copolymerization and then performing NMR characterization. For CD 2, there was no first addition of styrene monomer in order to isolate the styrene/butadiene controlled distribution copolymer block and analyze directly the monomer distribution along the copolymer chain in the [B/A] midblock segment by 1H NMR without the calculations needed to substract the monovinyl aromatic homopolymer block A (PS block) in CTTE 37-38 and CD 1. The calculations of the monomer distribution in CTTE 37-38 and CD 1 were performed following the method used to characterize the polymer mid or "B" block in US 2003/0176582 A1 patent application publication on Sep. 18, 2003 by KRATON Polymers U.S. LLC and Bening et al.

FIG. 5 clearly show that the cumulative composition of incorporated styrene monomer in the [A/B] midblock segment of the CTTE 37-38 decreases gradually with increasing conversion of the butadiene/styrene midblock polymerization. After coupling, this [A/B] midblock segment forms a complete [A/B]-X-[B/A] midblock, which has terminal regions that are rich in styrene monomer units (low butadiene/styrene cumulative ratio) and a center region that is rich in butadiene monomer units (high butadiene/styrene cumulative ratio), which occurs exactly the opposite way in the controlled distribution compositions of the prior art and more significantly in our comparative examples CD 1 and CD 2 of controlled distribution compositions. This is also a surprising and unexpected result given the facts that both a relatively large amount of styrene monomer is present during the midblock segment copolymerization (about 30 wt % of monomer mixture) and a relatively low amount of polar modifier (randomizing agent) for preparing a low vinyl styrene/butadiene copolymer (about 20 wt % vinyl) was used for these copolymerizations. It is also significant to note that even though the terminal regions of the styrene/butadiene midblock are richer in styrene (low butadiene/styrene cumulative ratio), a low level of midblock blockiness can be attained. Also, it is shown that styrene incorporation into the counter tapered [A/B] midblock segment depends not only on the amount of styrene monomer and the amount and type of randomizing agent, but also on the temperature profile of the copolymerization and the monomer dosification times. FIG. 5 shows a generally higher styrene incorporation into the copolymer chain of the [A/B] midblock segment of CTTE 37 and 38 as compared to CTTE 20. FIG. 5 also shows a more dramatic and opposite change in styrene incorporation of [B/A] midblock segment of CD 1 and CD 2, in response to a significant increase in both butadiene and styrene monomer dosification times combined with the use of THF as randomizing agent at lower temperatures, when the amount of polar modifier (randomizing agent) is relatively small (low vinyl).

TABLE 5

Counter Tapered Thermoplastic Elastomers NMR Results

| Polymer Name | Total Styrene (wt %) | Block Styrene (wt %) | Midblock Styrene (wt %) | Midblock Blockiness (wt %) |
|---|---|---|---|---|
| CTTE 20 | 25.1 | 70.8 | 11.1 | 21.7 |
| CTTE 21 | 23.9 | 91.0 | 9.7 | 73.8 |
| CTTE 22 | 30.4 | 60.5 | 17.2 | 17.3 |
| CTTE 23 | 34.0 | 53.2 | 21.5 | 12.3 |
| CTTE 24 | 34.4 | 53.9 | 20.9 | 8.8 |
| CTTE 25 | 30.0 | 63.9 | 16.5 | 21.7 |
| CTTE 26 | 33.8 | 55.3 | 21.4 | 16.2 |
| CTTE 27 | 14.7 | 68.3 | 5.6 | 8.2 |
| CTTE 28 | 14.1 | 69.6 | 5.2 | 8.3 |
| CTTE 29 | 19.1 | 54.5 | 10.7 | 10.6 |
| CTTE 30 | 19.0 | 55.9 | 10.5 | 12.3 |
| CTTE 31 | 37.5 | 75.1 | 14.3 | 10.7 |
| CTTE 32 | 37.0 | 74.6 | 14.3 | 10.9 |
| CTTE 33 | 35.8 | 78.2 | 13.2 | 20.1 |
| CTTE 34 | 35.9 | 78.0 | 13.1 | 18.1 |
| CTTE 35 | 25.3 | 66.0 | 11.7 | 13.1 |
| CTTE 36 | 25.6 | 65.2 | 11.3 | 6.6 |
| CTTE 37 | 49.5 | 69.9 | 34.4 | 43.8 |
| CTTE 38 | 48.8 | 55.2 | 34.4 | 18.4 |
| CD1 | 48.3 | 59.6 | 32.7 | 22.3 |
| CD2 | 26.1 | 35.9 | 26.1 | 35.9 |

[a] RMN $^1$H 300 MHz, Total Styrene in wt % based on total copolymer;
[b] RMN $^1$H 300 MHz, Block Styrene in wt % based on total styrene units;
[c] Calculated Midblock Styrene in wt % based on midblock copolymer;
[d] Calculated Midblock Blockiness in wt % based on midblock styrene units.

TABLE 4

Counter Tapered Thermoplastic Elastomers Composition

| Polymer Name | MP A block (kg/mol) | M A-A/B diblock (kg/mol) | Mp coupled/Mp A-A/B diblock | Mw CTTE (kg/mol) | Ratio A A/B diblock to coupled | Vinyl A/B block (wt %) | Tg (° C.) | MFI @ 200° C., 5 kg (g/10 min) |
|---|---|---|---|---|---|---|---|---|
| CTTE 20 | 11.5 | 126 | 3.61 | 231 | 1.9 | 28.8 | −73.2 | |
| CTTE 21 | 10.2 | 112 | 3.57 | 287 | 0.7 | 18.5 | −81.9 | |
| CTTE 22 | 11.9 | 125 | 3.64 | 221 | 2.1 | 27.4 | −62.2 | 2.0 |
| CTTE 23 | 11.7 | 120 | 3.64 | 216 | 2.1 | 27.8 | −60.4 | 7.8 |
| CTTE 24 | 11.7 | 112 | 3.75 | 206 | 2.3 | 30.4 | −59.4 | 5.3 |
| CTTE 25 | 10.6 | 110 | 3.55 | 179 | 2.7 | 53.3 | −55.4 | |
| CTTE 26 | 10.6 | 110 | 3.59 | 184 | 2.7 | 54.0 | −47.8 | 7.4 |
| CTTE 27 | 11.3 | 213 | 3.87 | 374 | 2.5 | 28.0 | −77.6 | |
| CTTE 28 | 10.2 | 197 | 3.27 | 514 | 0.6 | 31.4 | −75.6 | |
| CTTE 29 | 11.1 | 210 | 3.83 | 368 | 2.4 | 31.9 | −71.4 | |
| CTTE 30 | 11.2 | 210 | 3.55 | 521 | 0.8 | 32.3 | −71.3 | |
| CTTE 31 | 19.8 | 117 | 3.38 | 309 | 0.6 | 28.4 | −73.9 | |
| CTTE 32 | 19.0 | 115 | 3.10 | 342 | 0.2 | 33.0 | −70.4 | |
| CTTE 33 | 11.4 | 70 | 9.54 | 242 | 2.2 | 32.1 | −72.2 | 94.9 |
| CTTE 34 | 11.7 | 72 | 9.63 | 365 | 1.1 | 31.2 | −73.5 | 28.9 |
| CTTE 35 | 10.7 | 119 | 11.92 | 285 | 3.2 | 30.7 | −71.8 | |
| CTTE 36 | 11.0 | 117 | 11.66 | 344 | 2.4 | 52.6 | −57.0 | |
| CTTE 37 | 19.1 | 123 | 3.31 | 344 | 0.4 | 20.6 | −67.8 | NF |
| CTTE 38 | 18.0 | 122 | 3.21 | 356 | 0.3 | 26.1 | −55.4 | NF |
| CD1 | 19.3 | 124 | 3.13 | 306 | 0.5 | 20.4 | −62.5 | NF |
| CD2 | | 95 | | 98 | | 20.9 | | |

[a] Molecular Weight averages relative to PS standards, Coupling Efficiency ratios based on % cumulative GPC areas;
[b] RMN $^1$H 300 MHz, Vinyl in wt % based on total butadiene units;
[c] Glass Transition Temperature (inflexion point) by DSC @ 10° C./min;
[d] NF: non-flow observation for melt flow index testing.

TABLE 6

Counter Tapered Thermoplastic Elastomers Process

| | CTTE 23 | CTTE 24 | CTTE 25 | CTTE 26 | CTTE 32 | CTTE 33 | CTTE 34 | CTTE 37 | CTTE 38 | CD1 | CD2 |
|---|---|---|---|---|---|---|---|---|---|---|---|
| CHx (wt %)$^a$ | 85.7 | 85.7 | 85.6 | 85.6 | 85.7 | 85.6 | 85.6 | 85.5 | 85.3 | 85.4 | 89.1 |
| Randomizing agent (wt %)$^a$ | 0.0106 | 0.0106 | 0.0324 | 0.0318 | 0.0105 | 0.0165 | 0.0165 | 0.0019 | 0.1958 | 0.0471 | 0.0484 |
| 1st STY (wt %)$^b$ | 17.5 | 17.5 | 17.6 | 17.5 | 30.0 | 30.0 | 30.0 | 27.0 | 27.0 | 27.0 | 0.0 |
| Initial Temperature Ti (° C.) | 50.2 | 50.1 | 50.4 | 50.0 | 50.3 | 50.3 | 49.8 | 50.2 | 50.3 | 30.1 | 50.4 |
| BD (wt %)$^b$ | 65.9 | 65.9 | 70.1 | 65.9 | 63.7 | 63.7 | 63.7 | 50.9 | 50.9 | 50.9 | 69.7 |
| BD dose rate (g/min) | 66 | 61 | 70 | 66 | 59 | 59 | 59 | 48 | 48 | 11 | 10 |
| BD dosification time (min) | 6.5 | 7 | 6.5 | 6.5 | 7 | 7 | 7 | 7 | 7 | 31 | 33 |
| 2nd STY (wt %)$^b$ | 16.5 | 16.5 | 12.4 | 16.5 | 6.3 | 6.3 | 6.3 | 22.1 | 22.1 | 22.1 | 30.3 |
| 2nd STY dose rate (g/min) | 107 | 107 | 80 | 107 | 41 | 41 | 41 | 146 | 146 | 9 | 10 |
| STY dosification time (min) | 1 | 1 | 1 | 1 | 1 | 1 | 1 | 1 | 1 | 16 | 15 |
| Final Peak Temperature Tp (° C.) | 106.8 | 102.9 | 100.0 | 99.2 | 96.2 | 102.9 | 103.9 | 101.5 | 100.5 | 82.4 | 80.4 |
| Coupling agent (wt %)$^a$ | 0.0027 | 0.0000 | 0.0027 | 0.0027 | 0.0097 | 0.0190 | 0.0316 | 0.0092 | 0.0097 | 0.0053 | 0.0000 |

$^a$wt % of Total Reaction Mixture
$^b$wt % of Total Monomer Mixture

One embodiment of the invention based on Example 4 and Table 6 is a process for making counter tapered thermoplastic elastomers in either batch or semi-batch mode, which comprises:

preferably and optionally purifying solvent and monomers to decrease their moisture content to a maximum of 50 ppm, preferably less than 25 ppm and more preferably less than 5 ppm;

loading the solvent into a reactor and heating the solvent to an initial reaction temperature (Ti), which is between 4° and 60° C., possibly between 45 and 55° C., preferably between 47 and 53° C. and more preferably between 48 and 52° C. and about 50° C., which is more than 75 wt % of a total reaction mixture, preferably 80 to 95 wt %, more preferably 84 to 90 wt % and most preferably 85 to 87 wt % with values of about 85 or 86 wt % being typical, where the solvent is preferably cyclohexane;

preferably adding a suitable polar modifier into the reactor, which is preferably ditetrahydrofurylpropane (DTHFP) or tetrahydrofuran (THF) and more preferably DTHFP;

adding a monovinyl aromatic monomer to the reactor, which is preferably styrene, which is typically 10 to 35 wt %, preferably 15 to 33 wt % and more preferably 16 to 31 wt % of a total monomer mixture with 17.5, 27.0 and 30.0 wt % being possible amounts;

preferably and optionally allowing the solvent, polar modifier and monovinyl aromatic monomer to stabilize at the temperature Ti plus or minus 10° C., preferably plus or minus 5° C. and more preferably plus or minus 2° C. with stabilization at Ti being most preferred;

adding a lithium-based initiator in a suitable solvent solution into the reactor mixture, preferably n-butyllithium, preferably where the amount of initiator is stoichiometrically calculated to form individual blocks and to compensate for impurities;

allowing the reaction to preferably and optionally proceed to complete conversion, preferably to at least 90% conversion, more preferably to 95% conversion or more, to form a monovinyl aromatic homopolymer block A, optionally with a peak molecular weight Mp of 5 to 25 kg/mol, preferably with a peak molecular weight of 8 to 22 kg/mol and more preferably with a peak molecular weight of 10 to 20 kg/mol;

preferably adding a second addition of a monovinyl aromatic monomer into the reactor, preferably styrene, typically 5 to 25 wt %, preferably 6 to 22 wt %, with values of 6.3, 12.4, 16.5 and 22.1 wt % of the total monomer mixture being possible suitable values, generally within a period of 5 min, preferably in less than 2 min and more preferably within a time period of about 1 min;

dosing a conjugated diene monomer B into the reactor, preferably beginning at the same time as the second addition of a monovinyl aromatic monomer is added, preferably without an initial addition of a conjugated diene monomer and preferably without a wait time after an initial addition of a conjugated diene, where the total amount of the conjugated diene monomer dosed is more than 40 wt % of the total monomer mixture, typically between 45 and 90 wt %, generally between 45 and 80 wt %, preferably between 50 and 72 wt % of the total monomer mixture, where the conjugated diene monomer is dosed at a dose rate of 30 to 90 g/min, often at a dose rate of 35 to 80 g/min, generally at a dose rate of 45 to 75 g/min, and preferably at a dose rate of 48 to 70 g/min, where the time in which the conjugated diene monomer is dosed is less than 90, 80, 70, 60, 50, 40, 30, 20 or 15 min and is generally less 13 min and is generally dosed within a time period of 4 to 12 min, preferably within 5 to 9 min, more preferably within 6.5 to 7 min, preferably where the conjugated diene is butadiene or isoprene and more preferably is 1,3-butadiene;

allowing the reaction to proceed to at least 80% conversion, generally to over 90% conversion, preferably to at least 98% conversion, more preferably to at least 99% conversion and most preferably to complete conversion, preferably to a final peak temperature Tp of over 90° C., more preferably to 95 to 110° C. or 100 to 105° C., thereby forming a counter tapered copolymer block A/B and obtaining a living counter tapered diblock A-A/B copolymer, preferably in a single reactor and preferably without a need to use 2 reactors, generally where the peak molecular weight of the counter tapered diblock A-A/B copolymer is between 60 and 230 kg/mol, preferably where the peak molecular weight of the counter tapered diblock A-A/B copolymer is between 65 and 220 kg/mol and more preferably where the peak molecular weight of the counter tapered diblock A-A/B copolymer is between 70 and 215 kg/mol with a range of 100 to 130 kg/mol being most typical.

An optional, but preferable, next step, which is preferably carried out in the same reactor without a transfer to a second reactor, comprises:

adding a suitable coupling agent or combination of coupling agents, preferably silicon tetrachloride or an acrylic oligomer, to the reactor to partially couple the living counter tapered diblock A-A/B copolymer to form counter tapered thermoplastic elastomers, where the amount of the coupling agent is 0.0020 to 0.050 wt %, generally 0.0023 to 0.040 wt % and preferably 0.0025 to 0.0350 wt % of the total reaction mixture, generally where the ratio of uncoupled linear diblock A-[A/B] to coupled radial (A-[A/B]) n-X counter tapered thermoplastic elastomer is between 0.1 and 4.5, preferably where the ratio is between 0.1 and 4.0 and more preferably where the ratio is 0.2 to 2.7, generally where the weight average molecular weight Mw of the counter tapered thermoplastic elastomers is between 100 and 500 kg/mol, generally between 150 and 400 kg/mol and preferably between 170 and 375 kg/mol.

generally where the A/B-X-B/A midblock formed after coupling has a center region with a cumulative ratio of butadiene units to styrene units, where the cumulative B/S ratio is at least 3, preferably at least 5 and more preferably at least 10.

With reference to Table 5 and further to the embodiments described above, the coupled CTTE 20-38 has a total monovinyl aromatic monomer, preferably styrene, content of 10 to 55 wt %, generally 14 to 50 wt %, preferably 17 to 45 wt % and more preferably 20 to 40 wt %, with the remainder being conjugated diene monomer, preferably butadiene, content. Generally, coupled CTTE comprises 14 to 50 wt % monovinyl aromatic monomer units and 50 to 86 wt % conjugated diene monomer units, preferably 17 to 45 wt % monovinyl aromatic monomer units and 55 to 83 wt % conjugated diene monomer units, and more preferably 20 to 40 wt % monovinyl aromatic monomer units and 60 to 80 wt % conjugated diene monomer units. Further to the embodiment above, a linear diblock A-[A/B] is formed, which is living at the terminal B portion, and the coupling agent binds to the living terminal B portion and couples at least two of the linear diblock A-[A/B] units together to form (A-[A/B])-X-([B/A]-A) and/or the coupled radial (A-[A/B]) n-X counter tapered thermoplastic elastomer. After coupling, the CTTE has a central block that comprises units of both monovinyl aromatic monomer, preferably styrene, and conjugated diene monomer, preferably butadiene and a block on each end that is a homopolymer of the monovinyl aromatic monomer, preferably polystyrene. The midblock is the [A/B]-X-[B/A] portion, which may be a combination of linear and radial units depending on whether two or more [A/B] units bind to the coupling agent. This midblock portion in Table 5 is 4 to 40 wt % monovinyl aromatic monomer, preferably styrene, and 60 to 96 wt % conjugated diene monomer, preferably butadiene, generally is 5 to 35 wt % monovinyl aromatic monomer, preferably styrene, and 65 to 95 wt % conjugated diene monomer, preferably butadiene, and preferably 5 to 32 wt % monovinyl aromatic monomer, preferably styrene, and 68 to 95 wt % conjugated diene monomer, preferably butadiene, with 5 to 30 wt % monovinyl aromatic monomer, preferably styrene, and 70 to 95 wt % conjugated diene monomer, preferably butadiene, being most preferred. The midblock blockiness in Table 5 for CTTE 20-38 ranges from 5 to 80 wt %, generally 6 to 75 wt %, and preferably 6 to 45 wt %.

Further to the embodiment above and with reference to FIG. 5 and Table 4, the coupled CTTE 20-38, a linear diblock A-[A/B] is formed, which is living at the terminal B portion, and the coupling agent binds to the living terminal B portion and couples at least two of the linear diblock A-[A/B] units together to form (A-[A/B])-X-([B/A]-A) and/or the coupled radial (A-[A/B]) n-X counter tapered thermoplastic elastomer. After coupling, the CTTE has a central block that comprises units of both monovinyl aromatic monomer, preferably styrene, and conjugated diene monomer, preferably butadiene and a block on each end that is a homopolymer of the monovinyl aromatic monomer, preferably polystyrene. The midblock is the [A/B]-X-[B/A] portion, which may be a combination of linear and radial units depending on whether two or more [A/B] units bind to the coupling agent. FIGS. 1-4 illustrated the monomer distribution along the copolymer chain of the midblock [A/B]-X-[B/A] portion prior to coupling of CTTE 37 and 38, which show that the midblock have terminal regions that are rich in styrene monomer units (low butadiene/styrene cumulative ratio) and a center region that is rich in butadiene monomer units (high butadiene/styrene cumulative ratio). CTTE 37 has a butadiene/styrene B/S cumulative ratio of about 3.7 mol/mol for a midblock styrene of about 34.4 wt %; and CTTE 38 has a butadiene/styrene B/S cumulative ratio of about 3.7 mol/mol for a midblock styrene of about 34.3 wt %. The CTTE butadiene/styrene B/S cumulative ratio of the midblock portion in Table 4 is 2 to 30 mol/mol, generally is 3 to 25 mol/mol, and preferably 3 to 23 mol/mol, with 3 to 21 mol/mol, being most preferred. Generally where the A/B-X-B/A midblock formed after coupling has a center region with a cumulative ratio of butadiene units to styrene units, where the cumulative B/S ratio is at least 3, preferably at least 5 and more preferably at least 10.

In addition to the comparative testing related to the compositional and structural differences of inventive counter tapered copolymer versus the prior art controlled distribution copolymer, the performance in asphalt modification of the counter tapered copolymer of the present invention is next compared to the prior art controlled distribution copolymer. The results of the bituminous/asphalt evaluation of inventive counter tapered thermoplastic elastomer CTTE 38 composition compared with prior art controlled distribution CD1 comparative example are shown in Table B below. CTTE 38 polymer modified asphalt (CTTE 38 PMA) and CD1 polymer modified asphalt (CD1 PMA) results show the enhanced performance of the novel counter tapered thermoplastic elastomer composition as an asphalt modifier for road paving at 4.0 wt % of polymer content based on total PMA mixture. The results of CTTE 38 PMA and CD1 PMA show similar viscosity, softening point, ductility and elastic recovery. The low viscosity of the asphalt formulations, which contributes to facilitate the dispersion of the polymer into the asphalt and improves the time required for mixing, also facilitates the processing, handling and application of the modified asphalt mixtures by improving pumping capacity and/or decreasing the energy required to apply it, which also means an important cost reduction and a more environmentally-friendly process. Surprisingly, the results of CTTE 38 PMA and CD1 PMA show an unexpected wider range of AASHTO SUPERPAVE Performance Grade PG for inventive counter tapered CTTE 38 polymer modified asphalt, with better balance between high and low temperature properties when compared with controlled distribution CD1 polymer modified asphalt. Inventive counter tapered CTTE 38 polymer modified asphalt shows higher upper temperature limit (i.e., 88° C.) than controlled distribution CD1 polymer modified asphalt (i.e., 82° C.), which relates to the maximum temperature at which the asphalt may retain adequate rigidity to resist rutting. Inventive counter tapered CTTE 38 polymer modified asphalt shows similar lower temperature limit (i.e.,−6° C.) to controlled distribution CD1 polymer modified asphalt (i.e.,−6° C.), which relates to the minimum temperature at which the asphalt may retain adequate flexibility to resist thermal cracking.

TABLE B

Comparative Performance in Asphalt Reinforcement for Road Paving

| CTTE Polymer Modified Asphalt @ 4.0 wt % | CTTE 38 | CD1 |
|---|---|---|
| Brookfield Viscosity @ 135° C. (cP) | 2575 | 2425 |
| R&B Softening Point (° C.) | 74 | 74 |
| Ductility @ 4° C. (cm) | 5.0 | 5.0 |
| Elastic Recovery @ 25° C. by Ductilometer (%) | 86 | 88 |
| AASHTO SUPERPAVE Performance Grade PG | 88-6 | 82-6 |

Inventive Counter Tapered CTTE 38 PMA is characterized by a better balance of processing and reinforcement properties than prior art controlled distribution CD1 PMA. CTTE 38 Polymer Modified Asphalt shows a wider and better AASHTO SUPERPAVE Performance Grade PG at similar viscosity, softening point, ductility and elastic recovery than CD1 Polymer Modified Asphalt. The AASHTO SUPERPAVE performance grade PG 88-6 means that inventive CTTE 38 PMA meets at higher temperature the criterion that the Rutting Factor or Dynamic Shear Stiffness (G*/sin δ) takes the value of 1.0 kPa, where G* is the complex modulus and sin δ is the phase angle, which is a measurement of the minimum stiffness and elastic behavior required for polymer modified asphalt. 1 CTTE 38 Polymer Modified Asphalt shows PG 88-6, which predicts better pavement rutting performance, i.e., more resistant to permanent deformation at high temperature, than CD1 Polymer Modified Asphalt PG 82-6. The better performance grade PG of inventive CTTE 38 polymer modified asphalt is attributed to the novel and inventive counter tapered A-[A/B] or S-[S/B] monomer distribution and microstructure characteristics, i.e., higher styrene incorporation into the [A/B] or [S/B] midblock segment (lower butadiene/styrene cumulative ratio) proximal to the A homopolymer block or S polystyrene block relative to the lower styrene incorporation (higher butadiene/styrene cumulative ratio) distal to the A homopolymer block or S polystyrene block, combined with high vinyl and low midblock blockiness.

EMBODIMENTS OF THE INVENTION

6. A process for making a counter tapered thermoplastic elastomer composition comprising:
   loading a solvent into a reactor and heating the solvent to an initial reaction temperature (Ti), which is preferably between 5° and 75° C., wherein the amount of solvent is preferably more than 75 wt % of a total reaction mixture, wherein the solvent is preferably cyclohexane;
   adding a polar modifier into the reactor, which is preferably ditetrahydrofurylpropane (DTHFP) or tetrahydrofuran (THF);
   adding first amount of a monovinyl aromatic monomer to the reactor, which is preferably styrene, wherein the first amount of monovinyl aromatic monomer is preferably between 5 and 40 wt % of a total monomer mixture;
   adding a lithium-based initiator into the reactor mixture;
   allowing a reaction to proceed and thereby forming a monovinyl aromatic homopolymer block A, wherein the peak molecular weight Mp of block A is preferably between 5 to 30 kg/mol;
   adding a second amount of the or a monovinyl aromatic monomer into the reactor, wherein the second amount of monovinyl aromatic monomer is preferably between 2 and 35 wt % of the total monomer mixture, wherein the second amount is preferably added within a period of 5 min and more preferably in less than 2 min;
   dosing a conjugated diene monomer B into the reactor, preferably without an initial addition of a conjugated diene monomer and preferably without a wait time after an initial addition of a conjugated diene, preferably beginning concurrently with the addition of the second amount of monovinyl aromatic monomer, wherein the total amount of the conjugated diene monomer dosed is preferably more than 35 wt % of the total monomer mixture and more preferably between 40 and 95 wt %,
   wherein the conjugated diene monomer is preferably dosed at a dose rate of 20 to 95 g/min, and
   wherein the time in which the conjugated diene monomer is dosed is preferably less than 45 min and more preferably in less than 22 min;
   allowing a reaction to proceed to at least 75% conversion, preferably to a final peak temperature Tp of over 75° C., thereby forming a counter tapered copolymer block A/B and obtaining a living counter tapered diblock A-A/B copolymer, preferably in a single reactor and preferably without a need to use 2 reactors, wherein the peak molecular weight of the counter tapered diblock A-A/B copolymer is preferably between 40 and 400 kg/mol and more preferably between 50 and 300 kg/mol.

7. The process for making a counter tapered thermoplastic elastomer composition of embodiment 6, further comprising:
   adding a coupling agent, which may be a single coupling agent, a combination of coupling agents, an acrylic oligomer or a combination of these, to the reactor to couple, preferably partially, the living counter tapered diblock A-A/B copolymer to form counter tapered thermoplastic elastomers, preferably carried out in the same reactor, preferably without a transfer to a second reactor, wherein the amount of the coupling agent is preferably 0.0005 to 0.0900 wt % of the total reaction mixture,
   wherein the ratio of uncoupled linear diblock A-[A/B] to coupled radial (A-[A/B]) n-X counter tapered thermoplastic elastomer is preferably between 0.05 and 15.0,
   wherein the weight average molecular weight Mw of the counter tapered thermoplastic elastomers is preferably between 30 and 1,000 kg/mol, and
   wherein the A/B-X-B/A midblock formed after coupling preferably has a center region with a cumulative ratio of butadiene units to styrene units, wherein the cumulative B/S ratio is generally at least 1, usually at least 2.5 preferably at least 5 and more preferably at least 10.

8. The process for making a counter tapered thermoplastic elastomer composition of embodiment 6 or 7, wherein the total monovinyl aromatic monomer content of the final product is preferably between 5 to 75 wt % and more preferably between 10 and 55 wt %.

9. The process for making a counter tapered thermoplastic elastomer composition of embodiment 6, 7 or 8, with respect to a coupled CTTE, wherein the total monovinyl aromatic monomer content of the coupled CTTE is preferably between 5 to 70 wt %, and wherein the coupled CTTE preferably comprises between 30 to 95 wt % conjugated diene monomer units.

10. The process for making a counter tapered thermoplastic elastomer composition of any one of embodiments 6-9, with respect to the coupled CTTE, wherein a midblock portion of the coupled CTTE is preferably between 2 to 60 wt % monovinyl aromatic monomer and preferably 40 to 98 wt % conjugated diene monomer, and wherein a midblock blockiness preferably ranges from 5 to 80 wt %.

11. The process for making a counter tapered thermoplastic elastomer composition of any one of embodiments 6-10, wherein the proportion of monovinyl aromatic monomer in the midblock decreases as the midblock is formed.

Example 5

Applications in Polymer Modified Asphalt (PMA) for Road Paving

The high Mw counter tapered thermoplastic elastomer compositions (CTTE 8-13) in Table 1 and 2, prepared as described in Example 1, were used as asphalt modifiers or asphalt reinforcing agents in polymer modified asphalt (PMA) for road paving formulations. CTTE 8-13 PMA formulations were prepared and characterized following the procedures described in Example 2.

CTTE polymer modified asphalt (CTTE 8-13 PMA) results are given in Table 5a below and show the enhanced performance of the novel counter tapered thermoplastic elastomer compositions as asphalt modifiers for road paving at 2.2 wt % of CTTE polymer content based on total PMA mixture.

TABLE 5a

Performance of High Mw CTTE in Asphalt Reinforcement for Road Paving

| CTTE Polymer Modified Asphalt @ 2.2 wt % | CTTE 8 PMA | CTTE 9 PMA | CTTE 10 PMA | CTTE 11 PMA | CTTE 12 PMA | CTTE 13 PMA |
|---|---|---|---|---|---|---|
| Brookfield Viscosity @ 135° C. (cP) | 1820 | 1899 | 1639 | 1989 | 1830 | 1780 |
| Penetration @ 25° C. (dmm) | 44 | 43 | 54 | 39 | 45 | 46 |
| R&B Softening Point (° C.) | 65 | 66 | 63 | 70 | 67 | 64 |
| Ductility @ 4° C. (cm) | 6.5 | 6 | 7 | 4 | 6 | 7 |
| Elastic Recovery @ 25° C. by Torsion (%) | 34 | 37 | 35 | 39 | 36 | 32 |
| Elastic Recovery @ 25° C. by Ductilometer (%) | 65 | 69 | 59 | 71 | 67 | 64 |
| AASHTO SUPERPAVE Performance Grade PG | 82-10 | 82-16 | 82-16 | 82-16 | 82-16 | 82-10 |

Reviewing Table 5a, the results show low viscosity, higher elastic response, wide range of PG polymer modified asphalts, and excellent balance between high and low temperature properties. The combination of low viscosity with high elastic response of the asphalt formulations with CTTE compositions provides a desirable balance between processability and reinforcement performance.

Example 6

Applications in Polymer Modified Asphalt (PMA) for Roofing and Waterproofing Membranes The high Mw counter tapered thermoplastic elastomer compositions (CTTE 8-13) in Table 1 and 2, prepared as described in Example 1, were used as asphalt modifiers or asphalt reinforcing agents in polymer modified asphalt (PMA) for roofing and waterproofing membranes formulations. CTTE 8-13 polymer modified asphalt (PMA) formulations were prepared following the procedures described in Example 2.

The CTTE 8-13 polymer modified asphalt (PMA) mixtures thus obtained were characterized by Ring and Ball Softening Point Temperature (TRBSP) according to ASTM D36. Penetration was measured according to ASTM D5 at 60° C., 10 seconds and 100 grams using a Koheler Penetrometer model K95500. Dynamic viscosity at 160 and 190° C. was measured according to ASTM D4402 by using a Brookfield viscometer model RDVS-II+. Flexibility at low temperature was determined by measuring BDA Cold Bending Temperature.

CTTE polymer modified asphalt (CTTE 8-13 PMA) results are given in Table 6a below and show the enhanced performance of the novel counter tapered thermoplastic elastomer compositions as asphalt modifiers for roofing and waterproofing membranes at 8 wt % of CTTE polymer content based on total PMA mixture.

TABLE 6a

Performance of High Mw CTTE in Asphalt Reinforcement for Roofing and Waterproofing Membranes

| CTTE Polymer Modified Asphalt @ 8 wt% | CTTE 8 PMA | CTTE 9 PMA | CTTE 10 PMA | CTTE 11 PMA | CTTE 12 PMA | CTTE 13 PMA |
|---|---|---|---|---|---|---|
| Brookfield Viscosity @ 160° C. (cP) | 8938 | 10150 | 9972 | 11247 | 10095 | 8160 |
| Brookfield Viscosity @ 190° C. (cP) | 2660 | 3083 | 2933 | 3975 | 3105 | 2510 |
| Penetration @ 60° C. (dmm) | 152 | 133 | 152 | 121 | 140 | 146 |
| R&B Softening Point Temperature (° C.) | 94 | 102 | 99 | 104 | 102 | 92 |
| BDA Cold Bending Temperature (° C.) | −14 | −12 | −14 | −10 | −12 | −14 |

Reviewing Table 6a, the results show low viscosity, high softening point, improved flexibility at low temperature, and excellent balance between high and low temperature properties. The combination of low viscosity with high softening point of the asphalt formulations with CTTE compositions provides a very desirable balance between processability and reinforcement performance.

Example 7

Applications in Polymer Modified Asphalt (PMA) for Road Paving and Roofing Membranes High Mw counter tapered thermoplastic elastomer compositions were prepared in a 180 Liter reactor system operated under inert nitrogen atmosphere in batch or semi-batch mode according to the teachings of this invention. CTTE Prototype Dyne 143A was obtained following the procedure described in Example 1 and used as asphalt modifier or asphalt reinforcing agent in polymer modified asphalt (PMA) for road paving and roofing membranes formulations. CTTE Prototype Dyne 143A PMA formulations were prepared and characterized following the procedures described in Example 2 and Example 6.

CTTE Prototype Dyne 143A PMA results are given in Table 7 below and show the enhanced performance of the novel counter tapered thermoplastic elastomer compositions as asphalt modifiers for road paving at 2.3 wt % and roofing membranes at 6 and 12 wt % of CTTE polymer content based on total PMA mixture. The CTTE Prototype Dyne 143A PMA processability performance is compared with PMA mixtures of two commercially available block copolymers, Solprene 411 and Solprene 1205. Solprene 411 is a multiarm highly-coupled block copolymer (also known as radial SBn thermoplastic elastomer) with about 30 wt % total styrene content as pure block and no tapered characteristics. Solprene 1205 is a normal tapered diblock B/S-S copolymer (also known as gradual SBR) with about 25 wt % total styrene content and about 17.5 wt % block styrene content.

TABLE 7

Performance of High Mw CTTE in Asphalt Reinforcement for Road Paving and Roofing Membranes

| CTTE Polymer Modified Asphalt Mixtures | Neat Asphalt PG 64-22 | PMA Polymer Content (wt %) | Solprene 411 PMA | CTTE Prototype Dyne 143A PMA | Solprene 1205 PMA |
|---|---|---|---|---|---|
| Dispersion Time, min | — | 2.3 | 240 | 180 | 180 |
| Dispersion Time, min | — | 6 | 360 | 240 | 240 |
| Brookfield Viscosity @ 135° C. (cP) | 556 | 2.3 | 2359 | 1856 | 1350 |
| Brookfield Viscosity @ 160° C. (cP) | 556 | 12 | 22100 | 13165 | 11509 |

Figure 6:
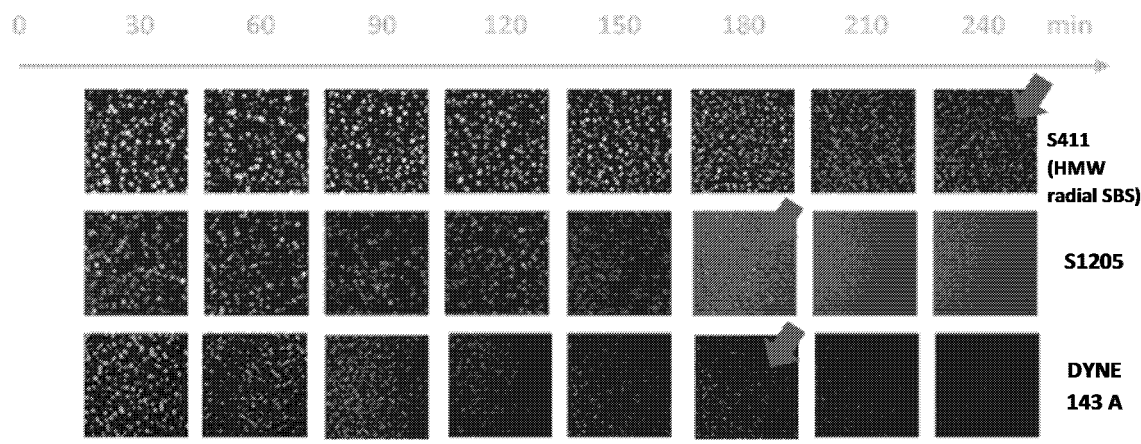
FIG. 6 depicts the 20X fluorescence microscopy images of several polymer modified asphalt (PMA) monitored throughout the mixing process at 190° C. and prepared with 2.3 wt % of polymer. Each arrow points at the image corresponding to the mixing time when complete polymer dispersion is observed for various PMA mixtures. The dispersion performance of CTTE prototype Dyne 143A in PMA is compared with PMA mixtures of commercially available polymers and described in Example 7.
Figure 7:
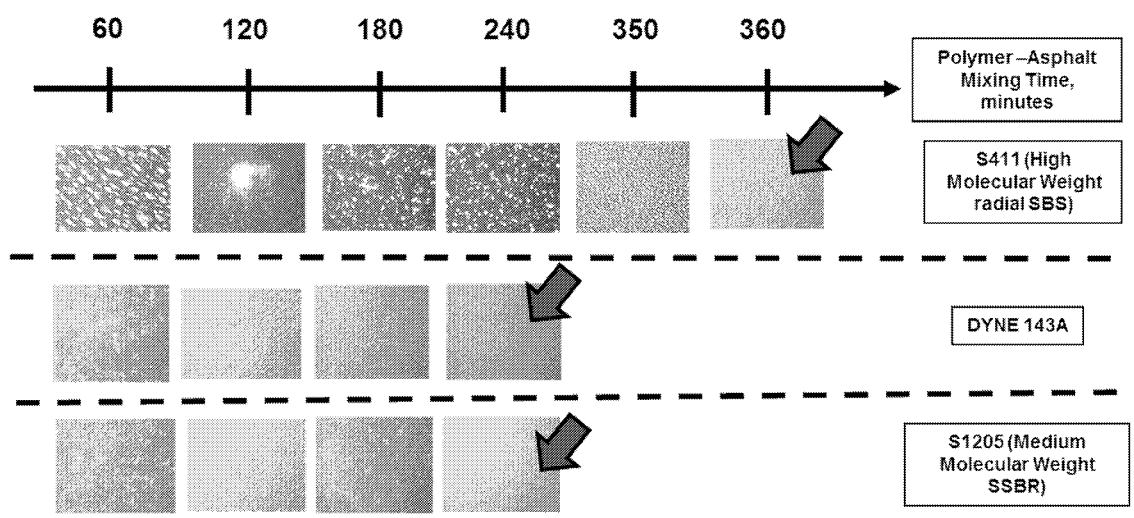
FIG. 7 depicts the 20X fluorescence microscopy images of several polymer modified asphalt (PMA) monitored throughout the mixing process at 190° C. and prepared with 6 wt % of polymer. Each arrow points at the image corresponding to the mixing time when complete polymer dispersion is observed for various PMA mixtures. The dispersion performance of CTTE prototype Dyne 143A in PMA is compared with PMA mixtures of commercially available polymers and described in Example 7.

In addition to Table 7, FIGS. 6 and 7 depict the 20X fluorescence microscopy images of CTTE Prototype Dyne 143A PMA monitored throughout the mixing process at 190° C. and prepared with 2.3 and 6 wt % of polymer, respectively. Each arrow points at the image corresponding to the mixing time when complete polymer dispersion is observed for each PMA mixture. The dispersion performance of CTTE prototype Dyne 143A in PMA is compared with PMA mixtures of commercially available polymers, Solprene 411 and Solprene 1205. The fluorescence microscopy images allow to observe the morphology of both polymer-rich phase and asphalt-rich phase. The polymer-rich phase is observed as the brighter regions and asphalt rich phase as the darker regions. A qualitative comparison of the fluorescent microscopy images in FIG. 6 for the corresponding PMA mixing time of CTTE prototype Dyne 143A versus Solprene 411 and Solprene 1205, revealed that the polymer-rich phase in CTTE prototype Dyne 143A PMA at 2.3 wt % was completely dispersed at 180 min, which is much shorter (about 25%) than the dispersion time in Solprene 411 PMA and the same dispersion time as required in Solprene 1205 PMA. The reduction in particle size is evidence of enhanced compatibility with asphalt, in agreement with the findings of L. H. Lewandowski (1994), Rubber Chemistry and Technology, Rubber Reviews, Vol. 67, No.3, pp. 447-480. A qualitative comparison of the images in FIG. 7 corresponding to PMA at 6 wt %, revealed a relatively similar mixing behavior but longer dispersion times, the polymer-rich phase in CTTE prototype Dyne 143A PMA at 6 wt % was completely dispersed at 240 min, which is even much shorter (about 33%) than the dispersion time in Solprene 411 PMA and the same dispersion time as required in Solprene 1205 PMA. CTTE prototype Dyne 143A has a PMA dispersion performance dependence on polymer concentration similar to Solprene 1205.

Reviewing Table 7, the results show a low viscosity at 135° C. for CTTE prototype Dyne 143A PMA at 2.3 wt %, which is intermediate between a higher (about 30%) viscosity for Solprene 411 PMA and a lower (about 30%) viscosity for Solprene 1205 PMA. Surprisingly, viscosity at 160° C. for CTTE prototype Dyne 143A PMA at 12 wt %, which is also intermediate but between a much higher (about 70%) viscosity for Solprene 411 PMA and a much closer (about 10%) viscosity for Solprene 1205 PMA. CTTE prototype Dyne 143A has a PMA viscosity development dependence on polymer concentration similar to Solprene 1205. Low viscosity also provides an advantage for mixing and compaction of hot mix asphalt used in road paving.

Figure 8:
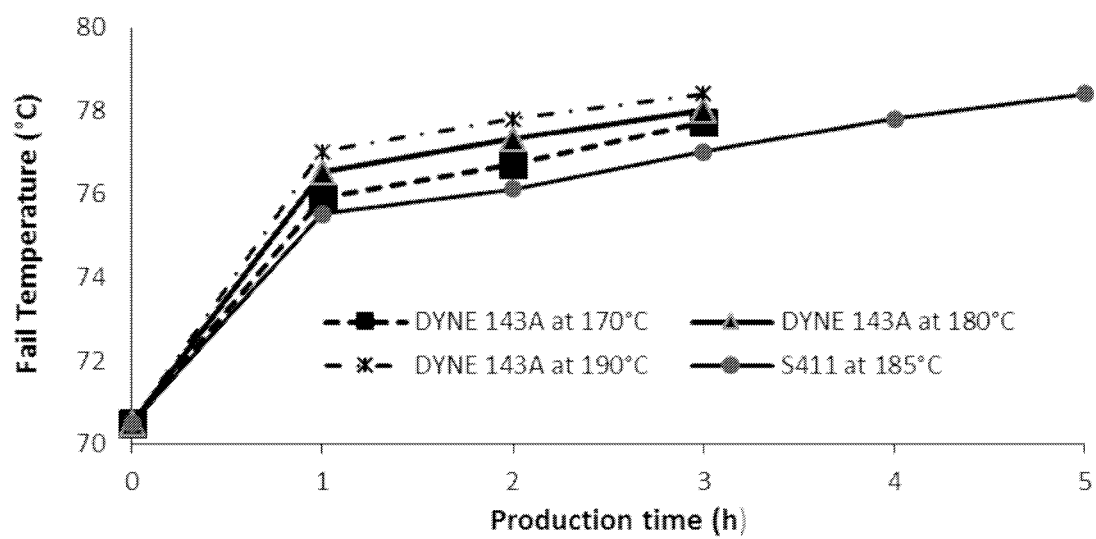
FIG. 8 depicts the maximum performance grade (AASHTO Standards PG) temperatures of several polymer modified asphalt (PMA) monitored throughout the mixing process at different temperatures (170-190° C.) and prepared with 2.3 wt % of polymer. Fail temperature performance with increasing production (mixing) time of CTTE prototype Dyne 143A PMA is compared with PMA mixtures of commercially available polymers and described in Example 7.

FIG. 8 depicts the maximum performance grade (AASHTO Standards PG) temperatures of several polymer modified asphalt (PMA) monitored throughout the mixing process at different temperatures and prepared with 2.3 wt % of polymer. The reinforcement performance of CTTE Prototype Dyne 143A PMA mixed at 170, 180 and 190° C. is compared with a commercially available block copolymer Solprene 411 PMA mixed at 185° C. Reviewing FIG. 8, the results show higher fail temperature (maximum performance grade temperature) of CTTE prototype Dyne 143A PMA throughout the mixing process than Solprene 411 PMA, at every mixing temperature, even when mixed at 15° C. lower mixing temperature (170° C.). Surprisingly, CTTE prototype Dyne 143A PMA provides a similar reinforcement performance to Solprene 411 PMA combined with an important cost and/or processing advantage.

In summary, the results described in Example 7 show that the novel counter tapered thermoplastic elastomer composition provides a novel polymer modified asphalt CTTE prototype Dyne 143A PMA with: a dispersion performance dependence on polymer concentration similar to Solprene 1205; a viscosity development dependence on polymer concentration similar to Solprene 1205; and surprisingly, with a similar reinforcement performance to Solprene 411 PMA combined with an important cost and/or processing advantage. The surprising combination of CTTE Prototype Dyne 143A PMA processability and reinforcement performance provides a very desirable balance for the asphalt modification industry, for both road paving and roofing membranes applications. On top of the outstanding reinforcement performance of the resulting PMA mixtures, the much lower viscosity of the asphalt formulations besides contributing to facilitate the dispersion of the polymer into the asphalt and improve the time required for mixing, even at lower temperature, also facilitates the processing, handling and application of the modified asphalt mixtures by improving pumping capacity and/or decreasing the energy required to apply it, and/or by promoting thermal storage stability. This also means an important cost reduction and a more environmentally-friendly process.

Example 8

Applications in Polymer Modified Asphalt (PMA) for Road Paving

The High Mw CTTE Prototype Dyne 143A described in Example 7 was used as asphalt modifier or asphalt reinforcing agent in polymer modified asphalt (PMA) for road paving formulations. CTTE Prototype Dyne 143A PMA formulations were prepared and characterized following the procedures described in Example 2.

CTTE Prototype Dyne 143A PMA results are given in Table 8 below and show the enhanced performance of the novel counter tapered thermoplastic elastomer compositions as asphalt modifiers for road paving at 2.3, 2.5 and 2.8 wt % of CTTE polymer content based on total PMA mixture. The CTTE Prototype Dyne 143A PMA reinforcement performance is compared with PMA mixtures of two commercially available block copolymers, Solprene 411 and Solprene 1205.

TABLE 8

Performance of High Mw CTTE in Asphalt Reinforcement for Road Paving

| CTTE Polymer Modified Asphalt Mixtures | Neat Asphalt | PMA Polymer Content (wt %) | Solprene 411 PMA | CTTE Prototype Dyne 143A PMA | Solprene 1205 PMA |
|---|---|---|---|---|---|
| Elastic Recovery @ 25° C. by Torsion (%) | — | 2.5 | 45 | 41 | 30 |
| Elastic Recovery @ 25° C. by Ductilometer (%) | — | 2.5 | 65 | 68 | 44 |
| AASHTO SUPERPAVE Performance Grade PG | 64-22 | 2.3 | 76-22 | 88-22 | 70-22 |
| AASHTO SUPERPAVE Performance Grade PG | 64-22 | 2.8 | 76-22 | 88-22 | 76-22 |

Reviewing Table 8, surprisingly the results show a high elastic response at 25° C. for CTTE prototype Dyne 143A PMA at 2.5 wt %, which is similar to that for Solprene 411 PMA and much higher (about 35%) than that for Solprene 1205 PMA. Also surprisingly, a wide range of performance grade PG is achieved for CTTE prototype Dyne 143A PMA mixtures at 2.3 and 2.8 wt %, which is even wider than the ranges for Solprene 411 PMA and Solprene 1205 PMA. CTTE prototype Dyne 143A provides better PMA reinforcement performance and improved high temperature properties than both Solprene 411 and Solprene 1205 for road paving applications, which translates into high plastic deformation resistance, high fatigue resistance and lower thermal cracking.

Example 9

Applications in Polymer Modified Asphalt (PMA) for Roofing and Waterproofing Membranes The High Mw CTTE Prototype Dyne 143A described in Example 7 was used as asphalt modifier or asphalt reinforcing agent in polymer modified asphalt (PMA) for roofing and waterproofing membrane formulations. CTTE Prototype Dyne 143A PMA formulations were prepared and characterized following the procedures described in Example 2 and Example 6.

CTTE Prototype Dyne 143A PMA results are given in Table 9 below and show the enhanced performance of the novel counter tapered thermoplastic elastomer compositions as asphalt modifiers for roofing and waterproofing membranes at 6 wt % of CTTE polymer content based on total PMA mixture, loaded with 20 and 30 wt % lime filler content. The CTTE Prototype Dyne 143A PMA processability performance is compared with that of the PMA mixture of a commercially available block copolymer Solprene 411.

TABLE 9

Performance of High Mw CTTE in Asphalt Reinforcement for Roofing and Waterproofing Membranes

| CTTE Polymer Modified Asphalt Mixtures | PMA Filler Content (wt %) | Solprene 411 PMA | CTTE Prototype Dyne 143A PMA |
|---|---|---|---|
| Brookfield Viscosity @ 160° C. (cP) | 20 | 18356 | 13060 |
| Brookfield Viscosity @ 190° C. (cP) | 20 | 9480 | 6069 |

TABLE 9-continued

Performance of High Mw CTTE in Asphalt Reinforcement
for Roofing and Waterproofing Membranes

| CTTE Polymer Modified Asphalt Mixtures | PMA Filler Content (wt %) | Solprene 411 PMA | CTTE Prototype Dyne 143A PMA |
|---|---|---|---|
| Brookfield Viscosity @ 160° C. (cP) | 30 | — | 18098 |
| Brookfield Viscosity @ 190° C. (cP) | 30 | — | 9408 |

Reviewing Table 9, the results show low viscosities at 160 and 190° C. for CTTE prototype Dyne 143A PMA loaded with 20 wt % lime filler, which are much lower (about 35-45%) than those for Solprene 411 PMA at same filler load. Also, viscosities at 160 and 190° C. similar to those for Solprene 411 PMA at 20 wt % filler load are developed for CTTE prototype Dyne 143A PMA loaded with higher (about 50%) filler load (30 wt % lime filler). CTTE prototype Dyne 143A provides better filled PMA processability performance than Solprene 411, which allows for higher filler load PMA formulations, and therefore important cost reduction and higher deformation resistance for roofing, shingles and waterproofing membrane applications.

Example 10

Applications in Polymer Modified Asphalt (PMA) for Roofing and Waterproofing Membranes The High Mw CTTE Prototype Dyne 143A described in Example 7 was used as asphalt modifier or asphalt reinforcing agent in polymer modified asphalt (PMA) for roofing and waterproofing membrane formulations. CTTE Prototype Dyne 143A PMA formulations were prepared and characterized following the procedures described in Example 2 and Example 6.

CTTE Prototype Dyne 143A PMA results are given in Table 10 below and show the enhanced performance of the novel counter tapered thermoplastic elastomer compositions as asphalt modifiers for roofing and waterproofing membranes at 4 and 5 wt % of CTTE polymer content based on total PMA mixture. The CTTE Prototype Dyne 143A PMA reinforcement performance is compared with that of the PMA mixture of a commercially available block copolymer Solprene 411.

TABLE 10

Performance of High Mw CTTE in Asphalt Reinforcement
for Roofing and Waterproofing Membranes

| CTTE Polymer Modified Asphalt Mixtures | PMA Polymer Content (wt %) | Solprene 411 PMA | CTTE Prototype Dyne 143A PMA |
|---|---|---|---|
| R&B Softening Point Temperature (° C.) | 4 | 109 | 102 |
| BDA Cold Bending Temperature (° C.) | 4 | −9 | −12 |
| R&B Softening Point Temperature (° C.) | 5 | — | 109 |
| BDA Cold Bending Temperature (° C.) | 5 | — | −11 |

Reviewing Table 10, the results show an improved balance between high (softening point) and low temperature (cold bending) performance for CTTE prototype Dyne 143A PMA, which is better at low temperature and acceptable at high temperature than that for Solprene 411 PMA at same (4 wt %) polymer content. Surprisingly, an excellent balance between high (softening point) and low temperature (cold bending) performance for CTTE prototype Dyne 143A PMA is achieved at about 20% higher (5 wt %) polymer content, which is better at low temperature and similar at high temperature than that for Solprene 411 PMA prepared at lower (4 wt %) polymer content. The novel high Mw CTTE prototype Dyne 143A provides improved PMA reinforcement performance than Solprene 411, which allows for good workability at high temperature and better flexibility (improved fracture resistance) at low temperature for roofing, shingles and waterproofing membrane applications.

Example 11

Applications in Polymer Modified Asphalt (PMA) for Road Paving

Low Mw counter tapered thermoplastic elastomer compositions were prepared in a 180 Liter reactor system operated under inert nitrogen atmosphere in batch or semi-batch mode according to the teachings of this invention. The low Mw CTTE Prototype Dyne 143C was obtained following the procedure described in Example 1 and used as asphalt modifier or asphalt reinforcing agent in polymer modified asphalt (PMA) for road paving formulations. CTTE Prototype Dyne 143C PMA formulations were prepared and characterized following the procedures described in Example 2.

CTTE Prototype Dyne 143C PMA results are given in Table 11 below and show the enhanced performance of the novel counter tapered thermoplastic elastomer compositions as asphalt modifiers for road paving at 2.3, 2.5 and 2.8 wt % of CTTE polymer content based on total PMA mixture. The CTTE Prototype Dyne 143C PMA processability and reinforcement performance is compared with PMA mixtures of two commercially available block copolymers, Solprene 1205 and Kraton D1192. The former has already been described in Example 7, and the latter is described as a full sequential triblock copolymer high vinyl SBS with about 30 wt % total styrene as a pure polystyrene block with no tapered characteristics.

TABLE 11

Performance of Low Mw CTTE in Asphalt
Reinforcement for Road Paving

| CTTE Polymer Modified Asphalt Mixtures | Neat Asphalt | PMA Polymer Content (wt %) | Solprene 1205 PMA | CTTE Prototype Dyne 143C PMA | Kraton D1192 PMA |
|---|---|---|---|---|---|
| Brookfield Viscosity @ 135° C. (cP) | 556 | 2.3 | 1350 | 1405 | 1375 |
| Elastic Recovery @ 25° C. by Torsion (%) | — | 2.5 | 30 | 40 | 31 |
| Elastic Recovery @ 25° C. by Ductilometer (%) | — | 2.5 | 44 | 62 | 48 |
| AASHTO SUPERPAVE Performance Grade PG | 64-22 | 2.3 | 70-22 | 70-22 | 70-22 |
| AASHTO SUPERPAVE Performance Grade PG | 64-22 | 2.8 | 76-22 | 76-22 | 76-22 |

Reviewing Table 11, the results show a very low viscosity at 135° C. for CTTE prototype Dyne 143C PMA at 2.3 wt %, which is surprisingly similar to those of both Solprene 1205 and Kraton D1192 PMA mixtures. More surprisingly, higher (about 20-40%) elastic response at 25° C. for CTTE prototype Dyne 143C PMA at 2.5 wt % than those of both Solprene 1205 and Kraton D1192 PMA mixtures. CTTE prototype Dyne 143C is expected to provide PMA viscosity development dependence on polymer concentration similar to those for Solprene 1205 and Kraton D1192 PMA mixtures, which is advantageous for processing and handling of PMA concentrates in the asphalt industry, and for mixing and compaction of hot mix asphalt used in road paving.

Also surprisingly, a wide range of performance grade PG is achieved for CTTE prototype Dyne 143C PMA mixtures at 2.3 and 2.8 wt %, which is the same range as those for Solprene 1205 and Kraton D1192 PMA mixtures. The novel CTTE prototype Dyne 143C provides PMA with a processability and reinforcement performance balance similar to those for Solprene 1205 and Kraton D1192 PMA mixtures for road paving applications, which translates into high plastic deformation resistance, high fatigue resistance and lower thermal cracking.

Example 12

Applications in Polymer Modified Asphalt (PMA) for Road Paving

The Low Mw CTTE Prototype Dyne 143C described in Example 11 was used as asphalt modifier or asphalt reinforcing agent in polymer modified asphalt (PMA) for road paving formulations. CTTE Prototype Dyne 143C PMA formulations were prepared following the procedures described in Example 2. The adhesive strength was measured at standard temperature and moisture laboratory conditions by using a TA.XTPlus texture analyzer from Stable Micro Systems.

CTTE Prototype Dyne 143C PMA results are given in Table 12 below and show the enhanced performance of the novel counter tapered thermoplastic elastomer compositions as asphalt modifiers for road paving at 2.3 wt % of CTTE polymer content based on total PMA mixture. The CTTE Prototype Dyne 143C PMA reinforcement performance is compared with PMA mixtures of two commercially available block copolymers, Solprene 411 and Solprene 1205.

TABLE 12

Performance of Low Mw CTTE in Asphalt Reinforcement for Road Paving

| CTTE Polymer Modified Asphalt Mixtures Adhesive Strength (Load in kg) | Solprene 1205 PMA | CTTE Prototype Dyne 143C PMA | Solprene 411 PMA |
|---|---|---|---|
| Test # 1 | 3559 | 3394 | 2050 |
| Test # 2 | 3920 | 3870 | 2125 |
| Test # 3 | 3570 | 3831 | 2189 |
| Test # 4 | 3879 | 3377 | 2224 |
| Test # 5 | 3466 | 3457 | 1990 |
| Test # 6 | 3670 | 3647 | 2187 |
| Test # 7 | 3957 | 3696 | 1995 |
| Test # 8 | 3427 | 3893 | 2357 |
| Test # 9 | 3663 | 3479 | 2167 |
| Test # 10 | 3525 | 3816 | 2290 |
| Average | 3664 | 3646 | 2158 |

Reviewing Table 12, surprisingly the results show an average adhesive strength for CTTE prototype Dyne 143C PMA, which is very similar to that for Solprene 1205 PMA and much higher (about 70%) than that for Solprene 411 PMA. CTTE prototype Dyne 143C provides a PMA reinforcement performance with improved adherence properties similar to Solprene 1205 PMA mixture, which is an important characteristic in asphalt-aggregate surface interactions for road paving applications.

Example 13

Applications in Polymer Modified Asphalt Emulsions (PME) for Road Paving

The Low Mw CTTE Prototype Dyne 143C described in Example 11 was used as asphalt modifier or asphalt reinforcing agent in polymer modified asphalt emulsions (PME) for road paving formulations. CTTE Prototype Dyne 143C PME formulations were prepared according to the US standard specification RS-1P and characterized following the procedures described in Example 3. Original CTTE Prototype Dyne 143C PMA was mixed at 170° C. before the emulsification process.

CTTE Prototype Dyne 143C PME results are given in Table 13 below and show the enhanced performance of the novel counter tapered thermoplastic elastomer compositions as asphalt modifiers in emulsions for road paving at 3 wt % of CTTE polymer dry basis content based on total PMA residual, and PG 64-22 base asphalt fluxed with 5% aromatic flux. The CTTE Prototype Dyne 143C PME processability and reinforcement performance is compared with PME of two commercially available block copolymers, Solprene 4318 and Solprene 1205, and PME of a commercially available high-solids aqueous polymeric dispersion, 24 wt % styrene content SBR latex Butonal 4190.

TABLE 13

Performance of Low Mw CTTE in Asphalt Reinforcement for Road Paving

| CTTE Polymer Modified Asphalt (Emulsion & Residual) | US Standard Specification RS-1P | Butonal 4190 PME | Solprene 1205 PME | Solprene 4318 PME | CTTE Prototype Dyne 143C PME |
|---|---|---|---|---|---|
| Saybolt Furol Viscosity @ 50° C. (SSF) | 50 to 200 | 70 | 53 | 79 | 62 |
| Storage Stability @ 1 day (%) | 1 maximum | 0.9 | 0.5 | 0.6 | 0.6 |
| Sieve Test (%) | 0.1 maximum | 0.090 | 0.050 | 0.065 | 0.060 |
| Residue (%) | 65% minimum | 65 | 65 | 65 | 65 |
| Penetration @ 25° C. (dmm) | 225 to 300 | 293 | 280 | 251 | 230 |
| Softening Point (° F.) | | 52 | 50 | 53 | 52 |
| Ductility @ 4° C. (cm) | 50 minimum | 39 | 55 | 50 | 53 |
| Elastic Recovery @ 10° C. (%) | 55 minimum | 48 | 48 | 55 | 55 |

Reviewing Table 13, the results show low viscosity, excellent storage stability and excellent sieve residue for the polymer modified asphalt emulsion CTTE prototype Dyne 143C PME. The mixing at low temperature (170° C.) of CTTE prototype Dyne 143C PMA before the emulsification process at 150° C., provides an important processing advantage by reducing the PMA cooling time required by half, from about 6-8 h to about 3-4 h. Also, the results show high elastic response at 10° C., and better balance between high (softening point) and low (ductility) temperature properties for the polymer modified asphalt residual CTTE prototype Dyne 143C PMA. CTTE prototype Dyne 143C provides a PME processability and PMA reinforcement performance with improved balance of properties that is very competitive against PME prepared with commercially available polymers, which also meets the US standard specification RS-1P for PME road paving applications such as chip seal, tack coat and cold mix. The CTTE prototype Dyne 143C PMA improved adhesive strength described in Example 12 is expected to provide polymer modified asphalt emulsions (PME) with the adherence required for surface treatments such as chip seal application.

Example 14

Preparation of Counter Tapered Thermoplastic Elastomers (CTTE)

In Example 14, several novel counter tapered thermoplastic elastomers (CTTE 39-44) were prepared according to the process claimed in the present invention. Polymers CTTE 39-44 are counter tapered diblock A-[A/B] copolymers, wherein the A-[A/B] diblock consisted of a monovinyl aromatic homopolymer block A block that was a polystyrene block S and a counter tapered copolymer block [A/B] that was a styrene/butadiene copolymer block [S/B], wherein counter tapered means that the ratio of B to A in the [A/B] block is lower proximal to the A block relative to the ratio of B to A distal to the A block, and wherein the vinyl content is higher proximal to the A block relative to the vinyl content distal to the A block in the counter tapered diblock A-[A/B] copolymer.

These novel counter tapered thermoplastic elastomer (CTTE 39-44) compositions were characterized by GPC, 1H NMR and DSC methodologies to determine: molecular weight average and molecular weight distribution characteristics such as peak molecular weight (Mp) for linear diblocks, and weight average molecular weight (Mw); microstructural characteristics such as Total Styrene, Block Styrene, and Vinyl [A/B] block contents; glass transition temperatures (Tg) for A/B counter tapered copolymer block; and melt flow rates (MFI) of the CTTE counter tapered thermoplastic compositions. In addition, calculations of the [A/B] Block Styrene and [A/B] Block Blockiness were also performed following the method used to characterize the polymer mid or "B" block as Calc. Mid PSC and Calc. Mid Blocky in US 2003/0176582 A1 patent application publication on Sep. 18, 2003 by KRATON Polymers U.S. LLC and Bening et al. Tables 14-15 enlist the analytical characterization results and Table 16 the polymerization conditions for CTTE 39-44. The following describes a general procedure, similar to the one described in example 1, used to prepare these novel counter tapered thermoplastic elastomers (CTTE 39-44) and to control the monomer distribution in the anionic copolymerization of 1,3-butadiene (B) and styrene(S) in the presence of ditetrahydrofurylpropane (DTHFP) or tetrahydrofuran (THF) as a suitable polar modifier and randomizing agent for the styrene/butadiene [S/B] counter tapered copolymer block. The abbreviations used in Table 16 below for the polymerization conditions are defined as follows: CHx=cyclohexane; STY=styrene; and BD=1,3-butadiene.

The novel counter tapered thermoplastic elastomer (CTTE 39-44) compositions of the present invention were prepared in a 5.4 Liter reactor system operated under inert nitrogen atmosphere in batch and/or semi-batch mode according to the teachings of this invention. Immediately before addition to the reactor system, solvent and monomers were thoroughly purified to decrease their moisture content to a maximum of 5 ppm by flowing through a set of columns packed with alumina and molecular sieves. For the first polymerization step, an appropriate amount of purified solvent (CHx) was charged into the reactor and heated to the initial reaction temperature (Ti) of from about 50° C. to about 55° C. Once Ti was reached, a suitable polar modifier (randomizing agent) such as ditetrahydrofurylpropane (DTHFP) or tetrahydrofuran (THF) was added into the reactor followed by a first addition of monovinyl aromatic monomer (1st STY) of from about 10-30 wt % of total monomer mixture. This reaction mixture was allowed to stabilize at Ti, and then n-butyllithium or another suitable initiator was added in a suitable solvent solution directly into the reactor mixture containing at least the amount of polar modifier necessary to efficiently initiate the anionic polymerization of the living polystyrene blocks. The amount of initiator was stoichiometrically calculated as described in the literature to form individual blocks with the desired molecular weight and to compensate for residual impurities. This first polymerization step was then allowed to proceed adiabatically up to complete conversion to form the monovinyl aromatic homopolymer block A with peak molecular weight Mp about a target value of from about 6,000 to about 25,000.

For the second polymerization step, the addition of both monomers was simultaneously initiated for CTTE 39-44, a second monovinyl aromatic monomer (2nd STY) addition of about 7.5 to about 10 wt % of total monomer mixture was rapidly charged into the reactor at a specified dose rate of from about 33 to 46 g/min during a predetermined dosification time of about 1 min, and a conjugated diene monomer (BD) addition of about 60.3 to about 82.5 wt % of total monomer mixture was slowly charged into the reactor at a specified dose rate of from about 92 to about 127 g/min for a predetermined dosification time of from about 3 min. These monomer additions were carried out in a programmed batch and/or semi-batch mode, and the amount of polar modifier (randomizing agent) was adjusted from about 0.0069 to about 0.0684 wt % of total reaction mixture, in order to promote the formation of a statistically distributed tapered S/B copolymer block with gradual change in composition and vinyl microstructure (1,2-addition) along the copolymer chain. This second polymerization step was then allowed to proceed adiabatically up to complete conversion and the final peak temperature (Tp) was allowed to increase to from about 102.4 to about 116.7° C., thereby forming the counter tapered copolymer [A/B] block and thus obtaining the living counter tapered A-[A/B] diblock copolymer with peak molecular weight Mp about a target value of from about 125,000 to about 230,000.

Finally, the living polymer chains were terminated by adding a 10 mol % excess over the stoichiometric amount of a suitable alcohol to the final reaction mixture.

Tables 14 and 15 list the analytical characterization results for the novel counter tapered thermoplastic elastomer compositions CTTE 39-44. All the molecular weights (Mp and Mw) are given in units of 1000 (k) and calculated relative to polystyrene standards by GPC. The peak molecular weights Mp for the monovinyl aromatic homopolymer block A or polystyrene block of CTTE 39-44 are from about 6.1 to about 22.1 kg/mol. The peak molecular weights Mp for the A-[A/B] diblock copolymer or S-[S/B] styrene-butadiene diblock copolymer of CTTE 39-44 are from about 125 to about 230 kg/mol. The weight average molecular weights Mw of CTTE 39-44 are from about 125 to about 223 kg/mol.

The vinyl [A/B] block contents of CTTE 39-44 are from about 34.0 to about 63.0 wt % based on total butadiene units. The glass transition temperatures of the [A/B] counter tapered copolymer block of CTTE 40-43 are from about −68.5 to about −43.5° C. The melt flow rates (MFI) of the CTTE 42-43 compositions are from about 19.5 to about 29.2 g/10 min. The contents determined by NMR of CTTE 39-44 for: total styrene based on total copolymer are from about 18.8 to about 41.8 wt %; block styrene based on total styrene units are from about 49.2 to about 83.0 wt %; [A/B] block styrene based on [A/B] block copolymer are from about 6.7 to about 20.1 wt %, and [A/B] block blockiness based on [A/B] block styrene units are from about 6.5 to about 27.2 wt %.

Example 15

Applications in Polymer Modified Asphalt (PMA) for Road Paving

High Mw counter tapered thermoplastic elastomer A-[A/B] or S-[S/B] diblock compositions with varying vinyl [A/B] block (wt %) content, CTTE D-170A and CTTE D-170B in Table 17, were prepared as described in Example 14 with medium and high vinyl respectively, and used as asphalt modifiers or asphalt reinforcing agents in polymer modified asphalt (PMA) for road paving formulations. All CTTE D-170A and CTTE D-170B PMA formulations were prepared and characterized following the procedures described in Example 2, with the following additional steps:

TABLE 14

Counter Tapered Thermoplastic Elastomers Composition

| Polymer Name | Mp A block (kg/mol) | Mp-A-[A/B] diblock (kg/mol) | Mw CTTE (kg/mol) | Vinyl [A/B] block (wt %) | Tg (° C.) | MFI @ 190° C., 5 kg (g/10 min) |
|---|---|---|---|---|---|---|
| CTTE 39 | 6.1 | 126 | 134 | 61.1 | | |
| CTTE 40 | 21.0 | 229 | 223 | 35.5 | −68.5 | |
| CTTE 41 | 22.0 | 230 | 222 | 63.0 | −44.4 | |
| CTTE 42 | 12.9 | 128 | 131 | 34.0 | −67.6 | 19.5 |
| CTTE 43 | 12.9 | 127 | 130 | 61.0 | −43.5 | 29.2 |
| CTTE 44 | 22.1 | 126 | 125 | 60.2 | | |

[a] Molecular Weight peak and average relative to PS standards;
[b] RMN $^1$H 300 MHz, Vinyl in wt % based on total butadiene units;
[c] Glass Transition Temperature (inflexion point) by DSC @ 10° C./min;

TABLE 15

Counter Tapered Thermoplastic Elastomers NMR Results

| Polymer Name | Total Styrene[a] (wt %) | Block Styrene[b] (wt %) | [A/B] block Styrene[c] (wt %) | [A/B] block Blockiness[d] (wt %) |
|---|---|---|---|---|
| CTTE 39 | 18.8 | 49.2 | 11.2 | 6.5 |
| CTTE 40 | 25.5 | 66.0 | 11.6 | 12.1 |
| CTTE 41 | 26.1 | 69.0 | 11.7 | 17.3 |
| CTTE 42 | 23.0 | 83.0 | 6.7 | 27.2 |
| CTTE 43 | 24.0 | 79.0 | 7.9 | 23.6 |
| CTTE 44 | 41.8 | 71.0 | 20.1 | 18.2 |

[a] RMN $^1$H 300 MHz, Total Styrene in wt % based on total copolymer;
[b] RMN $^1$H 300 MHz, Block Styrene in wt % based on total styrene units;
[c] Calculated [A/B] block Styrene in wt % based on [A/B] block copolymer;
[d] Calculated [A/B] block Blockiness in wt % based on [A/B] block styrene units.

CTTE D-170A PMA at polymer content 3.0 wt % and CTTE D-170B PMA at polymer content 3.0 wt % were added sulfur as crosslinking agent and mixed for about 60-120 minutes at 2500 RPM and 190° C.+/−5° C.; CTTE D-170A PMA at polymer content 6.0 wt % and CTTE D-170B PMA at polymer content 6.0 wt % were mixed for about 120-180 minutes at 2500 RPM and 190° C. +/−5° C. in the absence of crosslinking agent (without sulfur addition); and CTTE D-170A PMA diluted and CTTE D-170B PMA diluted were prepared by diluting mixtures originally prepared at polymer content 6.0 wt % with additional neat asphalt, mixing for about 120-180 minutes, then adding sulfur as crosslinking agent and continue mixing for about 60-120 minutes at 2500 RPM and 190° C.+/−5° C.

CTTE polymer modified asphalt (CTTE D-170A PMA and CTTE D-170B PMA) results are given in Table 17 below and show the enhanced performance of the novel

TABLE 16

Counter Tapered Thermoplastic Elastomers Process

| | CTTE 39 | CTTE 40 | CTTE 41 | CTTE 42 | CTTE 43 | CTTE 44 |
|---|---|---|---|---|---|---|
| CHx (wt %)[a] | 83.8 | 83.7 | 83.7 | 83.3 | 83.3 | 83.8 |
| Randomizing agent (wt %)[a] | 0.0648 | 0.0069 | 0.0357 | 0.0132 | 0.0684 | 0.0592 |
| 1st STY (wt%)[b] | 10.0 | 17.5 | 17.7 | 17.5 | 17.5 | 29.8 |
| Initial Temperature Ti (° C.) | 50.4 | 50.5 | 50.6 | 55.4 | 55.1 | 50.1 |
| BD (wt %)[b] | 82.5 | 75.0 | 74.8 | 75.0 | 75.0 | 60.3 |
| BD dose rate (g/min) | 126 | 109 | 109 | 127 | 127 | 92 |
| BD dosification time (min) | 3 | 3 | 3 | 3 | 3 | 3 |
| 2nd STY (wt %)[b] | 7.5 | 7.5 | 7.5 | 7.5 | 7.5 | 9.9 |
| 2nd STY dose rate (g/min) | 34 | 33 | 33 | 38 | 38 | 46 |
| STY dosification time (min) | 1 | 1 | 1 | 1 | 1 | 1 |
| Final Peak Temperature Tp (° C.) | 116.7 | 102.4 | 102.6 | 114.5 | 114.6 | 107.8 |

[a] wt % of Total Reaction Mixture
[b] wt % of Total Monomer Mixture counter tapered thermoplastic elastomer diblock compositions when compared to Solprene 1205, a commercially available low vinyl normal tapered diblock copolymer, as asphalt modifiers for road paving at 3.0,3.0 diluted and 6.0 wt % of CTTE polymer content based on total PMA mixture.

TABLE 17

Performance of High Mw CTTE in Asphalt Reinforcement for Road Paving

| CTTE Polymer Modified Asphalt (PMA mixture) | S-1205 PMA | CTTE D-170A PMA | CTTE D-170B PMA | S-1205 PMA | CTTE D-170A PMA | CTTE D-170B PMA | S-1205 PMA diluted | CTTE D-170A PMA diluted | CTTE D-170B PMA diluted |
|---|---|---|---|---|---|---|---|---|---|
| Polymer content (wt % based on total mixture) | 3.0 | 3.0 | 3.0 | 6.0 | 6.0 | 6.0 | 3.0 | 3.0 | 3.0 |
| Sulfur addition (wt % based on total polymer) | 2.0 | 2.0 | 2.0 | 0 | 0 | 0 | 2.0 | 2.0 | 2.0 |
| Brookfield Viscosity @ 135° C. (cP) | 918 | 1715 | 2068 | 1648 | 5508 | 3655 | 1006 | 1968 | 3350 |
| Penetration @ 25° C. (dmm) | 47 | 46 | 43 | 53 | 42 | 41 | 47 | 46 | 45 |
| R&B Softening Point (° C.) | 62 | 72 | 83 | 68 | 83 | 84 | 62 | 74 | 88 |
| Elastic Recovery @ 25° C. by Torsion (%) | 40 | 58 | 62 | 22 | 47 | 50 | 35 | 58 | 56 |
| Elastic Recovery @ 25° C. by Ductilometer (%) | 79 | 88 | 90 | — | — | — | — | — | — |
| AASHTO SUPERPAVE Performance Grade PG | 70-22 | 70-22 | 76-22 | 76-10 | 88-10 | 82-10 | 70-22 | 76-22 | 76-22 |

Reviewing Table 17, the polymer modified asphalt results of CTTE D-170A PMA and CTTE D-170B PMA show higher viscosity, lower penetration, higher softening point, higher elastic recovery, and wider range of Performance Grade (PG), than the polymer modified asphalt results of S-1205 PMA at same polymer content and sulfur addition, respectively. In general, CTTE D-170A PMA and CTTE D-170B PMA show excellent balance between high and low temperature properties, and desirable and predictable polymer modified asphalts with high stiffness (i.e., rigidity) and high elastic behavior. Specifically for the asphalt formulations at lower polymer content (i.e. 3 wt %), CTTE D-170A PMA and CTTE D-170B PMA show a combination of high elastic response and high softening point with an acceptable viscosity for PMA standards (i.e., dynamic viscosity at 135° C. of about 500 to 3000 cP and desirably 1000 to 2000 cP for road paving applications). CTTE D-170A PMA and CTTE D-170B PMA compositions provide a desirable balance between processability and reinforcement performance, and the potential for cost improvement to reduce the polymer content without decreasing other properties below the performance of S-1205 PMA at same polymer content and sulfur addition. In addition, CTTE D-170A PMA and CTTE D-170B PMA compositions at 3 wt % polymer content and 2 wt % sulfur addition provide improvements in softening point, elastic recovery and PG without the high viscosity of CTTE D-170A PMA and CTTE D-170B PMA compositions at 6 wt % polymer content in the absence of crosslinking agent (without sulfur addition). Surprisingly, the dilution process from 6 wt % to 3 wt % of CTTE D-170A PMA diluted and CTTE D-170B PMA diluted compositions provides improvements in softening point, elastic recovery and PG beyond the addition of 2 wt % sulfur addition, when directly compared with CTTE D-170A PMA and CTTE D-170B PMA compositions at same 3 wt % polymer content and 2 wt % sulfur addition. The improvement in reinforcement performance of CTTE D-170A PMA and CTTE D-170B PMA compositions is attributed not only to the high molecular weight but also to the characteristics of the counter tapered thermoplastic elastomer A-[A/B] or S-[S/B] diblock compositions (i.e., low [A/B] block blockiness and high vinyl [A/B] block).

The polymer modified asphalt results of CTTE D-170A PMA, CTTE D-170B PMA, CTTE D-170A PMA diluted and CTTE D-170B PMA diluted at polymer content of 3 wt % in the presence of crosslinking agent (i.e., 2.0 wt % sulfur addition) show: Brookfield viscosity at 135° C. from 1715 to 3350 cP; penetration at 25° C. from 43 to 46 dmm; R&B softening point from 72 to 88° C.; elastic recovery at 25° C. by torsion from 56 to 62%; and elastic recovery at 25° C. by ductilometer from 88 to 90%.

The polymer modified asphalt results of CTTE D-170A PMA and CTTE D-170B PMA at 6.0 wt % polymer content in the absence of crosslinking agent (i.e., without sulfur addition) show: a dynamic viscosity at 135° C. lower than 6000 cP, a preferred dynamic viscosity at 135° C. lower than 5500 cP, and a most preferred dynamic viscosity at 135° C. lower than 5000 cP; a softening point greater than 70° C., a preferred softening point greater than 75° C., and a most preferred softening point greater than 80° C.; an elastic recovery at 25° C. by torsion greater than 35%, a preferred elastic recovery at 25° C. by torsion greater than 40%, and a most preferred elastic recovery at 25° C. by torsion greater than 45%; and a performance grade wider than 76-10, a preferred performance grade wider than 82-10, and a most preferred performance grade wider than 88-10.

The polymer modified asphalt results of CTTE D-170A PMA and CTTE D-170B PMA at 3.0 wt % polymer content, and CTTE D-170A PMA diluted and CTTE D-170B PMA diluted at 3.0 wt % polymer content, in the presence of crosslinking agent (i.e., 2.0 wt % sulfur addition) show: a dynamic viscosity at 135° C. lower than 4000 cP, a preferred dynamic viscosity at 135° C. lower than 3500 cP, and a most preferred dynamic viscosity at 135° C. lower than 3000 cP; a softening point greater than 60° C., a preferred softening point greater than 65° C., and a most preferred softening point greater than 70° C.; an elastic recovery at 25° C. by torsion greater than 45%, a preferred elastic recovery at 25° C. by torsion greater than 50%, and a most preferred elastic recovery at 25° C. by torsion greater than 55%; and an elastic recovery at 25° C. by ductilometer greater than 75%, a preferred elastic recovery at 25° C. by ductilometer greater than 80%, and a most preferred elastic recovery at 25° C. by ductilometer greater than 85%.

Example 16

Applications in Polymer Modified Asphalt (PMA) for Road Paving

Low Mw counter tapered thermoplastic elastomer A-[A/B] or S-[S/B] diblock compositions with high vinyl [A/B] block (wt %) content, CTTE D-170C in Tables 18 and 19, were prepared as described in Example 14, and used as asphalt modifiers or asphalt reinforcing agents in polymer modified asphalt (PMA) for road paving formulations. All CTTE D-170C PMA formulations were prepared and characterized following the procedures described in Example 2. CTTE D-170C PMA formulations at polymer content 3.5, 4.5 and 5.0 wt % in absence of crosslinking agent (i.e., without sulfur addition) are presented in Table 18. For CTTE D-170C PMA formulations at polymer content 3.5, 4.5 and 5.0 wt % presented in Table 19, an additional step of adding sulfur as crosslinking agent and mixing for about 60-120 minutes at 2500 RPM and 190° C.+/−5° C. was performed.

CTTE polymer modified asphalt (CTTE D-170C PMA) results are given in Tables 18 and 19 below and show the enhanced performance of the novel counter tapered thermoplastic elastomer diblock compositions when compared to Solprene 1205, a commercially available low vinyl normal tapered diblock copolymer, as asphalt modifiers for road paving at 3.5, 4.5 and 5.0 wt % of CTTE polymer content based on total PMA mixture in the absence (i.e., without sulfur addition) and presence of crosslinking agent (i.e., 2 wt % sulfur addition based on total polymer).

polymer content without decreasing other properties below the performance of S-1205 PMA at same polymer content, and the potential for property improvement by longer mixing time at high temperature for curing the PMA composition in the absence of crosslinking agent (i.e., without sulfur addition), particularly for high vinyl, counter tapered diblock compositions.

The polymer modified asphalt results of CTTE D-170C PMA formulations at polymer content 3.5, 4.5 and 5.0 wt % in the absence of crosslinking agent (i.e., without sulfur addition) show: Brookfield viscosity at 135° C. from 823 to 1151 cP; penetration at 25° C. from 45 to 52 dmm; R&B softening point from 58 to 69° C.; ductility at 25° C. from

TABLE 18

Performance of Low Mw CTTE in Asphalt Reinforcement for Road Paving

| CTTE Polymer Modified Asphalt (PMA mixture in absence of crosslinking agent (without Sulfur addition)) | Solprene 1205 PMA | CTTE D-170C PMA | Solprene 1205 PMA | CTTE D-170C PMA | Solprene 1205 PMA | CTTE D-170C PMA |
|---|---|---|---|---|---|---|
| Polymer content (wt % based on total mixture) | 3.5 | 3.5 | 4.5 | 4.5 | 5.0 | 5.0 |
| Brookfield Viscosity @ 135° C. (cP) | 821 | 823 | 1060 | 1036 | 1169 | 1151 |
| Penetration @ 25° C. (dmm) | 52 | 52 | 50 | 46 | 53 | 45 |
| R&B Softening Point (° C.) | 61 | 58 | 65 | 67 | 62 | 69 |
| Ductility @ 25° C. (cm) | 44 | 110 | 45 | 68 | 44 | 59 |
| Elastic Recovery @ 25° C. by Torsion (%) | 14 | 33 | 27 | 40 | 24 | 40 |
| Elastic Recovery @ 25° C. by Ducti lometer (%) | 48 | 54 | 45 | 55 | 44 | 55 |
| Elastic Recovery @ 10° C. by Ducti lometer (%) | Break | 30 | 26 | 30 | Break | 25 |
| Phase Separation, ° C. | 0.6 | 2.0 | 0.8 | 0.4 | 0.3 | 0.1 |
| AASHTO SUPERPAVE Performance Grade PG | 70-16 | 70-16 | 76-16 | 76-16 | 76-16 | 76-16 |

TABLE 19

Performance of Low Mw CTTE in Asphalt Reinforcement for Road Paving

| CTTE Polymer Modified Asphalt (PMA mixture with 2.0 wt % Sulfur addition (based on total polymer)) | Solprene 1205 PMA | CTTE D-170C PMA | Solprene 1205 PMA | CTTE D-170C PMA | Solprene 1205 PMA | CTTE D-170C PMA |
|---|---|---|---|---|---|---|
| Polymer content (wt % based on total mixture) | 3.5 | 3.5 | 4.5 | 4.5 | 5.0 | 5.0 |
| Brookfield Viscosity @ 135° C. (cP) | 878 | 968 | 1166 | 1355 | 1370 | 1694 |
| Penetration @ 25° C. (dmm) | 48 | 44 | 47 | 43 | 47 | 42 |
| R&B Softening Point (° C.) | 63 | 64 | 72 | 77 | 77 | 83 |
| Ductility @ 25° C. (cm) | 76 | 91 | 60 | 74 | 58 | 71 |
| Elastic Recovery @ 25° C. by Torsion (%) | 43 | 55 | 52 | 68 | 58 | 70 |
| Elastic Recovery @ 25° C. by Ductilometer (%) | 69 | 74 | 74 | 79 | 76 | 83 |
| Elastic Recovery @ 10° C. by Ductilometer (%) | 48 | 46 | 53 | 53 | 53 | 55 |
| Phase Separation, ° C. | 0.2 | 0.7 | 0.7 | 0.7 | 0.6 | 1.4 |
| AASHTO SUPERPAVE Performance Grade PG | 70-22 | 70-22 | 76-22 | 76-22 | 76-16 | 76-16 |

Reviewing Table 18, the polymer modified asphalt results of CTTE D-170C PMA formulations at polymer content 3.5, 4.5 and 5.0 wt % in the absence of crosslinking agent (i.e., without sulfur addition) show similar viscosity, lower penetration, higher softening point, higher ductility, higher elastic recovery, lower phase separation, and similar range of Performance Grade (PG), than the polymer modified asphalt results of S-1205 PMA at same polymer content, respectively. In general, CTTE D-170C PMA show excellent balance between high and low temperature properties, and desirable and predictable polymer modified asphalts with high stiffness (i.e., rigidity) and high elastic behavior. Specifically for the asphalt formulations at higher polymer content (i.e. 4.5 and 5.0 wt %), CTTE D-170C PMA show a combination of high elastic response and high softening point with a desirable low viscosity for PMA standards (i.e., dynamic viscosity at 135° C. of about 500 to 3000 cP and desirably 1000 to 2000 cP for road paving applications). CTTE D-170C PMA compositions provide a desirable balance between processability and reinforcement performance, the potential for cost improvement to reduce the 59 to 110 cm; elastic recovery at 25° C. by torsion from 33 to 40%; elastic recovery at 25° C. by ductilometer from 54 to 55%; elastic recovery at 10° C. by ductilometer from 25 to 30%; and phase separation from 0.1 to 2.0° C.

The polymer modified asphalt results of CTTE D-170C PMA formulations at polymer content 3.5, 4.5 and 5.0 wt % in the absence of crosslinking agent (i.e., without sulfur addition) show: a dynamic viscosity at 135° C. lower than 3000 cP, a preferred dynamic viscosity lower than 2000 cP, and a most preferred dynamic viscosity lower than 1200 cP; a softening point greater than 50° C., a preferred softening point 55° C., and a most preferred softening point 60° C.; an elastic recovery at 25° C. by ductilometer greater than 45%, a preferred elastic recovery at 25° C. by ductilometer greater than 50%, and a most preferred elastic recovery at 25° C. by ductilometer greater than 55%; an elastic recovery at 10° C. by ductilometer greater than 20%, a preferred elastic recovery at 10° C. by ductilometer greater than 25%, and a most preferred elastic recovery at 10° C. by ductilometer greater than 30%; a ductility at 25° C. greater than 50 cm, a preferred ductility at 25° C. greater than 55 cm, and a most preferred ductility at 25° C. greater than 60 cm; and a phase separation lower than 5.0° C., a preferred phase separation lower than 2.0° C., and a most preferred phase separation lower than 1.0° C.

In Table 19, the polymer modified asphalt results of CTTE D-170C PMA formulations at polymer content 3.5, 4.5 and 5.0 wt % in the presence of crosslinking agent (i.e., with 2 wt % sulfur addition) show higher viscosity, lower penetration, higher softening point, higher ductility, higher elastic recovery, similar phase separation, and similar range of Performance Grade (PG), than the polymer modified asphalt results of S-1205 PMA at same polymer content, respectively. In general, CTTE D-170C PMA compositions formulated in the presence of crosslinking agent show excellent balance between high and low temperature properties, and desirable and predictable polymer modified asphalts with higher stiffness (i.e., rigidity) and more elastic behavior than CTTE D-170C PMA compositions formulated in the absence of crosslinking agent at same polymer content. Specifically for the asphalt formulations at higher polymer content (i.e. 4.5 and 5.0 wt %), CTTE D-170C PMA show a combination of high elastic response and high softening point with a desirable low viscosity for PMA standards (i.e., dynamic viscosity at 135° C. of about 500 to 3000 cP and desirably 1000 to 2000 cP for road paving applications). CTTE D-170C PMA compositions provide a desirable balance between processability and reinforcement performance, and the potential cost improvement to reduce the polymer content without decreasing other properties below the performance of S-1205 PMA at same polymer content. Surprisingly, CTTE D-170C PMA compositions formulated in the absence of crosslinking agent provide a reinforcement performance improvement (i.e., higher elastic response and higher softening point) that is more significant relative to that of S-1205 PMA at same polymer content and keep the Performance Grade PG upper temperature limit, without decreasing the processability (i.e., increasing viscosity), as compared with CTTE D-170C PMA compositions formulated in the presence of crosslinking agent. The improvement in reinforcement performance of CTTE D-170C PMA compositions is attributed to the characteristics of the counter tapered thermoplastic elastomer A-[A/B] or S-[S/B] diblock compositions (i.e., low [A/B] block blockiness and high vinyl [A/B] block).

The polymer modified asphalt results of CTTE D-170C PMA formulations at polymer content 3.5, 4.5 and 5.0 wt % in the presence of crosslinking agent (i.e., with 2 wt % sulfur addition) show: Brookfield viscosity at 135° C. from 968 to 1694 cP; penetration at 25° C. from 42 to 44 dmm; R&B softening point from 64 to 83° C.; ductility at 25° C. from 71 to 91 cm; elastic recovery at 25° C. by torsion from 55 to 70%; elastic recovery at 25° C. by ductilometer from 74 to 83%; elastic recovery at 10° C. by ductilometer from 46 to 55%; and phase separation from 0.7 to 1.4° C.

The polymer modified asphalt results of CTTE D-170C PMA formulations at polymer content 3.5, 4.5 and 5.0 wt % in the presence of crosslinking agent (i.e., with 2 wt % sulfur addition) show: a dynamic viscosity at 135° C. lower than 3000 cP, a preferred dynamic viscosity lower than 2500 cP, and a most preferred dynamic viscosity lower than 1750 cP; a softening point greater than 55° C., a preferred softening point 60° C., and a most preferred softening point 65° C.; an elastic recovery at 25° C. by ductilometer greater than 60%, a preferred elastic recovery at 25° C. by ductilometer greater than 65%, and a most preferred elastic recovery at 25° C. by ductilometer greater than 70%; an elastic recovery at 10° C. by ductilometer greater than 35%, a preferred elastic recovery at 10° C. by ductilometer greater than 40%, and a most preferred elastic recovery at 10° C. by ductilometer greater than 45%; a ductility at 25° C. greater than 60 cm, a preferred ductility at 25° C. greater than 65 cm, and a most preferred ductility at 25° C. greater than 70 cm; and a phase separation lower than 5.0° C., a preferred phase separation lower than 2.0° C., and a most preferred phase separation lower than 1.0° C.

Example 17

Applications in Polymer Modified Asphalt (PMA) for Roofing and Waterproofing Membranes Low Mw counter tapered thermoplastic elastomer A-[A/B] or S-[S/B] diblock compositions with high vinyl [A/B] block (wt %) content, CTTE D-170C in Table 20, prepared as described in Example 14, were used as asphalt modifiers or asphalt reinforcing agents in polymer modified asphalt (PMA) formulations for roofing and waterproofing membranes applications. CTTE D-170C PMA formulations were prepared and characterized following the procedures described in Example 2 and Example 6, respectively. For CTTE D-170C, an additional mixing time for about 60-120 minutes at 2500 RPM and 190° C.+/−5° C. was performed.

CTTE D-170C/S-411 (50/50) PMA results are given in Table 20 below and show the enhanced performance of the novel counter tapered thermoplastic elastomer diblock compositions when compared to Solprene 1205, a commercially available low vinyl normal tapered diblock copolymer, as asphalt modifiers for roofing membranes at 8.0 wt % of polymer content based on total PMA mixture. The CTTE D-170C PMA are prepared as 50/50 by weight mixtures with two commercially available block copolymers, Solprene 411 and Solprene 1205. Solprene 411 is a multiarm highly-coupled block copolymer (also known as radial SBn thermoplastic elastomer) with about 30 wt % total styrene content as pure block and no tapered characteristics. Solprene 1205 is a normal tapered diblock B/S-S copolymer (also known as gradual SBR) with about 25 wt % total styrene content and about 17.5 wt % block styrene content.

TABLE 20

Performance of Low Mw CTTE in Asphalt Reinforcement for Roofing and Waterproofing Membranes

| CTTE Polymer Modified Asphalt @ 8 wt % | S-1205/S-411 (50/50) PMA | CTTE D-170C/S-411 (50/50) PMA |
|---|---|---|
| Brookfield Viscosity @ 180° C. (cP) | 1235 | 809 |
| Brookfield Viscosity @ 190° C. (cP) | 1228 | 759 |
| Penetration @ 25° C. (dmm) | 39 | 38 |
| R&B Softening Point Temperature (° C.) | 111 | 106 |
| BDA Cold Bending Temperature (° C.) | −12 | −12 |

Reviewing Table 20, CTTE D-170C/S-411 (50/50) PMA results show lower viscosity, similar penetration, lower softening point and similar flexibility at low temperature, and excellent balance between high and low temperature properties, than the polymer modified asphalt results of S-411/S-1205 (50/50) PMA. CTTE D-170C/S-411 (50/50) PMA compositions show a combination of low viscosity with similar properties at high and low temperature. CTTE D-170C/S-411 (50/50) PMA compositions provide a very desirable balance between processability and reinforcement performance. On top of the outstanding reinforcement performance of the resulting PMA mixtures, the much lower viscosity of the asphalt formulations besides contributing to improve flow properties, facilitates the dispersion of the polymer into the asphalt and decreases the time required for mixing, even at lower temperature, also facilitates the processing, handling and application of the roofing membranes prepared with modified asphalt mixtures by improving pumping capacity and/or decreasing the energy required to apply it. This also means an important cost reduction and a more environmentally-friendly process.

The CTTE D-170C/S-411 (50/50) PMA results show: Brookfield viscosity at 180° C. of about 809 cP; Brookfield viscosity at 190° C. of about 759 cP; penetration at 25° C. of about 38 dmm; R&B softening point temperature of about 106° C.; and BDA cold bending temperature of about −12° C.

Example 18

Applications in Polymer Modified Asphalt (PMA) for Road Paving

Low Mw counter tapered thermoplastic elastomer (A-[A/B]) 2-X or (S-[S/B]) 2-X linear compositions with high vinyl [A/B] block (wt %) content, CTTE D-149C in Table 21, were prepared by partial coupling as described in Example 4, and used as asphalt modifiers or asphalt reinforcing agents in polymer modified asphalt (PMA) for road paving formulations. CTTE D-149C PMA formulations were prepared and characterized following the procedures described in Example 2, with the following additional steps: CTTE D-149C PMA formulations at polymer content 3.0 and 6.0 wt % were prepared in the absence of crosslinking agent (i.e., without sulfur addition); and CTTE D-149C PMA diluted at polymer content 3.0 wt % was prepared in the absence of crosslinking agent (i.e., without sulfur addition) by diluting mixtures originally prepared at polymer content 6.0 wt % with additional neat asphalt, and continue mixing for about 120-180 minutes at 2500 RPM and 190° C.+/−5° C.

CTTE polymer modified asphalt (CTTE D-149C PMA) results are given in Table 21 below and show the enhanced performance of the novel counter tapered thermoplastic elastomer linear with high vinyl compositions when compared to CTTE D-143C, a low Mw counter tapered thermoplastic elastomer (A-[A/B]) n-X or (S-[S/B]) n-X radial composition with medium vinyl [A/B] block (wt %) content prepared by partial coupling as described in Example 1, as asphalt modifiers for road paving at 3.0, 3.0 diluted and 6.0 wt % of CTTE polymer content based on total PMA mixture. CTTE D-143C PMA at polymer content 3.0 and 6.0 wt % were prepared and characterized following the procedures described in Example 2, and CTTE D-143C PMA diluted at polymer content 3.0 wt % was prepared by diluting mixtures originally prepared at polymer content 6.0 wt % with additional neat asphalt, and continue mixing for about 120-180 minutes at 2500 RPM and 190° C.+/−5° C. CTTE D-143C PMA at polymer content 3.0 and 6.0 wt % and CTTE D-143C PMA diluted at polymer content 3.0 wt % were added small amount of sulfur (i.e., 0.5 wt % based on total polymer) as crosslinking agent to minimize phase separation, and mixed for additional 60-120 minutes at 2500 RPM and 190° C.+/−5° C.

TABLE 21

Performance of Low Mw CTTE in Asphalt Reinforcement for Road Paving

| CTTE Polymer Modified Asphalt (PMA mixture) | CTTE D-143C PMA | CTTE D-149C PMA | CTTE D-143C PMA | CTTE D-149C PMA | CTTE D-143C PMA diluted | CTTE D-149C PMA diluted |
|---|---|---|---|---|---|---|
| Polymer content (wt % based on total mixture) | 3.0 | 3.0 | 6.0 | 6.0 | 3.0 | 3.0 |
| Sulfur addition (wt % based on total polymer) | 0.5 | 0 | 0.5 | 0 | 0.5 | 0 |
| Brookfield Viscosity @ 135° C. (cP) | 2986 | 915 | 9340 | 2206 | 2970 | 950 |
| Penetration @ 25° C. (dmm) | 48 | 44 | 45 | 38 | 46 | 33 |
| R&B Softening Point (° C.) | 59 | 60 | 78 | 82 | 58 | 61 |
| Ductility @ 25° C., cm | 150 | 145 | 51 | 50 | 150 | 67 |
| Elastic Recovery @ 25° C. by Torsion (%) | 50 | 37 | 74 | 52 | 46 | 33 |
| Elastic Recovery @ 25° C. by Ductilometer (%) | 73 | 78 | 76 | 93 | 71 | 80 |
| Phase Separation, ° C. | 0.3 | 13 | — | — | 0.5 | 0.1 |
| AASHTO SUPERPAVE Performance Grade PG | 70-22 | 70-16 | 76-16 | 82-16 | 70-22 | 70-16 |

Reviewing Table 21, the polymer modified asphalt results of CTTE D-149C PMA show lower viscosity, lower penetration, higher softening point, lower ductility, lower elastic recovery by torsion, higher elastic recovery by ductilometer, varying phase separation, and varying range of Performance Grade (PG), than the polymer modified asphalt results of CTTE D-143C PMA at same polymer content, respectively. In general, CTTE D-149C PMA and CTTE D-143C PMA show excellent balance between high and low temperature properties, and desirable and predictable polymer modified asphalts with high stiffness (i.e., rigidity) and high elastic behavior. For all formulations, both CTTE D-149C PMA and CTTE D-143C PMA show a combination of high elastic response (i.e., elastic recovery at 25° C. by ductilometer) and high softening point, with a desirable viscosity for CTTE D-149C at polymer content 3.0 and 6.0 wt %, and with an acceptable viscosity for CTTE D-143C PMA at polymer content 3.0 wt %, according to PMA standards (i.e., dynamic viscosity at 135° C. of about 500 to 3000 cP and desirably 1000 to 2000 cP for road paving applications). CTTE D-149C PMA and CTTE D-143C PMA compositions provide a desirable balance between processability and reinforcement performance. In addition, CTTE D-149C PMA compositions at 3.0 and 6.0 wt % polymer content formulated in the absence of crosslinking agent (i.e., without sulfur addition) provide further improvements in viscosity, softening point, elastic recovery by ductilometer or PG, and lower increase in viscosity from 3.0 to 6.0 wt % polymer content (i.e., 2 times), relative to corresponding CTTE D-143C PMA compositions. Surprisingly, the dilution process from 6 wt % to 3 wt % of CTTE D-149C PMA diluted composition provides similar viscosity, softening point, elastic recovery by ductilometer and PG; lower penetration and ductility; and almost no phase separation in the absence of crosslinking agent (i.e., without sulfur addition), when directly compared with CTTE D-149C PMA composition at same 3 wt % polymer content. The improvement in processability and reinforcement performance of CTTE D-149C PMA and CTTE D-143C PMA compositions is attributed to the characteristics of the counter tapered thermoplastic elastomer (A-[A/B]) 2-X or (A-[A/B]) n-X partially coupled compositions (i.e., low [A/B] block and [A/B] n-X midblock blockiness and high vinyl [A/B] block and [A/B] n-X midblock), respectively.

The polymer modified asphalt results of CTTE D-143C PMA at 3.0 and 6.0 wt % polymer content in the presence of crosslinking agent (i.e., 0.5 wt % sulfur addition) show: Brookfield viscosity at 135° C. from 2970 to 9340 cP; penetration at 25° C. from 45 to 48 dmm; R&B softening point from 58 to 78° C.; ductility at 25° C. from 510 to 150 cm; elastic recovery at 25° C. by torsion from 46 to 74%; elastic recovery at 25° C. by ductilometer from 71 to 76%; phase separation from 0.3 to 0.5° C.; and Performance Grade PG from 70-22 to 76-16.

The polymer modified asphalt results of CTTE D-149C PMA at 3.0 and 6.0 wt % polymer content in the absence of crosslinking agent (i.e., without sulfur addition) show: Brookfield viscosity at 135° C. from 915 to 2206 cP; penetration at 25° C. from 33 to 44 dmm; R&B softening point from 60 to 82° C.; ductility at 25° C. from 50 to 145 cm; elastic recovery at 25° C. by torsion from 33 to 52%; elastic recovery at 25° C. by ductilometer from 78 to 93%; phase separation from 0.1 to 13° C.; and Performance Grade PG from 70-16 to 82-16.

The polymer modified asphalt results of CTTE D-149C PMA at 3.0 and 6.0 wt % polymer content in the absence of crosslinking agent (i.e., without sulfur addition) show: a dynamic viscosity at 135° C. from 500 to 3000 cP, a preferred range from 750 to 2500 cP, and a most preferred range from 915 to 2206 cP; an elastic recovery at 25° C. by ductilometer from 50 to 98%, a preferred range from 65 to 95%, and a most preferred range from 78 to 93%; and a phase separation range from 0.1 to 13° C., a preferred range from 0.1 to 1.0° C., and a most preferred range from 0.1 to 0.2° C.

The polymer modified asphalt results of CTTE D-149C PMA at 6.0 wt % polymer content in the absence of crosslinking agent (i.e., without sulfur addition) show: a dynamic viscosity at 135° C. lower than 3000 cP, a preferred dynamic viscosity lower than 2500 cP, and a most preferred dynamic viscosity lower than 2250 cP; an elastic recovery at 25° C. by ductilometer greater than 75%, a preferred elastic recovery at 25° C. by ductilometer greater than 80%, and a most preferred elastic recovery at 25° C. by ductilometer greater than 90%; and a phase separation lower than 13° C., a preferred phase separation lower than 1.0° C., and a most preferred phase separation lower than 0.2° C.

The polymer modified asphalt results of CTTE D-149C PMA at 3.0 wt % polymer content and CTTE D-149C PMA diluted at 3.0 wt % polymer content in the absence of crosslinking agent (i.e., without sulfur addition) show: a dynamic viscosity at 135° C. lower than 2000 cP, a preferred dynamic viscosity lower than 1500 cP, and a most preferred dynamic viscosity lower than 1000 cP; an elastic recovery at 25° C. by ductilometer greater than 50%, a preferred elastic recovery at 25° C. by ductilometer greater than 65%, and a most preferred elastic recovery at 25° C. by ductilometer greater than 75%; and a phase separation lower than 13° C., a preferred phase separation lower than 1.0° C., and a most preferred phase separation lower than 0.2° C.

Example 19

Applications in Adhesives for Tapes and Labels
Test Procedures for Hot Melt Pressure Sensitive Adhesive Performance Dynamic mechanical analysis (DMA) methodology was performed to study rheological properties of hot melt adhesives (prior to coating and with no backing) by using a TA Instruments ARG2 Rheometer in a parallel-plate geometry and auto strain mode. The diameter of the plates was 8 mm and the gap was 2.000 mm. The frequency was 10 rad/s and the heating rate was 3° C./min. The maximum strain was set at 1.0%. Rheology data were very repeatable and the uncertainty in the glass transition was approximately ±0.5° C. The rheology experiments allow to predict structure-property relationships and ultimately adhesive performance. These include the first tan delta maximum (tan δ max) temperature, which is a measure of the Tg of the rubbery matrix. In addition, the tan delta maximum (tan δ max) peak height indicates how much energy the adhesive can dissipate. The storage modulus G' at room temperature (25° C.) was also noted, to quantify how compliant the adhesive was at the application temperature. Further, the temperature at which the G' modulus meets the Dahlquist criterion of 300,000 Pa for measurable quick tack (i.e., Dahlquist temperature TDahlquist) was analyzed together with the Dahlquist criterion of 50,000 Pa for measurable holding power. Lastly, the third crossover temperature was measured. The third crossover temperature (tan δ=1), is the temperature near the Tg of the glassy polystyrene domains at which the storage and loss moduli are equal (e.g. same magnitude), and therefore, tan delta is equal to 1. The third crossover temperature (tan δ=1) is the temperature where the adhesive begins to flow and loses its cohesive strength, which can be correlated with Ring and Ball softening point temperature (RBSPT) and/or shear adhesion failure temperature (SAFT).

Hot melt adhesive processability and reinforcement performance was measured by following standardized methodologies: a) Rolling ball tack experiments were performed in accordance with PSTC-6. In this experiment, an 11.1 mm diameter generic steel ball is rolled down a bench top ramp on to a 2 in x 15 in strip of tape. The distance the ball travels along the tape is recorded. The less the ball rolls down the tape, the tackier the adhesive. The ramp was a Cheminstruments Rolling Ball Tack Tester; b) Loop tack tests were performed on a Cheminstruments Loop Tack Tester in accordance with PSTC-16. The cross-head displacement rate was 5 mm/s. A 1 in x 5 in loop of tape was used in the experiments. The free loop of tape, unrestricted by the grips, was 75 mm long. The maximum force per unit width of the specimen was recorded. The initial height, measured from the bottom of the grips to the substrate surface, was 50 mm. The maximum displacement was 44 mm and the dwell time at maximum displacement was 1 s; c) 180° peel test to determine the peel energy or peel force per unit width was measured in accordance with PSTC 101: Peel Adhesion of Pressure Sensitive Tape Test Method A-Single Coated Tapes, Peel Adhesion at 180° Angle. Rectangular strips of 1 in x 12 in dimensions were tested using a Universal Testing Machine (UTM) at 5.08 mm/s (i.e., 12 in/min) cross-head displacement rate; d) Lap shear strength measurements were performed at 23° C. and at −25° C. in accordance with PSTC method. These experiments were conducted to measure room temperature and low/freezing temperature cohesive or shear properties of the adhesive after coating two wood testing specimens and joined them by pressing together with a standard force for a predetermined time at room temperature. Rectangular specimens of 1 in x 3 in dimensions were tested using a Universal Testing Machine (UTM) at 5.08 mm/s (i.e., 12 in/min) cross-head displacement rate; e) Holding power measurements were made in accordance with PSTC-107 method, 180° Shear Adhesion of Pressure Sensitive Tapes using a Cheminstruments Bank Shear Tester. These experiments were conducted to measure the room temperature cohesive or shear properties of the adhesive tape. Instead of the 25 mm×25 mm contact area described in PSTC-107, a 0.5 in x 0.5 in area of pressure-sensistive adhesive tape (PSAT) was utilized. The PSAT was adhered to stainless steel coupons with a standard 2 kg roller and a mass of 1 kg was suspended from the tape. The time (min) at which the adhesive failed was recorded as the holding power; f) Tensile performance of the hot melt adhesives was determined on 0.394 in thick, 3.0 in long dogbone shaped portions with 1 in times 1 in end tabs and a 0.5 in times 0.5 in central gage portion. These were pulled on an Instron Testing Machine with pneumatic grips at a speed of 12 in/min. The tensile stress at break and the strain at break of the adhesives were then recorded; g) Melt viscosities of the hot melt adhesives were determined on a Brookfield Model RVT Thermosel viscometer using a number 27 spindle; h) Ring and Ball softening point temperatures were measured by using an HRB 754 prop Point Apparatus.

Hot Melt Adhesives of Counter Tapered Thermoplastic Elastomers

Several hot melt adhesive formulations containing counter tapered thermoplastic elastomer compositions of the present invention CTTE D-149C HMA and CTTE D-143C HMA were prepared in accordance to the following procedure. The counter tapered thermoplastic elastomer compositions CTTE D-149C and CTTE-D143C, described in Example 18 were mixed with the materials and amounts described in the formulation below. Each counter tapered thermoplastic elastomer composition CTTE was mixed with the rest of the components/additives of the hot melt adhesive formulation by first placing a compatible tackifying resin such as Foral 85, oil such as Nyflex 222 and antioxidant such as Irganox 1330 in a jacketed mixing kettle equipped with a 3-blade propeller shear agitator Eurostar Power Control-Vic IKA, and there upon the temperature was raised to a range of from about 165° C. up to about 177° C. for about 30 minutes or until the mixture was melted. After the mixture was melted, the temperature was lowered to from about 150° to 165° C., the mixture was initially stirred at about 250 rpm, and then a counter tapered thermoplastic elastomer composition CTTE was slowly added into the mixture for about 5 to 10 minutes during which the stirring speed was increased to about 400 rpm and finally up to about 750 rpm while promoting the incorporation of the polymer into the increasingly viscous mixture and avoiding clumping of unmelted polymer particles. Then, mixing at about 750 rpm and heating at about 170° C. was continued for a period of about 120 minutes or until a smooth and homogeneous mass was observed, thereby obtaining the novel hot melt adhesive composition of the present invention containing the counter tapered thermoplastic elastomer composition CTTE and the rest of the components/additives of the hot melt adhesive formulation. Immediately after mixing was finished, the novel hot melt adhesive composition was applied to a substrate such as Mylar at a temperature range of from about 160° C. to about 170° C. to obtain an adhesive coating layer within specifications for testing protocols (i.e., coating weight 18-22 g/m$^2$).

The hot melt adhesive formulations of the counter tapered thermoplastic elastomer compositions CTTE D-149C HMA and CTTE D-143C HMA consisted of the following amounts in parts per hundred of rubber (phr): 178.00 phr tackifying resin Foral 85; 50.00 phr Nyflex 223 oil; and 4.00 phr Irganox 1330 antioxidant; based on the total amount (i.e., 100.00 phr) of counter tapered thermoplastic elastomer composition (i.e., CTTE D-149C or CTTE D-143C) in the hot melt adhesive formulation.

The CTTE D-149C HMA-UV formulation for UV-curable hot melt pressure sensitive adhesives consisted of the following amounts in parts per hundred of rubber (phr): 178.00 phr tackifying resins (50:50 wt: wt, Piccolyte A-125: Estergum F-85); 50.00 phr Nyflex 223 oil; 4.00 phr Irganox 1010 antioxidant; and 9.0 phr photoinitiator (50:50 wt: wt, Omnirad MBF: Omnirad 819); based on the total amount (i.e., 100.00 phr) of counter tapered thermoplastic elastomer composition CTTE D-149C. UV curing was performed by using a Mini-conveyor UV curing unit with a mercury lamp at 365 nm wavelength and high intensity at 10 FPM with 300 WPI.

The performance of the novel hot melt adhesive compositions CTTE D-149C HMA and CTTE D-143C HMA containing the counter tapered thermoplastic elastomer composition of the present invention was characterized according with the testing procedures described in Example 19, as shown in Table 22. Brookfield melt viscosities of the hot melt adhesives were determined at 130, 150 and 180° C. CTTE D-149C HMA show Brookfield melt viscosities of 19260 cP at 130° C., 6694 cP at 150° C. and 2261 cP at 180° C. CTTE D-143C HMA show Brookfield melt viscosities of 32250 cP at 130° C., 23844 cP at 150° C. and 15000 cP at 180° C. The novel hot melt adhesives CTTE D-149C HMA and CTTE D-143C HMA show improved processability during application on the substrate for testing procedures. The reduced Brookfield melt viscosity is not only an important processability performance advantage of the novel hot melt adhesives over prior art, given that allow for higher production rates and cost efficiencies under the same processing conditions, but also a low energy processability performance advantage, given that allow for lower processing temperatures for the same production rates and cost efficiencies, which is a more environmental-friendly process.

Table 22 shows the performance of the novel hot melt adhesive compositions CTTE D-149C HMA and CTTE D-143C HMA. CTTE D-149C HMA show Ring and Ball softening point temperature (TRBSP) of about 93° C. CTTE D-143C HMA show Ring and Ball softening point temperature (TRBSP) of about 82° C. The hot melt adhesive composition 180° peel test, which determines the peel energy or peel force (Ibf) per unit width in accordance with PSTC-101 method, shows peel force of about 5.6 lbf for CTTE D-149C HMA and peel force of about 2.5 lbf for CTTE D-143C HMA. The hot melt adhesive composition loop tack test, which determines the maximum force (Ibf) per unit width in accordance with PSTC-16 method, shows loop tack force of about 4.6 lbf/in2 for CTTE D-149C HMA and loop tack force of about 4.4 Ibf/in2 for CTTE D-143C HMA. The hot melt adhesive composition holding power measurement, which determines the time (min) at which the adhesive failed in accordance with PSTC-107 method and correlates to the room temperature cohesive or shear properties, shows holding power time of about 1660 minutes for CTTE D-149C HMA and holding power time of about 1443 minutes for CTTE D-143C HMA. The improvement in processability and reinforcement performance of CTTE D-149C HMA and CTTE D-143C HMA compositions is attributed to the characteristics of the counter tapered thermoplastic elastomer (A-[A/B]) 2-X or (A-[A/B]) n-X partially coupled compositions (i.e., low [A/B] block and [A/B] n-X midblock blockiness and high vinyl [A/B] block and [A/B] n-X midblock), respectively.

The performance of the novel hot melt adhesive composition CTTE D-149C HMA-UV containing the counter tapered thermoplastic elastomer composition of the present invention was characterized before and after curing according with the testing procedures described in Example 19, as shown in Table 22. Brookfield melt viscosities of the hot melt adhesives were determined before curing at 150 and 180° C. CTTE D-149C HMA-UV show Brookfield melt viscosities of 10285 cP at 150° C. and 2766 cP at 180° C. CTTE D-149C HMA-UV before curing show Ring and Ball softening point temperature (TRBSP) of about 110.0° C. The hot melt adhesive composition tensile performance, which determines the tensile stress at break (kgf) and the strain at break (%) with universal equipment testing method and correlates to the room temperature cohesive or shear properties, shows tensile stress at break of about 3.8 kgf and strain at break of about 966% for CTTE D-149C HMA-UV before curing. The hot melt adhesive composition 180° peel test shows peel force of about 2.8 lbf before curing and peel force of about 2.0 lbf after curing for CTTE D-149C HMA-UV. The hot melt adhesive composition loop tack test shows loop tack force of about 2.0 lbf/in2 before curing and loop tack force of about 0.01 lbf/in2 after curing for CTTE D-149C HMA-UV. The hot melt adhesive composition holding power measurement shows holding power time of about 27000 minutes before curing and holding power time of about 36400 minutes after curing for CTTE D-149C HMA-UV. The hot melt adhesive composition rolling ball tack shows rolling ball distance of about 1.6 in before curing and rolling ball distance greater than 15 in after curing for CTTE D-149C HMA-UV. In addition, dynamic mechanical analysis (DMA) of CTTE D-149C HMA-UV was performed according with the testing procedure and methodology described in Example 19, as shown in Table 22. The first tan delta maximum (tan δ max) temperature, which is a measure of the Tg of the rubbery matrix, increases from Tg of about 15.0° C. before curing to Tg of about 26.8° C. after curing. The third crossover temperature (tan δ=1) is the temperature where the adhesive begins to flow and loses its cohesive strength, which can be correlated with Ring and Ball softening point temperature (RBSPT) and/or shear adhesion failure temperature (SAFT). The third crossover temperature of the novel hot melt adhesive compositions increases from about 113.6° C. before curing to about 120.1° C. after curing.

TABLE 22

Performance of Hot Melt Pressure Sensitive Adhesive Compositions

| Hot Melt Pressure Sensitive Adhesives | CTTE D-143C HMA | CTTE D-149C HMA | CTTE D-149C HMA-UV Before Curing | CTTE D-149C HMA-UV After Curing |
|---|---|---|---|---|
| Brookfield Viscosity @ 130° C. (cP) | 32250 | 19260 | | |
| Brookfield Viscosity @ 150° C. (cP) | 23844 | 6694 | 10285 | |
| Brookfield Viscosity @ 180° C. (cP) | 15000 | 2261 | 2766 | |
| R&B Softening Point Temperature (° C.) | 82 | 93 | 110.0 | |
| Peel 180° (lb$_f$) | 2.5 | 5.6 | 2.8 | 2.0 |
| Loop Tack (lb$_f$/in$^2$) | 4.4 | 4.6 | 2.0 | 0.01 |
| Holding Power (min-1000 g) | 1443 | 1660 | 27000 | 36400 |
| SAFT @ 500 g/1 in$^2$ (° C.) | | | 69.5 | 81.5 |
| Tensile Stress @ Break (kg$_f$) | | | 3.8 | |
| Strain @ Break (%) | | | 966 | |
| Rolling Ball Tack, in | | | 1.6 | >15 |
| Tan Delta Maximum Tg (° C.) | | | 15.0 | 26.8 |
| Crossover Temperature (° C.) | | | 113.6 | 120.1 |

The hot melt adhesive compositions CTTE D-149C HMA and CTTE D-143C HMA show: Brookfield viscosity at 130° C. from 19260 to 32250 cP; Brookfield viscosity at 150° C. from 6694 to 23844 cP; Brookfield viscosity at 180° C. from 2261 to 15000 cP; R&B softening point from 82 to 93° C.; peel 180° from 2.5 to 5.6 lbr; loop tack from 4.4 to 4.6 lbr/in2; and holding power from 1443 to 1660 minutes.

The hot melt adhesive composition CTTE D-143C HMA show: a melt viscosity at 130° C. lower than 45000 cP, a preferred melt viscosity at 130° C. lower than 40000 cP, and a most preferred melt viscosity at 130° C. lower than 35000 cP; a melt viscosity at 150° C. lower than 35000 cP, a preferred melt viscosity at 150° C. lower than 30000 cP, and a most preferred melt viscosity at 150° C. lower than 25000 cP; a melt viscosity at 180° C. lower than 25000 cP, a preferred melt viscosity at 180° C. lower than 20000 cP, and a most preferred melt viscosity at 180° C. lower than 15000 cP; a R&B softening point greater than 70° C., a preferred R&B softening point greater than 75° C., a most preferred R&B softening point greater than 80° C.; a peel 180° greater than 1.5 lbf, a preferred peel 180° greater than 2.0 lbf, a most preferred peel 180° greater than 2.5 lbf; a loop tack greater than 3.0 lbf/in2, a preferred loop tack greater than 3.5 lbf/in2, a most preferred loop tack greater than 4.0 lbf/in2; and a holding power greater than 500 minutes, a preferred holding power greater than 1000 minutes, a most preferred holding power greater than 1400 minutes.

The hot melt adhesive composition CTTE D-149C HMA show: a melt viscosity at 130° C. lower than 30000 cP, a preferred melt viscosity at 130° C. lower than 25000 cP, and a most preferred melt viscosity at 130° C. lower than 20000 cP; a melt viscosity at 150° C. lower than 15000 cP, a preferred melt viscosity at 150° C. lower than 10000 cP, and a most preferred melt viscosity at 150° C. lower than 7000 cP; a melt viscosity at 180° C. lower than 10000 cP, a preferred melt viscosity at 180° C. lower than 5000 cP, and a most preferred melt viscosity at 180° C. lower than 2500 cP; a R&B softening point greater than 80° C., a preferred R&B softening point greater than 85° C., a most preferred R&B softening point greater than 90° C.; a peel 180° greater than 3.0 lbf, a preferred peel 180° greater than 4.0 lbf, a most preferred peel 180° greater than 5.5 lbf; a loop tack greater than 3.0 lbf/in2, a preferred loop tack greater than 4.0 lbf/in2, a most preferred loop tack greater than 4.5 lbf/in2; and a holding power greater than 500 minutes, a preferred holding power greater than 1000 minutes, a most preferred holding power greater than 1600 minutes.

The performance of the novel hot melt adhesive composition CTTE D-149C HMA-UV After Curing containing the counter tapered thermoplastic elastomer composition of the present invention shows increased cohesion strength (i.e., holding power) and increased thermal resistance (i.e., SAFT), with a decrease in adhesive properties.

Example 20

Applications in Adhesives for Tapes and Labels

Hot Melt Adhesives of Counter Tapered Thermoplastic Elastomers

Low Mw counter tapered thermoplastic elastomer A-[A/B] or S-[S/B] diblock compositions with varying vinyl [A/B] block (wt %) content, CTTE D-170C and CTTE D-170D, were prepared as described in Example 14 with high and medium vinyl respectively, and used to prepare hot melt adhesive formulations by following the procedure described in Example 19. The counter tapered thermoplastic elastomer compositions were mixed with the materials and amounts described in the formulation below to obtain hot melt adhesive compositions of the present invention, CTTE D-170C HMA and CTTE D-170D HMA in Table 23.

The hot melt adhesive formulations CTTE D-170C HMA and CTTE D-170D HMA consisted of the following amounts in parts per hundred of rubber (phr): 171.00 phr tackifying resin (107.00 phr Escorez 1310LC and 64.00 phr Estergum F-85); 50.00 phr Nyflex 223 oil; and 2.00 phr Irganox 1330 antioxidant; based on the total amount of Polymer 100.00 phr (49.00 phr CTTE D-170C or CTTE D-170D, and 51.00 phr SIS) in the hot melt adhesive formulation.

The performance of the novel hot melt adhesive compositions CTTE D-170C HMA and CTTE D-170D HMA containing the counter tapered thermoplastic elastomer compositions of the present invention was characterized according with the testing procedures described in Example 19, as shown in Table 23. Brookfield melt viscosities of the hot melt adhesives were determined at 150, 160 and 177° C. CTTE D-170C HMA shows Brookfield melt viscosities of 15467 cP at 150° C., 9540 cP at 160° C. and 5300 cP at 177° C. CTTE D-170D HMA shows Brookfield melt viscosities of 18292 cP at 150° C., 11413 cP at 160° C. and 6600 cP at 177° C. Solprene 1205 HMA shows Brookfield melt viscosities of 14600 cP at 150° C., 9730 cP at 160° C. and 5700 cP at 177° C. The novel hot melt adhesive CTTE D-170C HMA shows improved processability during application on the substrate for testing procedures. The reduced Brookfield melt viscosity is not only an important processability performance advantage of the novel hot melt adhesives over prior art (i.e., Solprene 1205 HMA), given that allows for higher production rates and cost efficiencies under the same processing conditions, but also a low energy processibility performance advantage, given that allows for lower processing temperatures for the same production rates and cost efficiencies, which is a more environmental-friendly process.

Table 23 shows the performance of the novel hot melt adhesive compositions CTTE D-170C HMA and CTTE D-170D HMA compared with prior art hot melt adhesive composition Solprene 1205 HMA. The hot melt adhesive compositions shows Ring and Ball softening point temperature (TRBSP) of about 98.4° C. for CTTE D-170C HMA, Ring and Ball softening point temperature (TRBSP) of about 96.2° C. for CTTE D-170D HMA and Ring and Ball softening point temperature (TRBSP) of about 96.6° C. for Solprene 1205 HMA. The hot melt adhesive composition 180° peel test, which determines the peel energy or peel force (Ibf) per unit width in accordance with PSTC-101 method, shows peel force of about 7.4 lbf for CTTE D-170C HMA, peel force of about 6.0 lbf for CTTE D-170D HMA and peel force of about 2.9 lbf for Solprene 1205 HMA. The hot melt adhesive composition loop tack test, which determines the maximum force (Ibf) per unit width in accordance with PSTC-16 method, shows loop tack force of about 5.2 lbf/in2 for CTTE D-170C HMA, loop tack force of about 4.4 lbf/in2 for CTTE D-170D HMA and loop tack force of about 3.8 Ibf/in2 for Solprene 1205 HMA. The hot melt adhesive composition holding power measurement, which determines the time (min) at which the adhesive failed in accordance with PSTC-107 method and correlates to the room temperature cohesive or shear properties, shows holding power time of about 157 minutes for CTTE D-170C HMA, holding power time of about 105 minutes for CTTE D-170D HMA and holding power time of about 25 minutes for Solprene 1205 HMA. The hot melt adhesive composition tensile performance, which measures tensile stress at break (kgf) and strain at break (%) and correlates to the room temperature cohesive or shear properties, shows tensile stress at break of about 2.2 kgf and strain at break of about 2000% for CTTE D-170C HMA, tensile stress at break of about 1.5 kgf and strain at break of about 2000% for CTTE D-170D HMA and tensile stress at break of about 0.5 kgf and strain at break of about 2000% for Solprene 1205 HMA. The hot melt adhesive composition rolling ball tack experiment, which determines quick tack by measuring the distance the ball travels along the tape in accordance with PSTC-6 method, shows rolling ball tack distance of about 1.05 in for CTTE D-170C HMA, rolling ball tack distance of about 1.25 in for CTTE D-170D HMA and rolling ball tack distance of about 0.5 in for Solprene 1205 HMA. The improvement in processability and reinforcement performance of CTTE D-170C HMA and CTTE D-170D HMA hot melt adhesive compositions over prior art compositions is attributed to the characteristics of the counter tapered thermoplastic elastomer A-[A/B] or S-[S/B] diblock compositions (i.e., low [A/B] block blockiness and high/medium vinyl [A/B] block).

The performance of the novel hot melt adhesive compositions CTTE D-170C HMA and CTTE D-170D HMA containing the counter tapered thermoplastic elastomer diblock compositions of the present invention was characterized by dynamic mechanical analysis (DMA) performed according with the testing procedure and methodology described in Example 19, as shown in Table 23. The hot melt adhesive storage modulus G' at room temperature (25° C.), which quantifies how compliant the adhesive is at the application temperature according to the Dahlquist criteria of 300,000 Pa for measurable quick tack and 50,000 Pa for measurable holding power, shows a storage modulus G' at 25° C. of about 61,700 Pa for CTTE D-170C HMA, a storage modulus G' at 25° C. of about 65,500 Pa for CTTE D-170D HMA and a storage modulus G' at 25° C. of about 34,600 Pa for Solprene 1205 HMA. The hot melt adhesive tan delta maximum (tan δ max) peak height, which indicates how much energy the adhesive can dissipate, shows a tan delta maximum peak height of about 2.52 for CTTE D-170C HMA, a tan delta maximum peak height of about 1.92 for CTTE D-170D HMA and a tan delta maximum peak height of about 1.65 for Solprene 1205 HMA. The first tan delta maximum (tan δ max) temperature, which is a measure of the Tg of the rubbery matrix, shows a tan delta maximum temperature Tg of about 1.5° C. for CTTE D-170C HMA, a tan delta maximum temperature Tg of about 4.4° C. for CTTE D-170D HMA and a tan delta maximum temperature Tg of about 4.4° C. for Solprene 1205 HMA. The third crossover temperature (tan δ=1), which is the temperature where the adhesive begins to flow and loses its cohesive strength, shows a crossover temperature of about 100.5° C. for CTTE D-170C HMA, a crossover temperature of about 94.7° C. for CTTE D-170D HMA and a crossover temperature of about 94.7° C. for Solprene 1205 HMA.

TABLE 23

Performance of Hot Melt Pressure Sensitive Adhesive Compositions

| Hot Melt Pressure Sensitive Adhesives | Solprene 1205 HMA | CTTE D-170C HMA | CTTE D-170D HMA |
|---|---|---|---|
| Brookfield Viscosity @ 150° C. (cP) | 14600 | 15467 | 18292 |
| Brookfield Viscosity @ 160° C. (cP) | 9730 | 9540 | 11413 |
| Brookfield Viscosity @ 177° C. (cP) | 5700 | 5300 | 6600 |
| R&B Softening Point Temperature (° C.) | 96.6 | 98.4 | 96.2 |
| Peel 180° (lb$_f$) | 2.9 | 7.4 | 6.0 |
| Loop Tack (lb$_f$/in$^2$) | 3.8 | 5.2 | 4.4 |
| Holding Power (min-1000 g) | 25 | 157 | 105 |
| Tensile Stress @ Break (kg$_f$) | 0.5 | 2.2 | 1.5 |
| Strain @ Break (%) | 2000 | 2000 | 2000 |
| Rolling Ball Tack, in | 0.5 | 1.05 | 1.25 |
| Storage Modulus G' @ 25° C. (Pa) | 34600 | 61700 | 65500 |
| Tan Delta Maximum Peak Height | 1.65 | 2.52 | 1.92 |
| Tan Delta Maximum Tg (° C.) | 4.4 | 1.5 | 4.4 |
| Crossover Temperature (° C.) | 94.7 | 100.5 | 94.7 |

The hot melt adhesive compositions CTTE D-170C HMA and CTTE D-170D HMA show: Brookfield viscosity at 150° C. from 15467 to 18292 cP; Brookfield viscosity at 160° C. from 9540 to 11413 cP; Brookfield viscosity at 177° C. from 5300 to 6600 cP; R&B softening point from 96.2 to 98.4° C.; peel 180° from 6.0 to 7.4 lbr; loop tack from 4.4 to 5.2 lbr/in2; holding power from 105 to 157 minutes; tensile stress at break from 1.5 to 2.2 kgf; strain at break of about 2000%; rolling ball tack from 1.05 to 1.25 in; storage modulus G' at 25° C. from 61700 to 65500 Pa; tan delta maximum peak height from 1.92 to 2.52; tan delta maximum temperature (Tg) from 1.5 to 4.4° C.; and crossover temperature from 94.7 to 100.5° C.

The hot melt adhesive compositions CTTE D-170C HMA and CTTE D-170D HMA show: a melt viscosity at 150° C. lower than 25000 cP, a preferred melt viscosity at 150° C. lower than 18500 cP, and a most preferred melt viscosity at 150° C. lower than 15500 cP; a melt viscosity at 160° C. lower than 20000 cP, a preferred melt viscosity at 160° C. lower than 11500 cP, and a most preferred melt viscosity at 160° C. lower than 9600 cP; a melt viscosity at 177° C. lower than 15000 cP, a preferred melt viscosity at 177° C. lower than 7000 cP, and a most preferred melt viscosity at 177° C. lower than 5500 cP; a R&B softening point greater than 85° C., a preferred R&B softening point greater than 95° C., a most preferred R&B softening point greater than 98° C.; a peel 180° greater than 3.0 lbf, a preferred peel 180° greater than 5.0 lbf, a most preferred peel 180° greater than 7.0 lbf; a loop tack greater than 3.0 lbf/in2, a preferred loop tack greater than 4.0 lbf/in2, a most preferred loop tack greater than 5.0 lbf/in2; a holding power greater than 25 minutes, a preferred holding power greater than 100 minutes, a most preferred holding power greater than 150 minutes; a tensile stress at break greater than 0.5 kgf, a preferred tensile stress at break greater than 1.0 kgf, a most preferred tensile stress at break greater than 2.0 kgf; a strain at break greater than 500%, a preferred strain at break greater than 1000%, a most preferred strain at break greater than 1500%; a rolling ball tack lower than 3.0 in, a preferred rolling ball tack lower than 2.0 in, a most preferred rolling ball tack lower than 1.5 in; a storage modulus G' at 25° C. greater than 35000 Pa, a preferred storage modulus G' at 25° C. greater than 50000 Pa, a most preferred storage modulus G' at 25° C. greater than 60000 Pa; a tan delta maximum peak height greater than 1.65, a preferred tan delta maximum peak height greater than 2.0, a most preferred tan delta maximum peak height greater than 2.5; a tan delta maximum temperature (Tg) lower than 5° C., a preferred tan delta maximum temperature (Tg) lower than 4° C., a most preferred tan delta maximum temperature (Tg) lower than 3° C.; a crossover temperature greater than 90° C., a preferred crossover temperature greater than 95° C., a most preferred crossover temperature greater than 100° C.

Having described the invention above, various modifications of the techniques, procedures, materials, and equipment will be apparent to those skilled in the art. It is intended that all such variations within the scope and spirit of the invention be included within the scope of the appended claims.

What is claimed is:

1. An asphalt and/or bituminous composition comprising:
    (a) asphalt and/or bitumen; and
    (b) a first counter tapered thermoplastic elastomer (first CTTE) composition, wherein the asphalt and/or bituminous composition includes from 0.5 to 25 percent weight of the first CTTE composition, and wherein the first CTTE composition comprises:
    units of at least one monovinyl aromatic monomer A polymerized with units of at least one conjugated diene monomer B to form a counter tapered diblock A-[A/B] copolymer, wherein the A block comprises a polymer of the monovinyl aromatic monomer units, wherein the [A/B] block is a copolymer of the monovinyl aromatic monomer units and the conjugated diene monomer units, and wherein the [A/B] block is counter tapered such that the ratio of B to A is lower proximal to the A block relative to the ratio of B to A distal to the A block.

2. The asphalt and/or bituminous composition of claim 1, wherein the total amount of units of the conjugated diene monomer B is more than 55 wt % of the first CTTE composition.

3. The asphalt and/or bituminous composition of claim 2, wherein the conjugated diene monomer B is at least one monomer selected from the group consisting of 1,3-butadiene, isoprene, myrcene and/or farnesene.

4. The asphalt and/or bituminous composition of claim 3, wherein the conjugated diene units are selectively, partially or fully hydrogenated.

5. The asphalt and/or bituminous composition of claim 1, wherein the vinyl content is higher proximal to the A block relative to the vinyl content distal to the A block in the counter tapered diblock A-[A/B] copolymer.

6. The asphalt and/or bituminous composition of claim 1, wherein the total amount of units of the conjugated diene monomer B is more than 55 wt % of the first CTTE composition, and wherein the vinyl content is higher proximal to the A block relative to the vinyl content distal to the A block in the counter tapered diblock A-[A/B] copolymer.

7. The asphalt and/or bituminous composition of claim 1, wherein the [A/B] block of the first CTTE composition comprises from 2 to 40 wt % of the monovinyl aromatic monomer A and from 60 to 98 wt % of the conjugated diene monomer B.

8. The asphalt and/or bituminous composition of claim 1, wherein the asphalt and/or bituminous composition has a dynamic viscosity at 135° C. of 500 to 6000 cP measured as per ASTM D4402, wherein the asphalt and/or bituminous composition has a softening point greater than 50° C., and wherein the asphalt and/or bituminous composition has an elastic recovery at 25° C. by ductilometer greater than 45%.

9. The asphalt and/or bituminous composition of claim 8, wherein the asphalt and/or bituminous composition has a dynamic viscosity at 135° C. of 500 to 3000 cP measured as per ASTM D4402, wherein the asphalt and/or bituminous composition has an elastic recovery at 10° C. by ductilometer greater than 20%, wherein the asphalt and/or bituminous composition has a ductility at 25° C. greater than 50 cm, and wherein the asphalt and/or bituminous composition has a phase separation lower than 5.0° C.

10. The asphalt and/or bituminous composition of claim 1, wherein the asphalt and/or bituminous composition has a dynamic viscosity at 135° C. lower than 4000 cP measured as per ASTM D4402, wherein the asphalt and/or bituminous composition has a softening point greater than 55° C., and wherein the asphalt and/or bituminous composition has an elastic recovery at 25° C. by ductilometer greater than 50%.

11. The asphalt and/or bituminous composition of claim 1, further comprising an emulsifying agent, wherein the asphalt and/or bituminous composition is emulsified in water, thereby forming a PMA residual.

12. The asphalt and/or bituminous composition of claim 11, wherein the PMA residual has a dynamic viscosity at 135° C. lower than 2000 cP measured as per ASTM D4402, and wherein the PMA residual has an elastic recovery at 10° C. by ductilometer greater than 20%.

13. The asphalt and/or bituminous composition of claim 1, wherein the asphalt and/or bituminous composition includes from 4 to 8 percent weight of the first CTTE composition, and wherein the asphalt and/or bituminous composition has a dynamic viscosity at 135° C. lower than 6000 cP measured as per ASTM D4402, a softening point greater than 60° C. and an elastic recovery at 25° C. by torsion greater than 35%.

14. The asphalt and/or bituminous composition of claim 13, wherein the asphalt and/or bituminous composition includes from 2 to 4 percent weight of the first CTTE composition, and wherein the asphalt and/or bituminous composition has a dynamic viscosity at 135° C. lower than 4000 cP measured as per ASTM D4402, a softening point greater than 50° C., an elastic recovery at 25° C. by torsion greater than 20% and an elastic recovery at 25° C. by ductilometer greater than 45%.

15. An asphalt and/or bituminous composition comprising:
    (a) asphalt and/or bitumen; and
    (b) a counter tapered thermoplastic elastomer (CTTE) composition, wherein the asphalt and/or bituminous composition includes from 0.5 to 25 percent weight of the CTTE composition, and wherein the CTTE composition comprises:
    units of at least one monovinyl aromatic monomer A and units of at least one conjugated diene monomer B and having a linear structure (A-[A/B])-X-([B/A]-A) and/or a coupled radial and/or multiarm structure (A-[A/B])n-X, wherein X is the residue of either a coupling agent or a multifunctional initiator, wherein n is an integer from 2 to 30,
    wherein the CTTE composition has outer blocks and/or end blocks A that are a polymer of the monovinyl aromatic monomer units A,
    wherein the CTTE composition has a midblock that is a copolymer of the monovinyl aromatic monomer units A and the conjugated diene monomer units B, wherein the midblock has a center region between terminal regions, and wherein the B/A ratio is higher in the center region than in the terminal regions.

16. The asphalt and/or bituminous composition of claim 15, wherein the vinyl content is higher in the terminal regions relative to the vinyl content in the center region in the CTTE composition.

17. The asphalt and/or bituminous composition of claim 15, wherein the asphalt and/or bituminous composition includes from 0.5 to 25 percent weight of the CTTE compositions.

18. The asphalt and/or bituminous composition of claim 15, wherein the asphalt and/or bituminous composition includes from 2 to 8 percent weight of the CTTE compositions.

19. The asphalt and/or bituminous composition of claim 1, further comprising a second counter tapered thermoplastic elastomer (second CTTE) composition, wherein the second CTTE composition comprises:
  units of at least one monovinyl aromatic monomer A and units of at least one conjugated diene monomer B and having a linear structure (A-[A/B])-X-([B/A]-A) and/or a coupled radial and/or multiarm structure (A-[A/B])n-X, wherein X is the residue of either a coupling agent or a multifunctional initiator, wherein n is an integer from 2 to 30,
  wherein the second CTTE composition has outer blocks and/or end blocks A that are a polymer of the monovinyl aromatic monomer units A,
  wherein the second CTTE composition has a midblock that is a copolymer of the monovinyl aromatic monomer units A and the conjugated diene monomer units B, wherein the midblock has a center region between terminal regions, and wherein the B/A ratio is higher in the center region than in the terminal regions.

20. The asphalt and/or bituminous composition of claim 19, wherein the structure (A-[A/B])-X-([B/A]-A) or (A-[A/B]) n-X of the second CTTE composition includes an [A/B]-X-[B/A] or [A/B] n-X midblock, and wherein the [A/B]-X-[B/A] or [A/B] n-X midblock comprises from 2 to 40 wt % of the monovinyl aromatic monomer A and from 60 to 98 wt % of the conjugated diene monomer B.

21. The asphalt and/or bituminous composition of claim 20, wherein the conjugated diene monomer B is at least one monomer selected from the group consisting of 1,3-butadiene, isoprene, myrcene and/or farnesene.

22. The asphalt and/or bituminous composition of claim 21, wherein the conjugated diene units are selectively, partially or fully hydrogenated.

23. The asphalt and/or bituminous composition of claim 19, wherein the asphalt and/or bituminous composition has a dynamic viscosity at 135° C. of 500 to 3000 cP measured as per ASTM D4402, and wherein the asphalt and/or bituminous composition has an elastic recovery at 25° C. by ductilometer greater than 75%.

24. The asphalt and/or bituminous composition of claim 19, wherein the asphalt and/or bituminous composition has a dynamic viscosity at 135° C. lower than 1000 cP measured as per ASTM D4402, and wherein the asphalt and/or bituminous composition has an elastic recovery at 25° C. by ductilometer greater than 75%.

25. The asphalt and/or bituminous composition of claim 19, further comprising an emulsifying agent, wherein the asphalt and/or bituminous composition is emulsified in water, thereby forming a PMA residual.

26. The asphalt and/or bituminous composition of claim 25, wherein the PMA residual has a dynamic viscosity at 135° C. lower than 600 cP measured as per ASTM D4402, and wherein the PMA residual has an elastic recovery at 10° C. by ductilometer greater than 75%.

27. The asphalt and/or bituminous composition of claim 19, wherein the asphalt and/or bituminous composition includes from 4 to 8 percent weight of the first and second CTTE compositions, and wherein the asphalt and/or bituminous composition has a dynamic viscosity at 135° C. lower than 3000 cP measured as per ASTM D4402 and an elastic recovery at 25° C. by ductilometer greater than 90%.

28. The asphalt and/or bituminous composition of claim 27, wherein the asphalt and/or bituminous composition includes from 2 to 4 percent weight of the first and second CTTE compositions, and wherein the asphalt and/or bituminous composition has a dynamic viscosity at 135° C. lower than 1000 cP measured as per ASTM D4402, an elastic recovery at 25° C. by ductilometer greater than 75%, and a phase separation lower than 0.2° C. or 0.3%.

29. An asphalt and/or bituminous composition comprising:
  (a) asphalt and/or bitumen; and
  (b) a counter tapered thermoplastic elastomer (CTTE) composition, wherein the asphalt and/or bituminous composition includes from 0.5 to 25 percent weight of the CTTE composition, and wherein the CTTE composition comprises:
  (1) a counter tapered diblock A-[A/B] copolymer comprising units of at least one conjugated diene monomer B and units of at least one monovinyl aromatic monomer A,
  wherein the diblock copolymer has a peak molecular weight from 20,000 to 250,000,
  wherein the monovinyl aromatic homopolymer block A has a peak molecular weight of at least 5,000,
  wherein the [A/B] block is counter tapered,
  wherein the [A/B] has a vinyl content of at least 15 weight percent based on the amount of conjugated diene units in the diblock copolymer, and
  wherein counter tapered means that the ratio of B to A in the [A/B] block is lower proximal to the A block relative to the ratio of B to A distal to the A block; and
  (2) a block copolymer comprising at least two of the counter tapered diblock A-[A/B] copolymers,
  wherein the block copolymer has at least two of the monovinyl aromatic homopolymer blocks A and at least one copolymer block of monovinyl aromatic monomer units and conjugated diene monomer units, and
  wherein the copolymer block is selected from the group consisting of: linear triblock copolymers having a peak molecular weight of at least 1.5 times the peak molecular weight of the counter tapered diblock copolymer, multiarm coupled block copolymers having a peak molecular weight that is at least 2.5 times the peak molecular weight of the counter tapered diblock copolymer, and mixtures thereof.

30. The asphalt and/or bituminous composition of claim 29, wherein the ratio of (1) to (2) in the CTTE composition is from 1:5 to 5:1.

31. The asphalt and/or bituminous composition of claim 29, wherein the vinyl content in the diblock copolymer is higher proximal to the A block relative to the vinyl content distal to the A block.

32. The asphalt and/or bituminous composition of claim 29, wherein the amount of the conjugated diene monomer B in the diblock copolymer is more than 55 wt %.

33. The asphalt and/or bituminous composition of claim 32, wherein the conjugated diene monomer B is at least one monomer selected from the group consisting of 1,3-butadiene, isoprene, myrcene and/or farnesene.

34. The asphalt and/or bituminous composition of claim 33, wherein the conjugated diene units are selectively, partially or fully hydrogenated.

35. The asphalt and/or bituminous composition of claim 32, wherein the amount of monovinyl aromatic monomer units A in the CTTE composition is from 10 percent to 48 percent by weight.

36. The asphalt and/or bituminous composition of claim 35, wherein the vinyl content in the CTTE composition is from 15 percent to 90 percent by weight based on the total amount of conjugated diene units B in the CTTE composition.

37. The asphalt and/or bituminous composition of claim 29, wherein the [A/B] block of the counter tapered diblock A-[A/B] copolymer comprises from 2 to 40 wt % of the monovinyl aromatic monomer A and from 60 to 98 wt % of the conjugated diene monomer B.

38. The asphalt and/or bituminous composition of claim 29, wherein the asphalt and/or bituminous composition has a dynamic viscosity at 135° C. of 500 to 3000 cP measured as per ASTM D4402, and wherein the asphalt and/or bituminous composition has an elastic recovery at 25° C. by ductilometer greater than 75%.

39. The asphalt and/or bituminous composition of claim 29, wherein the asphalt and/or bituminous composition has a dynamic viscosity at 135° C. lower than 1000 cP measured as per ASTM D4402, and wherein the asphalt and/or bituminous composition has an elastic recovery at 25° C. by ductilometer greater than 75%.

40. The asphalt and/or bituminous composition of claim 29, further comprising an emulsifying agent, wherein the asphalt and/or bituminous composition is emulsified in water, thereby forming a PMA residual.

41. The asphalt and/or bituminous composition of claim 40, wherein the PMA residual has a dynamic viscosity at 135° C. lower than 600 cP measured as per ASTM D4402, and wherein the PMA residual has an elastic recovery at 10° C. by ductilometer greater than 75%.

42. The asphalt and/or bituminous composition of claim 29, wherein the asphalt and/or bituminous composition includes from 4 to 8 percent weight of the CTTE composition, and wherein the asphalt and/or bituminous composition has a dynamic viscosity at 135° C. lower than 3000 cP measured as per ASTM D4402 and an elastic recovery at 25° C. by ductilometer greater than 90%.

43. The asphalt and/or bituminous composition of claim 42, wherein the asphalt and/or bituminous composition includes from 2 to 4 percent weight of the CTTE composition, and wherein the asphalt and/or bituminous composition has a dynamic viscosity at 135° C. lower than 1000 cP measured as per ASTM D4402, an elastic recovery at 25° C. by ductilometer greater than 75%, and a phase separation lower than 0.2° C. or 0.3%.

44. An adhesive composition comprising:
(a) at least one additive selected from the group consisting of: tackifying resins, plasticizers, solvent, coupling agents, crosslinking agents, photoinitiators and antioxidants; and
(b) a first counter tapered thermoplastic elastomer (first CTTE) composition, wherein the adhesive composition includes from 0.5 to 50 percent weight of the first CTTE composition, and wherein the first CTTE composition comprises:
units of at least one monovinyl aromatic monomer A polymerized with units of at least one conjugated diene monomer B to form a counter tapered diblock A-[A/B] copolymer, wherein the A block comprises a polymer of the monovinyl aromatic monomer units, wherein the [A/B] block is a copolymer of the monovinyl aromatic monomer units and the conjugated diene monomer units, and wherein the [A/B] block is counter tapered such that the ratio of B to A is lower proximal to the A block relative to the ratio of B to A distal to the A block.

45. The adhesive composition of claim 44, wherein the total amount of units of the conjugated diene monomer B is more than 55 wt % of the first CTTE composition.

46. The adhesive composition of claim 45, wherein said conjugated diene monomer B is at least one monomer selected from the group consisting of: 1,3-butadiene, isoprene, myrcene and/or farnesene.

47. The adhesive composition of claim 46, wherein said conjugated diene units are selectively, partially or fully hydrogenated.

48. The adhesive composition of claim 44, wherein the vinyl content is higher proximal to the A block relative to the vinyl content distal to the A block in the counter tapered diblock A-[A/B] copolymer.

49. The adhesive composition of claim 44, wherein the total amount of units of the conjugated diene monomer B is more than 55 wt % of the first CTTE composition, and wherein the vinyl content is higher proximal to the A block relative to the vinyl content distal to the A block in the counter tapered diblock A-[A/B] copolymer.

50. The adhesive composition of claim 44, wherein the [A/B] block of the first CTTE composition comprises from 2 to 40 wt % of the monovinyl aromatic monomer A and from 60 to 98 wt % of the conjugated diene monomer B.

51. The adhesive composition of claim 44, wherein the adhesive composition has a melt viscosity at 150° C. lower than 15500 cP, wherein the adhesive composition has a melt viscosity at 160° C. lower than 9600 cP, and wherein the adhesive composition has a melt viscosity at 177° C. lower than 5500 cP.

52. The adhesive composition of claim 51, wherein the adhesive composition has a R&B Softening Point Temperature greater than 98° C., a peel 180° greater than 7.0 lbf, a loop tack greater than 5.0 lbf/in2, a holding power greater than 150 minutes, and a rolling ball tack lower than 1.5 in.

53. The adhesive composition of claim 44, wherein the adhesive composition has a melt viscosity at 150° C. lower than 18500 cP, wherein the adhesive composition has a melt viscosity at 160° C. lower than 11500 cP, and wherein the adhesive composition has a melt viscosity at 177° C. lower than 7000 cP.

54. The adhesive composition of claim 53, wherein the adhesive composition has a R&B Softening Point Temperature greater than 95° C., a peel 180° greater than 5.0 lbf, a loop tack greater than 4.0 lbf/in2, a holding power greater than 100 minutes, and a rolling ball tack lower than 2.0 in.

55. An adhesive composition comprising:
(a) at least one additive selected from the group consisting of: tackifying resins, plasticizers, solvent, coupling agents, crosslinking agents, photoinitiators and antioxidants; and
(b) a counter tapered thermoplastic elastomer (CTTE) composition, wherein the CTTE composition comprises:
units of at least one monovinyl aromatic monomer A and units of at least one conjugated diene monomer B and having a linear structure (A-[A/B])-X-([B/A]-A) and/or a coupled radial and/or multiarm structure (A-[A/B]) n-X, wherein X is the residue of either a coupling agent or a multifunctional initiator, wherein n is an integer from 2 to 30,
wherein the CTTE composition has outer blocks and/or end blocks A that are a polymer of the monovinyl aromatic monomer units A,
wherein the CTTE composition has a midblock that is a copolymer of the monovinyl aromatic monomer units A and the conjugated diene monomer units B, wherein the midblock has a center region between terminal regions, and wherein the B/A ratio is higher in the center region than in the terminal regions.

56. The adhesive composition of claim 55, wherein the vinyl content is higher in the terminal regions relative to the vinyl content in the center region in the CTTE composition.

57. The adhesive composition of claim 55, wherein the adhesive composition includes from 0.5 to 50 percent weight of the CTTE compositions.

58. The adhesive composition of claim 55, wherein the adhesive composition includes from 20 to 40 percent weight of the CTTE compositions.

59. The adhesive composition of claim 44, further comprising a second counter tapered thermoplastic elastomer (second CTTE) composition, wherein the second CTTE composition comprises:
   units of at least one monovinyl aromatic monomer A and units of at least one conjugated diene monomer B and having a linear structure (A-[A/B])-X-([B/A]-A) and/or a coupled radial and/or multiarm structure (A-[A/B]) n-X, wherein X is the residue of either a coupling agent or a multifunctional initiator, wherein n is an integer from 2 to 30,
   wherein the second CTTE composition has outer blocks and/or end blocks A that are a polymer of the monovinyl aromatic monomer units A,
   wherein the second CTTE composition has a midblock that is a copolymer of the monovinyl aromatic monomer units A and the conjugated diene monomer units B,
   wherein the midblock has a center region between terminal regions, and wherein the B/A ratio is higher in the center region than in the terminal regions.

60. The adhesive composition of claim 59, wherein the structure (A-[A/B])-X-([B/A]-A) or (A-[A/B]) n-X of the second CTTE composition includes an [A/B]-X-[B/A] or [A/B] n-X midblock, and wherein the [A/B]-X-[B/A] or [A/B] n-X midblock comprises from 2 to 40 wt % of the monovinyl aromatic monomer A and from 60 to 98 wt % of the conjugated diene monomer B.

61. The adhesive composition of claim 60, wherein said conjugated diene monomer B is at least one monomer selected from the group consisting of 1,3-butadiene, isoprene, myrcene and/or farnesene.

62. The adhesive composition of claim 61, wherein said conjugated diene units are selectively, partially or fully hydrogenated.

63. An adhesive composition comprising:
   (a) at least one additive selected from the group consisting of: tackifying resins, plasticizers, solvent, coupling agents, crosslinking agents, photoinitiators and antioxidants; and
   (b) a counter tapered thermoplastic elastomer (CTTE) composition, wherein the adhesive composition includes from 0.5 to 50 percent weight of the CTTE composition, and wherein the CTTE composition comprises:
   (1) a counter tapered diblock A-[A/B] copolymer comprising units of at least one conjugated diene monomer B and units of at least one monovinyl aromatic monomer A,
   wherein the diblock copolymer has a peak molecular weight from 20,000 to 250,000,
   wherein the monovinyl aromatic homopolymer block A has a peak molecular weight of at least 5,000,
   wherein the [A/B] block is counter tapered,
   wherein the [A/B] has a vinyl content of at least 15 weight percent based on the amount of conjugated diene units in the diblock copolymer, and
   wherein counter tapered means that the ratio of B to A in the [A/B] block is lower proximal to the A block relative to the ratio of B to A distal to the A block; and
   (2) a block copolymer comprising at least two of the counter tapered diblock A-[A/B] copolymers,
   wherein the block copolymer has at least two of the monovinyl aromatic homopolymer blocks A and at least one copolymer block of monovinyl aromatic monomer units and conjugated diene monomer units, and
   wherein the copolymer block is selected from the group consisting of: linear triblock copolymers having a peak molecular weight of at least 1.5 times the peak molecular weight of the counter tapered diblock copolymer, multiarm coupled block copolymers having a peak molecular weight that is at least 2.5 times the peak molecular weight of the counter tapered diblock copolymer, and mixtures thereof.

64. The adhesive composition of claim 63, wherein the ratio of (1) to (2) in the CTTE composition is from 1:5 to 5:1.

65. The adhesive composition of claim 63, wherein the vinyl content in the diblock copolymer is higher proximal to the A block relative to the vinyl content distal to the A block.

66. The adhesive composition of claim 63, wherein the amount of the conjugated diene monomer B in the diblock copolymer is more than 55 wt %.

67. The adhesive composition of claim 66, wherein said conjugated diene monomer B is at least one monomer selected from the group consisting of 1,3-butadiene, isoprene, myrcene and/or farnesene.

68. The adhesive composition of claim 67, wherein said conjugated diene units are selectively, partially or fully hydrogenated.

69. The adhesive composition of claim 66, wherein the amount of monovinyl aromatic monomer units A in the CTTE composition is from 10 percent to 48 percent by weight.

70. The adhesive composition of claim 69, wherein the vinyl content in the CTTE composition is from 15 percent to 90 percent by weight based on the total amount of conjugated diene units B in the CTTE composition.

71. The adhesive composition of claim 63, wherein the [A/B] block of the counter tapered diblock A-[A/B] copolymer comprises from 2 to 40 wt % of the monovinyl aromatic monomer A and from 60 to 98 wt % of the conjugated diene monomer B.

72. The adhesive composition of claim 63, wherein the adhesive composition includes from 20 to 40 percent weight of the first and second CTTE compositions of claim 36 or the CTTE composition of claim 42.

73. The adhesive composition of claim 63, wherein the adhesive composition has a melt viscosity at 130° C. lower than 35000 cP, wherein the adhesive composition has a melt viscosity at 150° C. lower than 25000 cP, and wherein the adhesive composition has a melt viscosity at 180° C. lower than 15000 cP.

74. The adhesive composition of claim 73, wherein the adhesive composition has a R&B Softening Point Temperature greater than 70° C., a peel 180° greater than 1.5 lbf, a loop tack greater than 3.0 lbf/in2, and a holding power greater than 500 minutes.

75. The adhesive composition of claim 63, wherein the adhesive composition has a melt viscosity at 130° C. lower than 20000 cP, wherein the adhesive composition has a melt viscosity at 150° C. lower than 7000 cP, and wherein the adhesive composition has a melt viscosity at 180° C. lower than 2500 cP.

76. The adhesive composition of claim 75, wherein the adhesive composition has a R&B Softening Point Temperature greater than 90° C.

77. The adhesive composition of claim 75, wherein the adhesive composition has a R&B Softening Point Temperature greater than 80° C., a peel 180° greater than 3.0 lbf, a loop tack greater than 3.0 lbf/in2, and a holding power greater than 500 minutes.

* * * * *